(12) United States Patent
Liu et al.

(10) Patent No.: US 10,270,570 B2
(45) Date of Patent: Apr. 23, 2019

(54) SYSTEM AND METHOD FOR SRS SWITCHING, TRANSMISSION, AND ENHANCEMENTS

(71) Applicant: Futurewei Technologies, Inc., Plano, TX (US)

(72) Inventors: Jialing Liu, Palatine, IL (US); Weimin Xiao, Hoffman Estates, IL (US); Qian Cheng, Aurora, IL (US); Murali Narasimha, Vernon Hills, IL (US); Brian Classon, Palatine, IL (US)

(73) Assignee: Futurewei Technologies, Inc., Plano, TX (US)

(*) Notice: Subject to any disclaimer, the term of this patent is extended or adjusted under 35 U.S.C. 154(b) by 4 days.

(21) Appl. No.: 15/477,639

(22) Filed: Apr. 3, 2017

(65) Prior Publication Data

US 2017/0302419 A1    Oct. 19, 2017

Related U.S. Application Data

(63) Continuation of application No. PCT/US2017/025577, filed on Mar. 31, 2017.
(Continued)

(51) Int. Cl.
*H04L 5/00* (2006.01)
*H04L 27/26* (2006.01)
(Continued)

(52) U.S. Cl.
CPC ............ *H04L 5/0048* (2013.01); *H04L 5/001* (2013.01); *H04L 5/0078* (2013.01); *H04L 5/0082* (2013.01); *H04L 5/0091* (2013.01); *H04L 5/0098* (2013.01); *H04L 27/261* (2013.01); *H04L 27/262* (2013.01);
(Continued)

(58) Field of Classification Search
CPC ...... H04L 5/001; H04L 5/0053; H04L 5/0051
See application file for complete search history.

(56) References Cited

U.S. PATENT DOCUMENTS

| 8,913,578 B2 * | 12/2014 | Noh et al. ............... H04W 4/00 |
| 2013/0128855 A1 | 5/2013 | Noh et al. |
| 2016/0234706 A1 | 8/2016 | Liu et al. |

OTHER PUBLICATIONS

Huawei, "Feasible Scenario of SRS Transmission on the TDD Scells," 3GPP RAN WG4 Meeting #76bis, R4-155504, Sophia Antipolis, France, Oct. 12-16, 2015, 3 pgs.
(Continued)

*Primary Examiner* — Chandrahas B Patel
(74) *Attorney, Agent, or Firm* — Slater Matsil, LLP

(57) ABSTRACT

User Equipments (UEs) may be assigned a set of aggregated component carriers for downlink carrier aggregation and/or carrier selection. Some UEs may be incapable of transmitting uplink signals over all component carriers in their assigned set of aggregated component carriers. In such scenarios, a UE may need to perform SRS switching in order to transmit SRS symbols over all of the component carriers. Embodiments of this disclosure provide various techniques for facilitating SRS switching. For example, a radio resource control (RRC) message may be used to signal a periodic SRS configuration parameter. As another example, a downlink control indication (DCI) message may be used to signal an aperiodic SRS configuration parameter. Many other examples are also provided.

20 Claims, 32 Drawing Sheets

Related U.S. Application Data

(60) Provisional application No. 62/317,327, filed on Apr. 1, 2016, provisional application No. 62/317,351, filed on Apr. 1, 2016, provisional application No. 62/336,347, filed on May 13, 2016, provisional application No. 62/374,527, filed on Aug. 12, 2016, provisional application No. 62/378,030, filed on Aug. 22, 2016, provisional application No. 62/401,701, filed on Sep. 29, 2016.

(51) Int. Cl.
*H04W 48/12* (2009.01)
*H04W 72/04* (2009.01)
*H04L 5/14* (2006.01)

(52) U.S. Cl.
CPC ......... *H04W 48/12* (2013.01); *H04W 72/042* (2013.01); *H04L 5/0007* (2013.01); *H04L 5/14* (2013.01)

(56) References Cited

OTHER PUBLICATIONS

3GPP, "3rd Generation Partnership Project;Technical Specification Group Radio Access Network; Evolved Universal Terrestrial Radio Access (E-UTRA); User Equipment (UE) radio transmission and reception (Release 14)," TS 36.101 V14.0.0, Jun. 2016, 1057 pages.
3GPP, "3rd Generation Partnership Project; Technical Specification Group Radio Access Network; Evolved Universal Terrestrial Radio Access (E-UTRA); Physical channels and modulation (Release 13)," TS 36.211 v13.0.0, Dec. 2015, 141 pages.
3GPP, "3rd Generation Partnership Project; Technical Specification Group Radio Access Network; Evolved Universal Terrestrial Radio Access (E-UTRA); Multiplexing and channel coding (Release 13)," TS 36.212 v13.1.0, 129 pgs.
3rd Generation Partnership Project; Technical Specification Group Radio Access Network; Evolved Universal Terrestrial Radio Access (E-UTRA); Medium Access Control (MAC) protocol specification (Release 13), 3GPP TS 36.321 V13.2.0, Jun. 2016, 91 pages.
3rd Generation Partnership Project; Technical Specification Group Radio Access Network; Evolved Universal Terrestrial Radio Access (E-UTRA); Radio Resource Control (RRC); protocol specification (Release 13), 3GPP TS 36.331 V13.0.0, Dec. 2015, 507 pages.
3rd Generation Partnership Project; Technical Specification Group Radio Access Network; Evolved Universal Terrestrial Radio Access (E-UTRA); Medium Access Control (MAC) protocol specification (Release 13), 3GPP TS 36.321 V13.0.0, Dec. 2015, 82 pages.
3GPP, "3rd Generation Partnership Project;Technical Specification Group Radio Access Network; Evolved Universal Terrestrial Radio Access (E-UTRA); Physical layer procedures (Release 13)," TS 36.213 V13.0.1, Jan. 2016, 326 pages.
"Details on Collision Handling for SRS Switching," 3GPP TSG RAN WG1 Meeting #86bis, R1-1608589, Lisbon, Portugal, Oct. 10-14, 2016, 3 pgs.
"General Operation of SRS Carrier Based Switching," 3GPP TSG RAN WG1 Meeting #84bis, R1-162585, Busan, Korea Apr. 11-15, 2016, 5 pgs.
"Specification Impacts to Support SRS Carrier based Switching ," 3GPP TSG RAN WG1 Meeting #84bis, R1-162586, Busan, Korea, Apr. 11-15, 2016, 4 pgs.
"Draft Agenda" 3GPP TSG RAN WG1 Meeting #86 R1-166055, Gothenburg, Sweden Aug. 22-26, 2016, 8 pgs.
"LS on 5G NR study—mMTC use case," 3GPP TSG-RAN WG1 #86 R1-166087 Göteborg, Sweden Aug. 22-26, 2016 1 pg.
"Motivation for New WI Proposal: Advanced Carrier Aggregation Techniques for LTE," 3GPP TSG RAN Meeting #71, RP-160295, Göteborg, Sweden, Mar. 7-10, 2016, 10 slides.
"New WI proposal: SRS Carrier Based Switching for LTE," RP-160676, 3GPP TSG RAN Meeting #71, Göteborg, Sweden, Mar. 7-10, 2016, 7 pgs.

\* cited by examiner

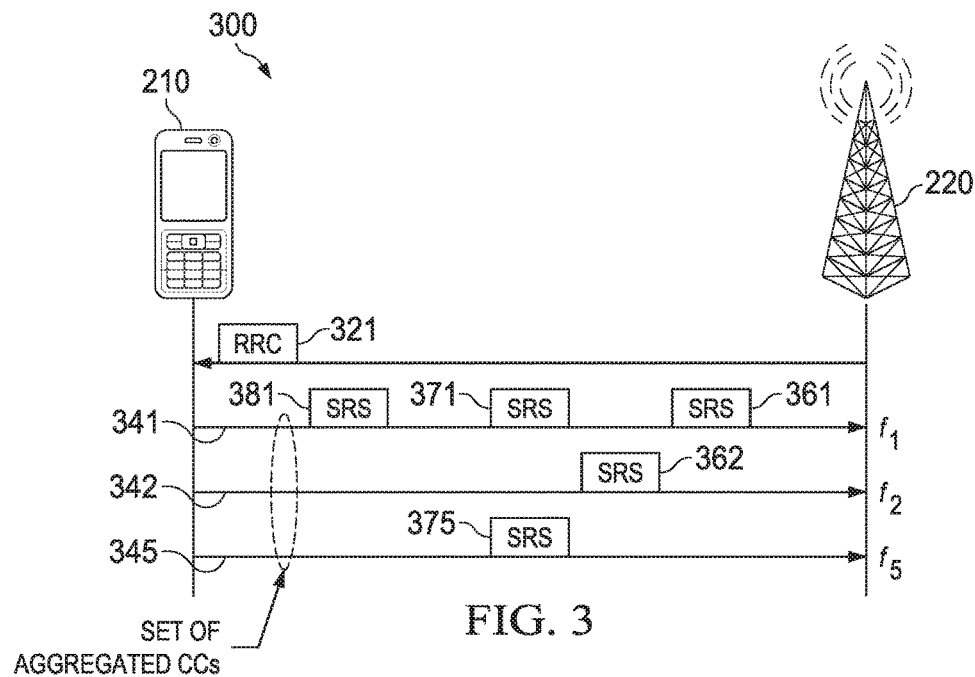
FIG. 3
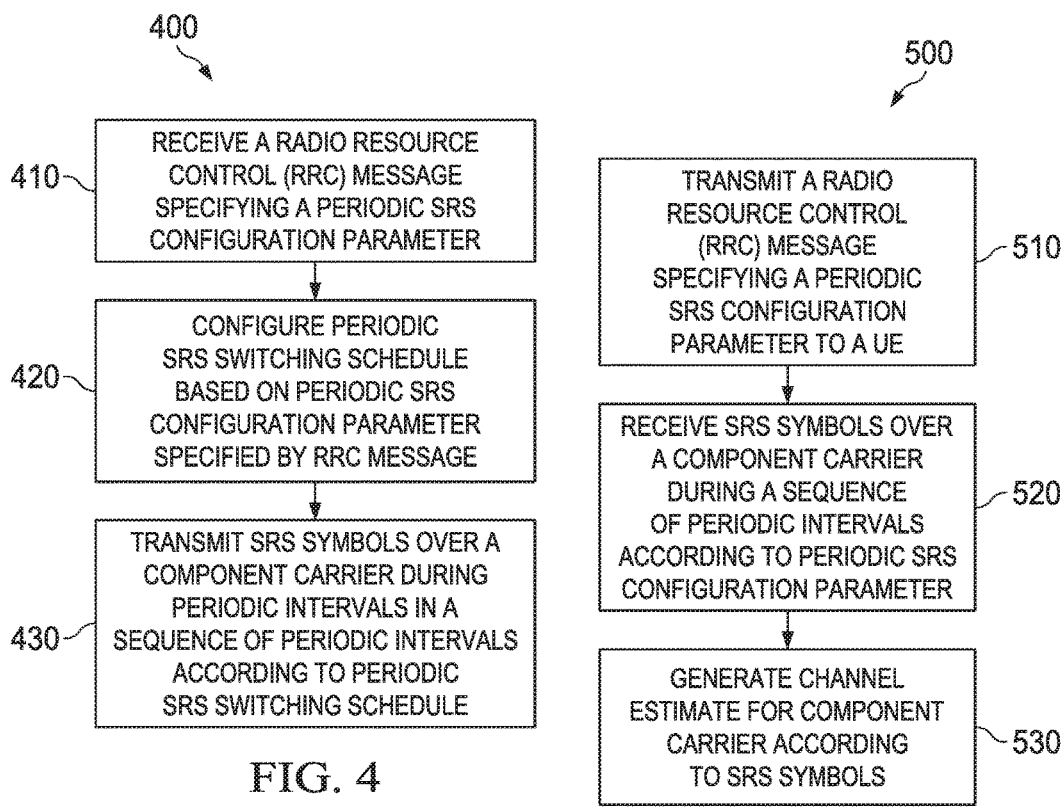
FIG. 4
FIG. 5

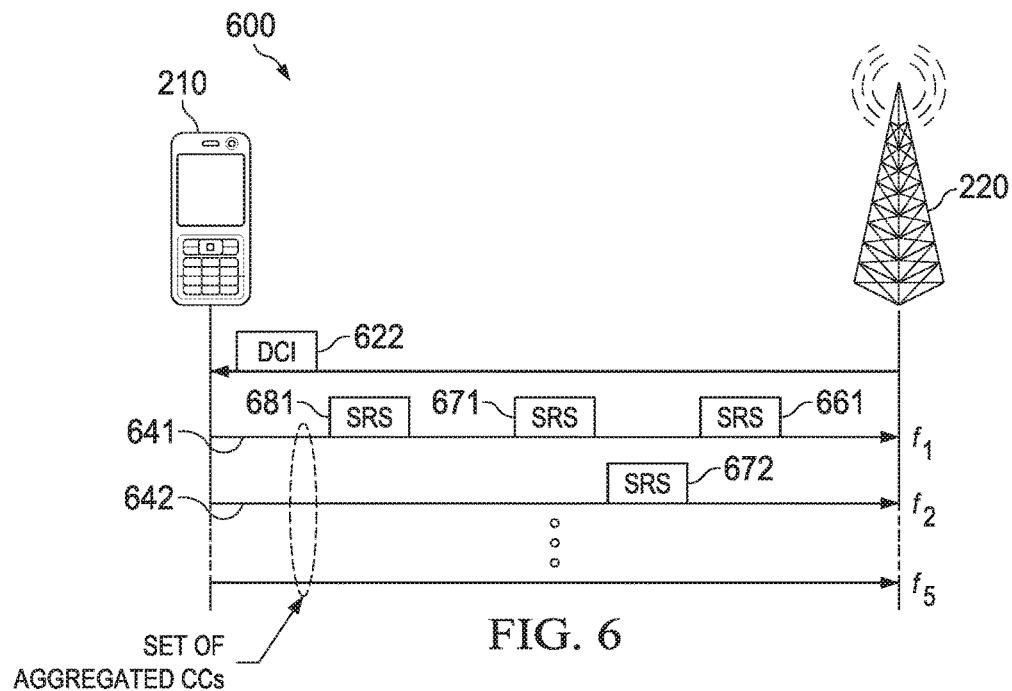
FIG. 6
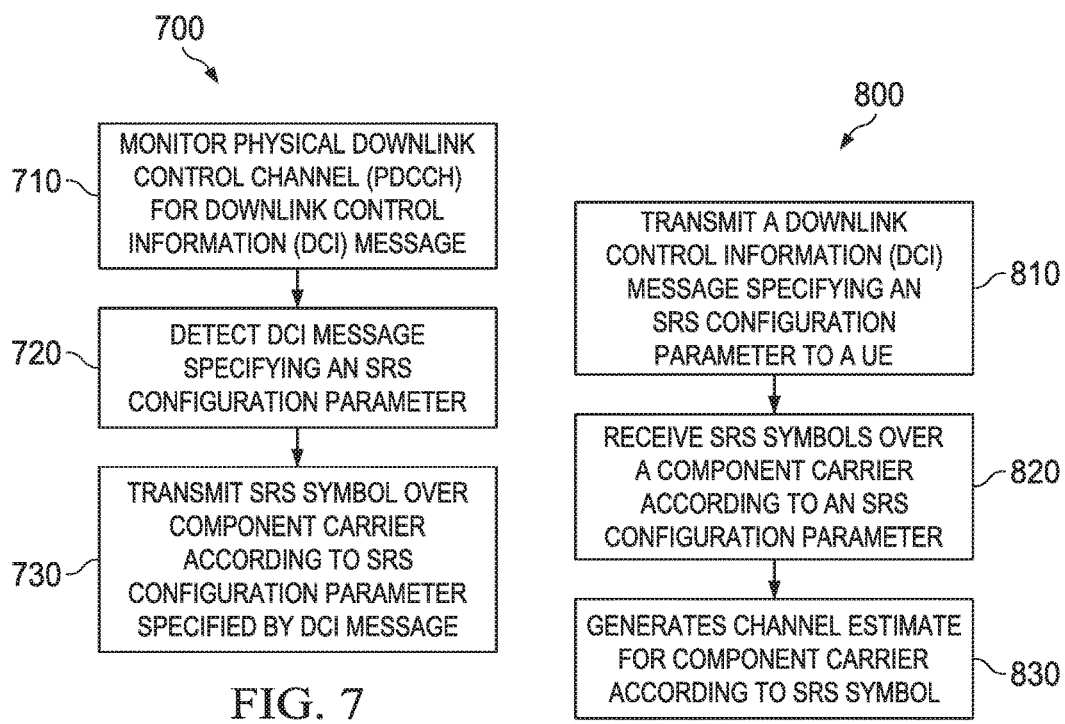
FIG. 7
FIG. 8

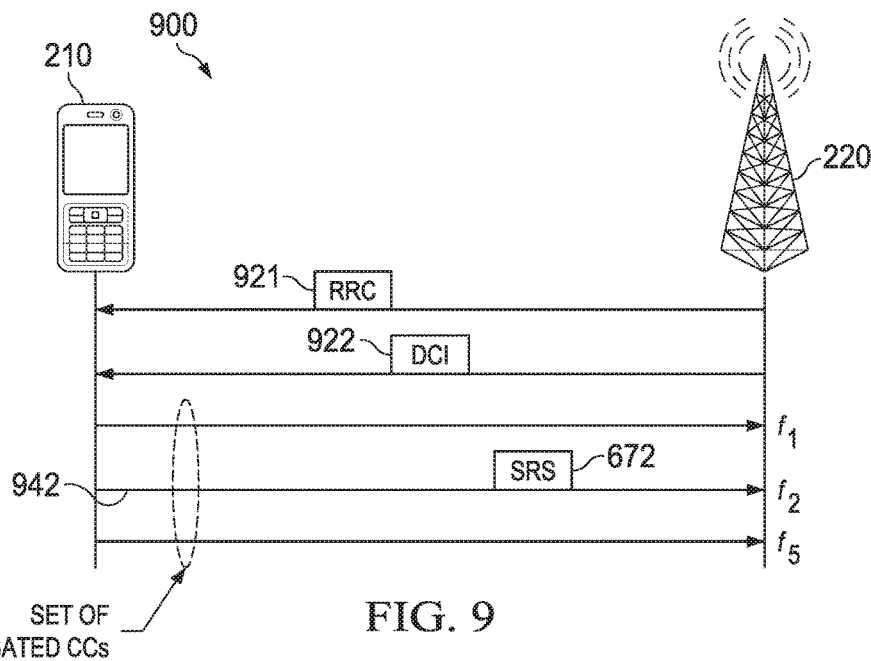
FIG. 9
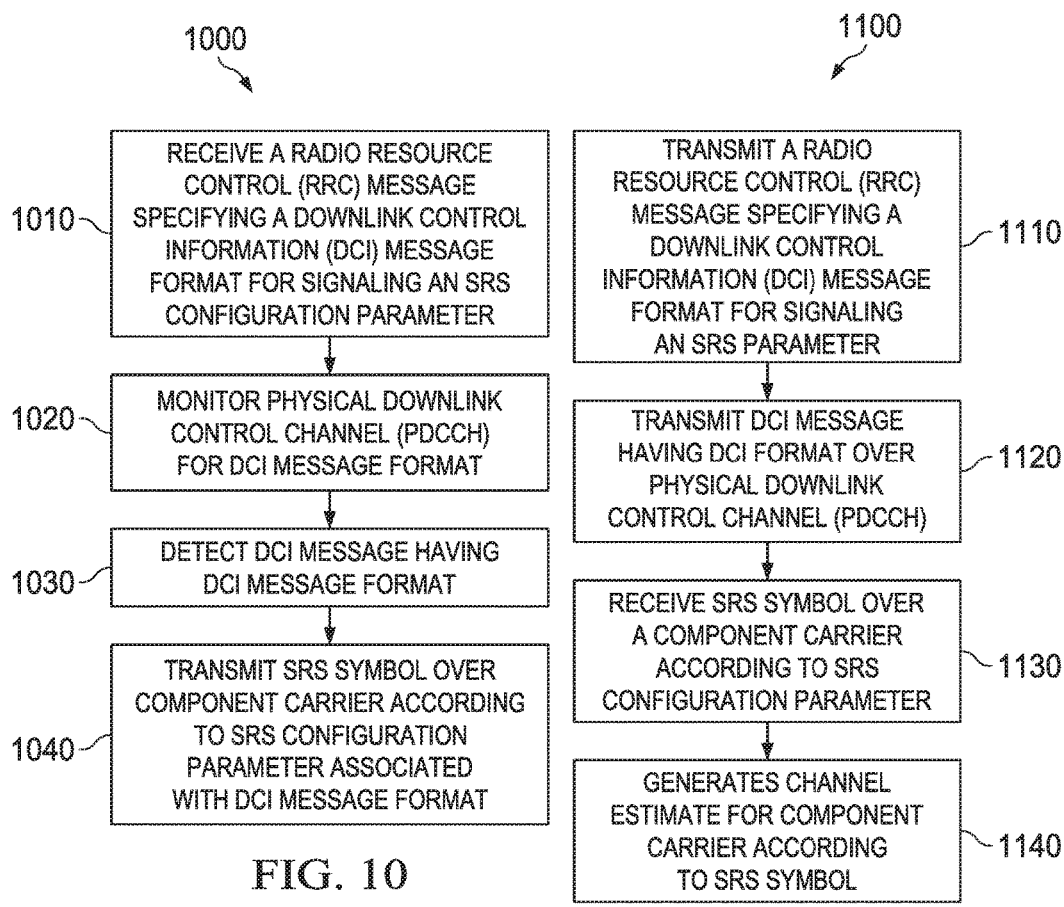
FIG. 10
FIG. 11

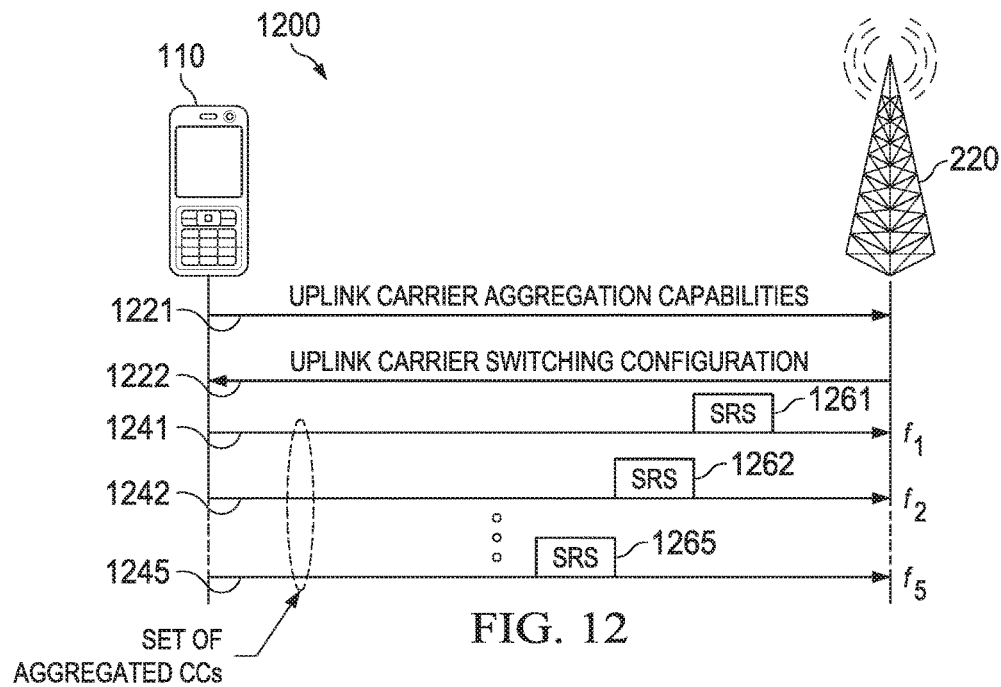
FIG. 12
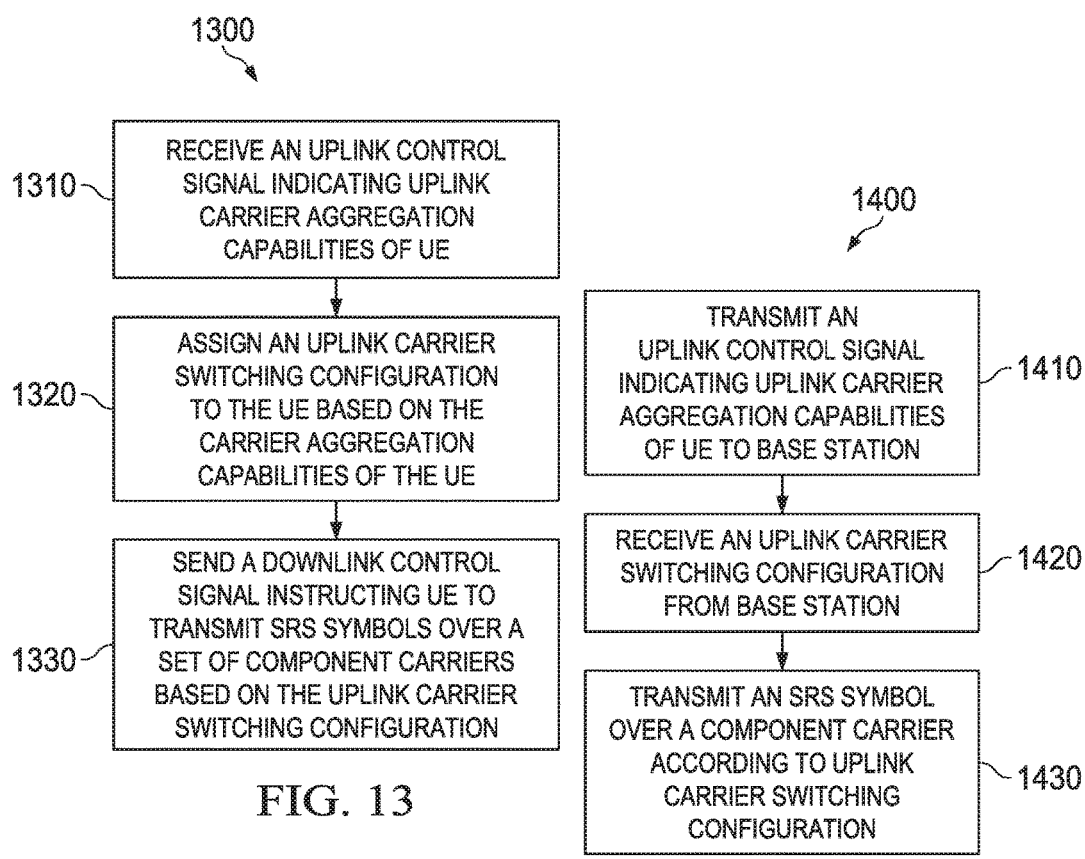
FIG. 13
FIG. 14

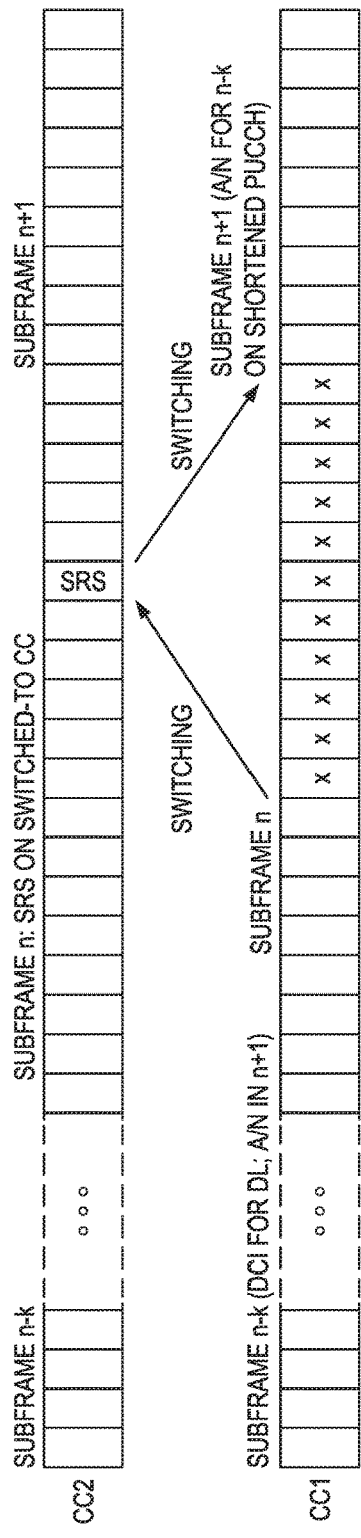
FIG. 43
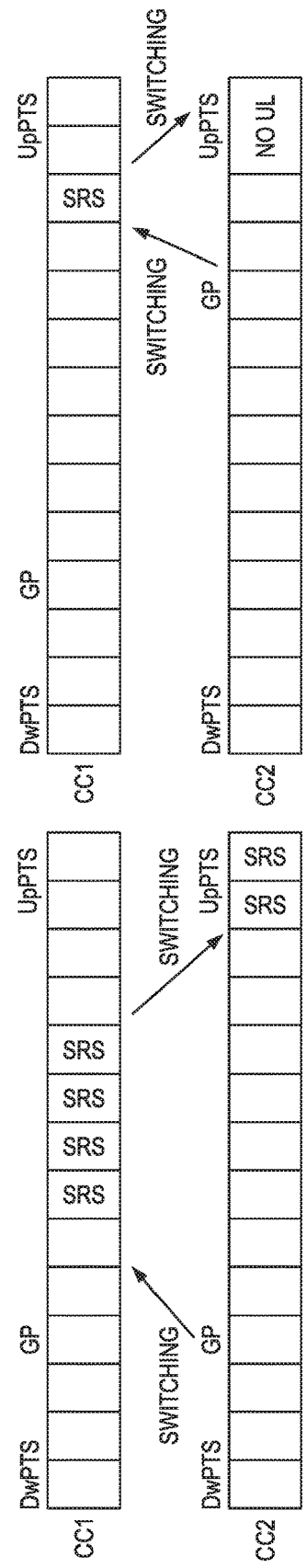
FIG. 44A
FIG. 44B (i) Switching from DL subframe to UL subframe, coupled Tx/Rx (j) Switching from DL subframe to UL subframe, separate Tx/Rx

SYSTEM AND METHOD FOR SRS SWITCHING, TRANSMISSION, AND ENHANCEMENTS

This patent application is a continuation of International Application No. PCT/US17/25577 filed on Mar. 31, 2017, and claims priority to U.S. Provisional Application No. 62/317,327 filed on Apr. 1, 2016, U.S. Provisional Application No. 62/317,351 filed on Apr. 1, 2016, U.S. Provisional Application No. 62/336,347 filed on May 13, 2016, U.S. Provisional Application No. 62/374,527 filed on Aug. 12, 2016, U.S. Provisional Application No. 62/378,030 filed on Aug. 22, 2016, and U.S. Provisional Application No. 62/401,701 filed on Sep. 29, 2016, each of which is hereby incorporated by reference herein as if reproduced in its entirety.

TECHNICAL FIELD

The present invention relates to a system and method for wireless communications, and, in particular embodiments, to a system and method for sounding reference signal switching.

BACKGROUND

Next-generation wireless networks will need to provide higher throughput to support greater numbers of subscribers as well as applications requiring high-data rates, such as video, high-definition images, and the like. Various techniques have been proposed to increase the overall throughput provided to mobile devices in a wireless network. One such technique is carrier aggregation, which communicates data to, or from, a mobile device over multiple carriers at the same time, thereby increasing the bandwidth available to the mobile device. Another technique is carrier selection (also referred to as carrier switching), where an existing communications session associated with a mobile device is switched from one carrier to another. Carrier selection may increase the effective bandwidth available to a mobile device by allowing the communications session to be transitioned over to a component carrier that is exhibiting better channel quality.

SUMMARY

Technical advantages are generally achieved, by embodiments of this disclosure which describe systems and methods for SRS Switching, Transmission, and Enhancements.

In accordance with an embodiment, a method for reference signal transmission is provided. In this example, the method includes receiving one or more downlink transmissions over a first set of aggregated component carriers is provided. The UE is capable of transmitting uplink signals over fewer than all component carriers in the first set of aggregated component carriers at the same time. The method further includes transmitting sounding reference signal (SRS) symbols over different component carriers in the first set of aggregated component carriers during different time periods. An apparatus for performing this method is also provided.

In accordance with another embodiment, a method for reference signal reception is provided. In this example, the method includes transmitting one or more downlink signals to a user equipment (UE) over a first set of aggregated component carriers. The UE is incapable of transmitting uplink signals over all component carriers in the first set of aggregated component carriers at the same time. The method further includes receiving sounding reference signal (SRS) symbols from the UE over different component carriers in a first set of aggregated component carriers during different time periods. An apparatus for performing this method is also provided.

In accordance with another embodiment, a method for transmitting uplink signals is provided. In this example, the method includes transmitting a first uplink signal in a first subframe over a first component carrier during a first period. The first uplink signal carrying at least a first sounding reference signal (SRS) symbol. The method further includes switching from the first component carrier to a second component carrier according to an SRS switching schedule. An uplink RF retuning delay is associated with switching from the first component carrier to the second component carrier. The method further includes transmitting a second uplink signal in a second subframe over the second component carrier during a second period. The second uplink signal carries at least one of a second SRS symbol and a random access preamble.

In accordance with another embodiment, a method for reference signal switching is provided. In this example, the method includes transmitting a first sounding reference signal (SRS) symbol over a primary component carrier during a first period. The UE that transmitted the SRS symbol is scheduled to transmit both a second SRS symbol over a secondary component carrier during a second period and an uplink control message over the primary carrier during the second period. This creates a scheduling conflict between the SRS symbol and the uplink control message. The method further includes transmitting the uplink control message over the primary component carrier during the second period without transmitting the second SRS symbol over the secondary component carrier during the second period when the uplink control message satisfies a criterion.

In accordance with another embodiment, a method for transmitting uplink signals is provided. In this example, the method includes receiving a control signal from a base station that indicates that a set of aggregated component carriers are assigned to a timing advance group (TAG). At least a first component carrier assigned to the TAG does not support physical uplink control channel (PUCCH) signaling or physical uplink shared channel (PUSCH) signaling. The method further includes transmitting a sounding reference signal (SRS) symbol over one or more component carriers assigned to the TAG according to a timing advance parameter associated with the TAG.

In accordance with another embodiment, a method for receiving uplink signals is provided. In this example, the method includes transmitting a downlink signal to a UE over a set of aggregated component carriers, receiving a first sounding reference signal (SRS) symbol from the UE over a first component carrier in the set of aggregated component carriers during a first period, and receiving a second SRS symbol from the UE over a second component carrier in the set of aggregated component carriers during a second period. The second component carrier is different than the first component carrier.

In accordance with another embodiment, a method for transmitting control signals is provided. In this example, the method includes transmitting a control signal to a UE. The control signal indicates that a set of aggregated component carriers are assigned to a timing advance group (TAG). At least one component carrier assigned to the TAG does not support physical uplink control channel (PUCCH) signaling and physical uplink shared channel (PUSCH) signaling, and the control signal prompts the UE to transmit a sounding reference signal (SRS) symbol over one or more component carriers assigned to the TAG according to a timing advance parameter associated with the TAG.

In accordance with another embodiment, a method for receiving uplink signals is provided. In this example, the method includes receiving a random access channel (RACH) transmission from a user equipment (UE). The RACH transmission requests a timing advance for a component carrier without requesting a grant for physical uplink control channel (PUCCH) resource and without requesting a grant for physical uplink shared channel (PUSCH) resources. The method further includes transmitting a control signal to the UE that indicates the timing advance for the component carrier, and receiving one or more sounding reference signal (SRS) symbols from the UE over the component carrier in accordance with the timing advance without receiving any PUSCH signaling over the component carrier and without receiving any PUCCH signaling over the component carrier.

In accordance with another embodiment, a method for reference signal transmission is provided in this example, the method includes reporting a component carrier capability of a user equipment (UE) to a base station, configuring the UE based on information from the base station, a first set of component carriers for one or more downlink reception, configuring the UE based on information from the base station a first subset of component carriers, in the first set of component carriers, for one or more uplink transmissions. The one or more transmissions include at least one of physical uplink control channel (PUCCH), physical uplink shared channel (PUSCH), or sounding reference signal (SRS) symbol transmissions. The UE is capable of transmitting uplink signals over all component carriers in the first subset of component carriers at the same time. The method further includes configuring the UE based on information from the eNB, a second subset of component carriers, in the first set of component carriers, for one or more SRS transmissions without configured the second subset of component carriers for PUSCH/PUCCH transmissions, and transmitting SRS symbols over different component carriers in the first subset of component carriers and second subset of component carriers during different time periods.

In accordance with another embodiment, a method for reference signal transmission is provided. In this example, the method includes transmitting a first uplink signal over a first component carrier during a first period. The first uplink signal carries at least a first sounding reference signal (SRS) symbol. The method further includes switching from the first component carrier to a second component carrier according to a switching parameter for an SRS switching schedule, and transmitting a second uplink signal over the second component carrier during a second period. The second uplink signal carrying at least one of a second SRS symbol and a random access preamble, wherein the transmission occurs after an uplink RF retuning time.

In accordance with another embodiment, a method for reference signal transmission is provided. The method comprises receiving one or more downlink transmissions over a set of aggregated component carriers, and transmitting at least one of a first sounding reference signal (SRS) symbol, and at least one of physical uplink shared channel (PUSCH) signal and physical uplink control channel (PUCCH) signaling over a first component carrier in the set of aggregated component carriers during a first period. At least one of the parameters for the SRS symbol is generated based on a parameter for the PUSCH. The method further includes transmitting at least a second SRS symbol over a second component carrier in the set of aggregated component carriers during a second period without transmitting any PUSCH signal and PUCCH signaling over the second component carrier during the second period. The second component carrier being different than the first component carrier, and none of the parameters for the SRS symbol is generated based on a parameter for any PUSCH.

BRIEF DESCRIPTION OF THE DRAWINGS

For a more complete understanding of the present invention, and the advantages thereof, reference is now made to the following descriptions taken in conjunction with the accompanying drawing, in which:

FIG. 3 is a diagram of an embodiment communications sequence for configuring a periodic SRS switching schedule;

FIG. 4 is a flowchart of an embodiment method for transmitting SRS symbols;

FIG. 5 is a flowchart of an embodiment method for performing channel estimation based on SRS symbols;

FIG. 6 is a diagram of an embodiment communications sequence for configuring, or otherwise triggering, an aperiodic SRS symbol transmission;

FIG. 7 is a flowchart of another embodiment method for transmitting SRS symbols;

FIG. 8 is a flowchart of another embodiment method for performing channel estimation based on SRS symbols;

FIG. 9 is a diagram of an embodiment communications sequence for configuring a DCI message format associated with an SRS configuration parameter;

FIG. 10 is a flowchart of yet another embodiment method for transmitting SRS symbols;

FIG. 11 is a flowchart of a yet another embodiment method for performing channel estimation based on SRS symbols;

FIG. 12 is a diagram of an embodiment communications sequence for assigning an uplink carrier switching configuration based on uplink carrier aggregation capabilities of a UE;

FIG. 13 is a flowchart of an embodiment method for assigning an uplink carrier switching configuration based on uplink carrier aggregation capabilities of a UE;

FIG. 14 is a flowchart of an embodiment method for transmitting SRS symbols;

FIG. 43 is a diagram of yet another carrier based SRS switching scheme;

DETAILED DESCRIPTION OF ILLUSTRATIVE EMBODIMENTS

Figure 1:
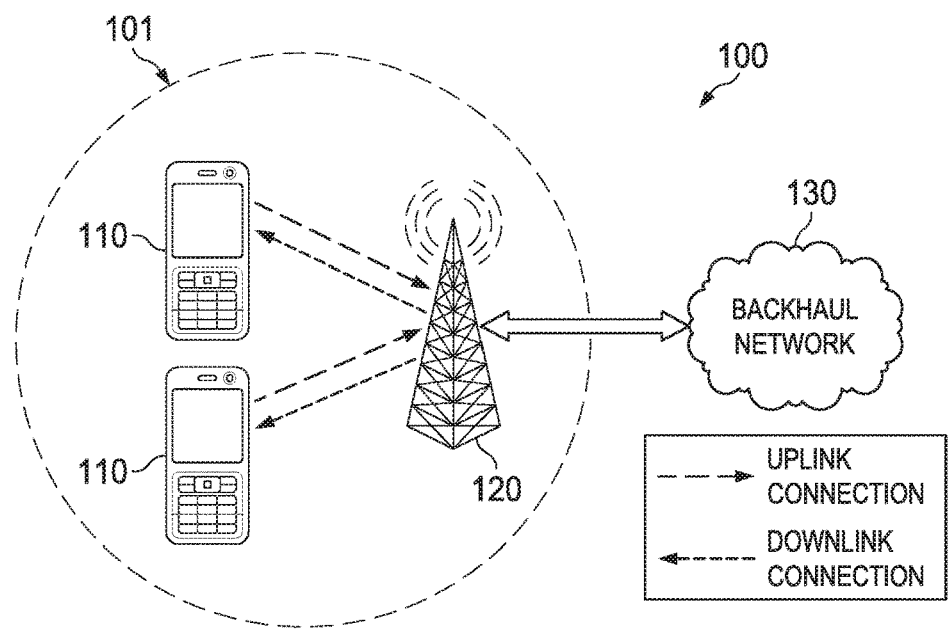
FIG. 1 is a diagram of an embodiment wireless communications network.

The structure, manufacture and use of the embodiments are discussed in detail below. It should be appreciated, however, that the present disclosure provides many applicable inventive concepts that can be embodied in a wide variety of specific contexts. The specific embodiments discussed are merely illustrative of specific ways to make and use the invention, and do not limit the scope of the invention.

As mentioned above, carrier aggregation and carrier selection are techniques that leverage multiple component carriers to increase the effective bandwidth available to a given mobile device. As used herein, the term "component carrier" refers to a channel or carrier from a transmitter to a receiver. The terms "carrier," "component carrier," "aggregated carrier," and "aggregated component carrier", "serving cell", "one of a PCell or SCell", "one of a PCC or SCC" are used interchangeably throughout this disclosure.

During carrier selection/aggregation, a mobile device may be assigned a set of aggregated component carriers, and the base station may transmit downlink signaling over one or more of those carriers at a given time. The mobile station may need to transmit sounding reference signal (SRS) symbols over each of the component carriers so that the base station can generate a channel estimate for the given component carrier, especially if channel reciprocity holds, such as for communications in an unpaired spectrum, e.g., a TDD carrier or an unlicensed spectrum or a high-frequency spectrum. The channel estimate may be used to select which of the component carriers over which to perform downlink transmissions, as well as to select the parameters used to transmit the downlink signal(ing).

In some scenarios, a UE may be incapable of simultaneously transmitting uplink signaling over all component carriers in a set of aggregated component carriers assigned to the UE due to the number of transmit (TX) chains in the UE, or power limitations or PA limitations of the UE, or other limitations in the RF and/or baseband of the UE, or limitations in the standards specifications, etc. In such scenarios, a UE may need to perform an SRS switching in order transmit SRS symbols over all of the component carriers. In particular, a UE may transmit an SRS symbol over a current component carrier during an initial time period, switch from the current component carrier to a target component carrier, and then transmit another SRS symbol over the current carrier during a subsequent time period. As used herein, the term "current component carrier" refers to a component carrier that a UE is transitioning from during an SRS switching operation, and the term "target component carrier" refers to a component carrier in which the UE is switching to during the SRS switching operation.

Aspects of this disclosure provide embodiment signaling techniques, formats, and schemes for facilitating SRS switching during carrier aggregation/selection. It should be appreciated that the embodiment SRS switching techniques herein may be applied in time division duplexed (TDD) channels, frequency division duplexed (FDD) channel, or channels that are both TDD and FDD. These embodiments may be employed in various commercial systems, such as wireless fiber to the X (WITx) systems and the like.

FIG. 1 illustrates a network 100 for communicating data. The network 100 comprises UEs (or terminal, or device, etc.) 110 having a coverage area 101, a base station 120, and a backhaul network 130. The base station 120 may comprise any component capable of providing wireless access by, inter alia, establishing uplink (dashed line) and/or downlink (dotted line) connections with the UEs 110, such as a base station, an enhanced base station (eNB), 5G gNB, a femto-cell, small cell, pico cell, transmission point (TP), transmission-reception point (TRP), and other wirelessly enabled devices. The UEs 110 may comprise any component capable of establishing a wireless connection with the base station 120. The backhaul network 130 may be any component or collection of components that allow data to be exchanged between the base station 120 and a remote end (not shown). In some embodiments, the network 100 may comprise various other wireless devices, such as relays, femtocells, etc.

Figure 2:
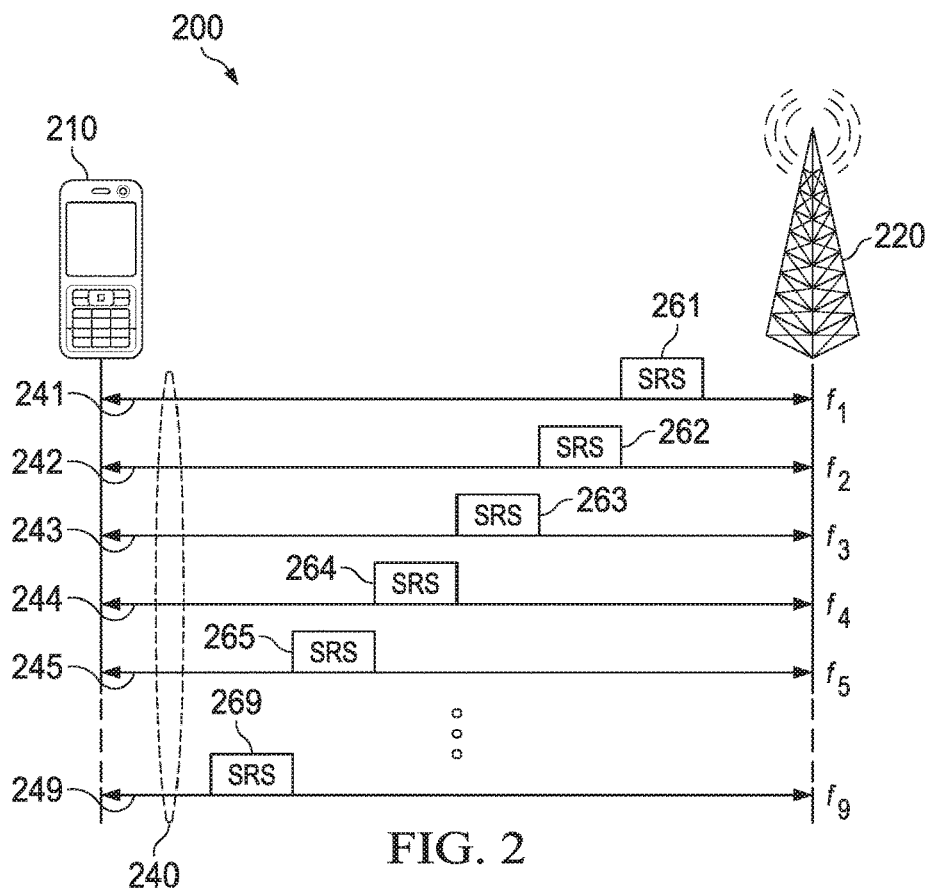
FIG. 2 is a diagram of a network for supporting SRS switching.

In some situations, a UE that is assigned a set of aggregated component carriers for a carrier aggregation/switching transmissions scheme may be incapable of simultaneously transmitting uplink signals over all component carriers in the assigned set of aggregated component carriers. FIG. 2 is a diagram of a network 200 for supporting carrier aggregation/switching transmissions. As shown, a UE is assigned a set of aggregated component carriers 240 that includes component carriers 241-249 associated with a base station 220. Each component carrier in the set of aggregated component carriers 240 has a different carrier frequencies (or center frequencies) (e.g., $f_1$, $f_2$, ... $f_9$.). Although the labels ($f_1$, $f_2$, ... $f_5$, $f_6$, $f_7$, ... $f_9$) indicate that each of the component carriers 241-249 has a different sub-carrier frequency band, it should be appreciated that those labels do not imply that their corresponding sub-carrier frequencies are contiguous, or otherwise consecutive with one another, in the frequency domain. The different carriers may be in the same band, i.e., intra-band CA, or in different bands, i.e., inter-band CA.

The UE 210 may receive downlink signals from, and/or transmit uplink signals to, the base station 220 over one or more of the component carriers 241-249 in the set of aggregated component carriers 240 according to a carrier aggregation and/or carrier selection transmission scheme. In order to support carrier aggregation/selection, the base station 220 may need to periodically, or aperiodically, perform channel estimation based on SRS symbols computed over the component carriers 241-249, and the resulting channel estimate may be used by the base station 220 to determine which of the component carriers 241-249 will be used for uplink/downlink data transmissions, as well as to select transmission parameters (such as beamforming or precoding parameters) for those uplink/downlink data transmissions. It should be appreciated that, channel estimation parameters that are generated by the base station may be more accurate than channel estimation parameters generated, and fed-back, by the UE. Accordingly, the UE 210 may need to transmit SRS symbols 261-269 over the component carriers 241-249. In some scenarios, the UE 210 may be incapable of simultaneously transmitting uplink signaling over all component carriers in the set of aggregated component carriers 240, and as a result, may need to perform SRS switching. In other scenarios, one or more carriers in the set of aggregated component carriers in the set of aggregated component carriers 240 may be configured to support SRS symbol transmissions without supporting PUSCH/PUCCH transmissions, while other carriers in the set of aggregated component carriers 240 are configured to support both SRS symbol transmissions and PUSCH/PUCCH transmissions. In such scenarios, the UE 210 may need to perform SRS switching in order to periodically, or aperiodically, transmit SRS symbols over the component carriers that do not support PUSCH/PUCCH transmissions. In this way, SRS switching may occur even when the UE 210 is capable of simultaneously transmitting uplink signals over all component carriers in the set of aggregated component carriers 240, in which case there may be no uplink RF retuning delay associated with SRS switching. This scenario is also applicable to the sets of aggregated component carriers depicted/discussed in other sections of this application, e.g., the descriptions of FIGS. 6, 15, etc.

Aspects of this disclosure provide embodiment signaling techniques, formats, and protocols for facilitating SRS switching during carrier aggregation/selection. In one embodiment, a radio resource control (RRC) message is used to signal a periodic SRS configuration parameter/instruction to a UE FIG. 3 illustrates an embodiment communications sequence 300 for communicating an RRC message to configure a periodic SRS switching schedule. In this example, the base station 220 transmits an RRC message 321 specifying a periodic SRS switching parameter to the UE 210. The UE 210 then uses the periodic SRS switching parameter to configure a periodic SRS switching schedule, and transmits SRS symbols 361, 371, 381 over the component carrier 341 during different intervals in a sequence of periodic intervals according to the periodic SRS switching schedule. Additionally, the UE 210 transmits an SRS symbol 362 over the component carrier 342 and an SRS symbol 375 over the component carrier 345. In this example, the SRS symbol 362 is transmitted over the component carrier 342 in-between the respective transmissions of the SRS symbols 361 and 371 over the component carrier 341, and the SRS symbol 375 is transmitted over the component carrier 345 in-between the respective transmissions of the SRS symbols 371 and 381 over the component carrier 341. Other examples are also possible. The SRS symbol 362 may be one of a series of periodic transmissions over the component carrier 342. Alternatively, the SRS symbol 362 may be an aperiodic transmission over the component carrier over the component carrier 342. Likewise, the SRS symbol 375 may either be one of a series of periodic transmissions over the component carrier 345 or an aperiodic transmission over the component carrier 345. In some instances, a periodic SRS symbol may be referred to as a "trigger type 0 SRS", and an aperiodic SRS symbol may be referred to as a "trigger type 1 SRS". It should be appreciated that the fact that periodic SRS symbols are generally be transmitted according to a periodic schedule, and that the fact that periodic SRS symbols may be referred to as "trigger type 0 SRSs" does not imply that the periodic SRS symbols are somehow "triggered" by an aperiodically occurring event (e.g., a DCI message, etc.). In some embodiments, each component carrier that does not support PUSCH signaling is associated with another component carrier that does support PUSCH signaling for SRS switching operation. In such embodiments, no SRS transmissions may be permitted over the component carrier that does supports PUSCH signaling during a period in which SRS transmissions are performed over the component carrier that does not support PUSCH signaling, and vice versa. Techniques for triggering aperiodic SRS symbol transmissions are discussed in greater detail below.

As mentioned above, the RRC message 321 carries, or otherwise indicates, a periodic SRS switching parameter. The periodic SRS switching parameter may be any parameter that can be used to generate, or otherwise, modify a periodic SRS switching schedule, such as a period between consecutive intervals in the sequence of periodic intervals. The RRC message 321 may also specify other SRS parameters. In one example, the RRC message 321 specifies orthogonal frequency division multiplexed (OFDM) or single-carrier frequency-division multiple access (SC-FDMA) symbol locations, in a subframe, over which the UE is transmit the SRS symbols. In other examples, the RRC message 321 specifies a number of SRS symbols that are to be transmitted during a given interval or series of intervals and/or an SRS transmission parameter (e.g., a transmit power level for the SRS symbols, etc.). FIG. 4 is a flowchart of an embodiment method 400 for transmitting SRS symbols according to a periodic SRS switching schedule, as may be performed by a UE. At step 410, the UE receives a radio resource control (RRC) message specifying a periodic SRS configuration parameter. At step 420, the UE configure a periodic SRS switching schedule based on the periodic SRS configuration parameter specified by the RRC message. At step 430, the UE transmits SRS symbols over a component carrier during periodic intervals in a sequence of periodic intervals according to periodic SRS switching schedule.

FIG. 5 is a flowchart of an embodiment method 500 for performing channel estimation according to a periodic SRS switching schedule, as may be performed by a base station. At step 510, the base station transmits a radio resource control (RRC) message specifying a periodic SRS configuration parameter to a UE. At step 520, the base station receives SRS symbols over a component carrier during a sequence of periodic intervals according to the periodic SRS configuration parameter specified by the RRC message. At step 530, the base station performs channel estimation on the component carrier according to SRS symbols received over the component carrier.

Downlink Control Information (DCI) messages may also be used to signal SRS configuration parameter/instruction to a UE FIG. 6 illustrates an embodiment communications sequence 600 for communicating a DCI message to specify or indicate a transmission parameter (e.g., power control parameter) for a SRS transmission, or trigger an aperiodic SRS symbol transmission. As shown, the base station 220 transmits a DCI message 622 to the UE 210. The DCI message 622 specifies an SRS configuration parameter. After receiving the DCI message 622, the UE 210 transmits an SRS symbol 672 over the component carrier 642 according to the SRS configuration parameter specified by the DCI message 622. The DCI message 622 may have been transmitted over the component carrier 642. Alternatively, the DCI message 622 may have been transmitted over a different component carrier.

In one example, the DCI message 622 triggers transmission of the SRS symbol 672 over the component carrier 642. In such an example, the DCI message 622 may have been communicated over the component carrier 642. Alternately, the DCI message 622 may have been communicated over one of the component carrier 641, 645 (e.g., over a primary cell or primary component carrier (PCC) configured for PUCCH and/or PUSCH transmissions), in which case the DCI message 622 would trigger a cross-carrier transmission of the SRS symbol 672 over the component carrier 642.

The DCI message 622 may have instructed the UE 210 to transmit the SRS symbol 672 in-between transmissions of the SRS symbol 671 and the SRS symbol 681 over the component carrier 641. For instance, the UE 210 may have been transmitting the SRS symbols 661, 671, 681 over the component carrier 641 according to a periodic SRS switching schedule, and the DCI message 622 may instruct the UE 210 to perform an aperiodic SRS transmission over the component carrier 642 in-between the periodic transmissions over the component carrier 641. In this way, the DCI message 622 may prompt the UE 210 to switch from the component carrier 641 to the component carrier 642 after transmission of the SRS symbol 671, transmit the SRS symbol 672 over the component carrier 642, and then switch back to the component carrier 641 so that the SRS symbol 681 can be transmitted during the next available periodic interval. This may or may not entail delaying transmission of the SRS symbol 681 for a periodic interval, depending on whether an uplink radio frequency (RF) retuning delay of the UE 210 permits the UE 210 to perform the SRS switching operations in-between consecutive periodic intervals. The DCI message 622 may indicate other types of SRS configuration parameters, instead of (or in addition to) triggering an aperiodic SRS transmission. For example, the DCI message 622 may specify a transmission parameter of the SRS symbol 672, e.g., an SRS transmit power level, etc.

FIG. 7 is a flowchart of an embodiment method 700 for performing aperiodic SRS transmissions, as may be performed by a UE. At step 710, the UE monitors a physical downlink control channel (PDCCH) for a Downlink Control Information (DCI) message. At step 720, the UE detects a DCI message specifying an SRS configuration parameter. At step 730, the UE transmits an SRS symbol over a component carrier according to the SRS configuration parameter specified by the DCI message.

FIG. 8 is a flowchart of an embodiment method 800 for performing channel estimation according to an aperiodic SRS transmission, as may be performed by a base station. At step 810, the base station transmits a Downlink Control Information (DCI) message specifying an SRS configuration parameter to a UE. At step 820, the base station receives an SRS symbol over a component carrier according to an SRS configuration parameter. At step 830, the base station generates a channel estimate for a component carrier according to the SRS symbol DCI message are typically decoded by the UE through a process referred to as blind detection. Blind detection reduces network overhead by allowing UEs to detect which set of control channel elements (CCEs) in a physical downlink control channel (PDCCH) carry a DCI message for the UE without having to send explicit control signaling. In general, a UE performs blind detection in a search space of a physical downlink control channel (PDCCH) by attempting to decode different sets of control channel elements (CCEs) according to known DCI formats. Since SRS switching is a new technique, many UEs may not know what DCI formats are associated with specific SRS configuration parameters/instructions. Embodiments of this disclosure use RRC messages to notify UEs of a DCI message format associated with an SRS parameter. This allows the UE to monitor a physical downlink control channel (PDCCH) for the DCI format, and vary their SRS transmission/switching operations accordingly.

FIG. 9 illustrates an embodiment communications sequence 900 for using an RRC message to notify a UE of a DCI format that will be used to signal an SRS configuration parameter over a PDCCH. As shown, the base station 220 transmits an RRC message 921 to the UE 210. The RRC message 921 configures that a DCI message format is associated with a specific SRS signaling instruction. For example, the RRC message 921 may specify a specific DCI message format for indicating an SRS transmit power level. As another example, the RRC message 921 may specify a specific DCI message format for triggering an SRS symbol transmission over the same component carrier used to transmit the DCI message. As yet another example, the RRC message 921 may specify a specific DCI message format for triggering cross-carrier transmission of an SRS symbol over a different component carrier than the one used to transmit the DCI message. As yet another example, the RRC message 921 may specify a specific DCI message format for triggering an SRS symbol transmission and the associated SRS transmission power level, for the same or different CC, for one or multiple CCs, for one or multiple UEs. Thereafter, the base station 220 transmits a DCI message 922 having the DCI format indicated by the RRC message 921 to the UE 210. The UE 210 detects the DCI message 922 by monitoring a PDCCH for the DCI message format indicated by the RRC message 921, and transmits an SRS symbol 972 over the component carrier 942 according to the SRS configuration parameter associated with the DCI message 922. The DCI message 922 may have been transmitted over the component carrier 942 or over a different component carrier.

FIG. 10 is a flowchart of an embodiment method 1000 for performing aperiodic SRS transmissions based on DCI message formats communicated over a PDCCH, as may be performed by a UE. At step 1010, the UE receives a radio resource control (RRC) message specifying a downlink control information (DCI) message format for signaling an SRS parameter. At step 1020, the UE monitors a physical downlink control channel (PDCCH) for the DCI message format specified by the RRC message. At step 1030, the UE detects a DCI message having the DCI message format in the PDCCH. At step 1040, the UE transmits an SRS symbol over a component carrier according to the SRS configuration parameter associated with the DCI message format.

FIG. 11 is a flowchart of an embodiment method 1100 for performing channel estimation according to SRS transmissions, as may be performed by a base station. At step 1110, the base station transmits a Radio Resource Control (RRC) message specifying a Downlink Control Information (DCI) message format for signaling an SRS parameter. At step 1120, the base station transmits a DCI message having the DCI format over a physical downlink control channel (PDCCH). At step 1130, the base station receives an SRS symbol over a component carrier according to the SRS configuration parameter. At step 1140, the base station generates a channel estimate for the component carrier according to the SRS symbol.

Different UEs may have different uplink carrier aggregation capabilities. For example, some UEs may be able to simultaneously transmit uplink signals and/or receive downlink signals over different numbers of component carriers. Additionally, UEs may have different uplink RF retuning delays. The RF retuning delays may also be referred to as RF retuning times, RF retuning gaps, or in the context of SRS switching, SRS switching gaps, SRS switching times, etc. Embodiments of this disclosure allow base stations to tailor an uplink carrier switching configuration for a given UE based on uplink carrier aggregation capabilities of the UE.

FIG. 12 illustrates an embodiment communications sequence 1200 for assigning an uplink carrier switching configuration for a given UE based on uplink carrier aggregation capabilities of the UE. As shown, the UE 210 reports uplink carrier aggregation capabilities 1221 to the base station 220. The uplink carrier aggregation capabilities 1221 may specify the number of component carriers that the UE 210 is capable of transmitting uplink signals over at the same time and/or an uplink RF retuning delay of the UE 210. The base station 220 may then assign an uplink carrier switching configuration 1222 to the UE based on the uplink carrier aggregation capabilities 1221, and send the uplink carrier switching configuration 1222. The uplink carrier switching configuration 1222 may be communicated in various ways, such as via higher-layer signaling channel (e.g., in an RRC message), media access control (MAC) signaling channel, or a PDCCH (e.g., in a DCI message). Upon reception, the UE may transmit SRS symbols 1261, 1262, 1263 over the component carriers 1241, 1242, 1245 according to the uplink carrier switching configuration 1222.

Figure 15:
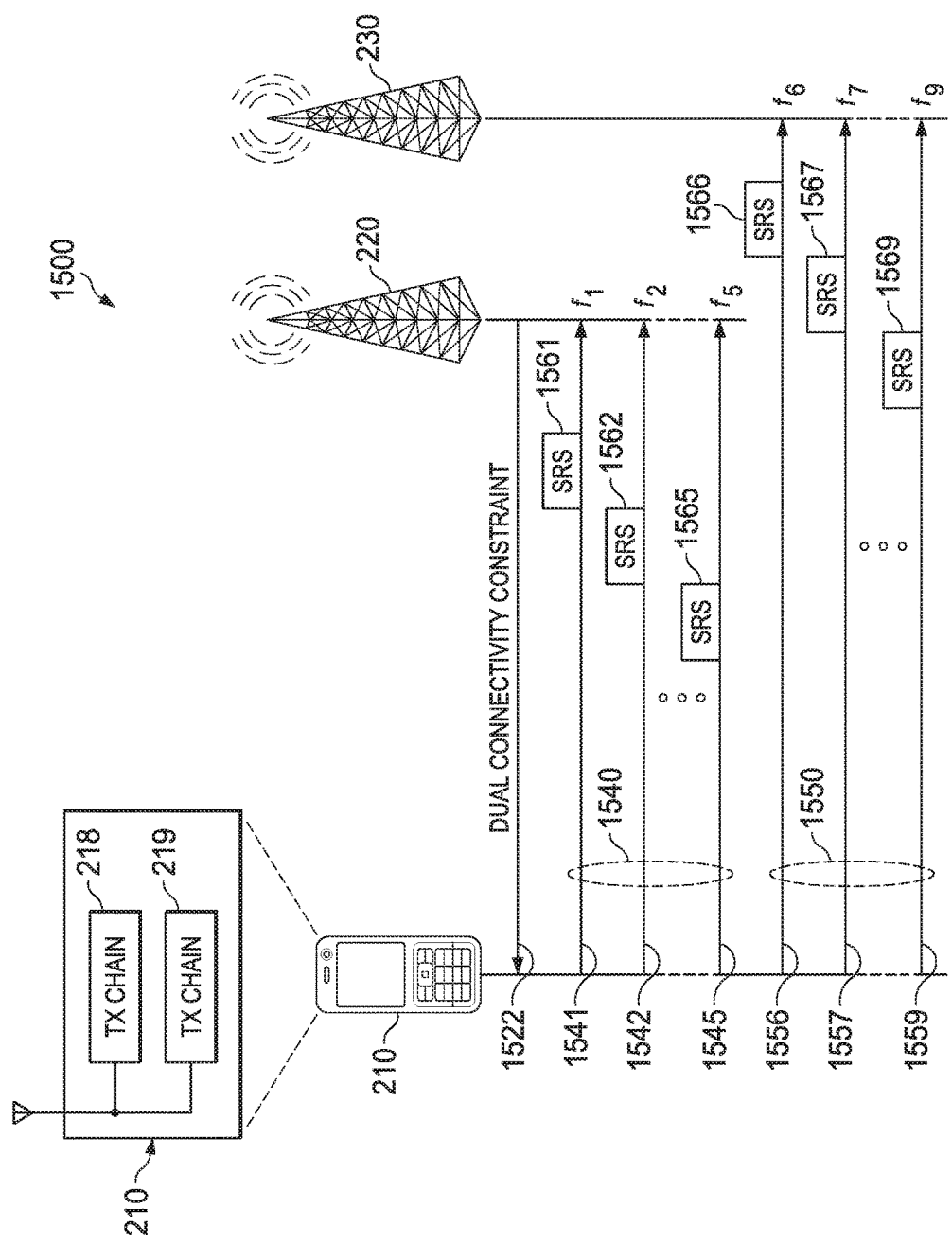
FIG. 15 is a diagram of a network for supporting SRS switching.

FIG. 13 is a flowchart of an embodiment method 1300 for assigning an uplink carrier switching configuration to a UE based on uplink carrier aggregation capabilities of the UE, as may be performed by a base station. At step 1310, the base station receives an uplink control signal indicating uplink carrier aggregation capabilities of a UE. At step 1320, the base station assigns an uplink carrier switching configuration to the UE based on the carrier aggregation capabilities of the UE. At step 1330, the base station sends a downlink control signal instructing the UE to transmit an SRS symbol over a set of aggregated component carriers based on the uplink carrier switching configuration FIG. 14 is a flowchart of an embodiment method 1400 for performing SRS transmissions over component carriers, as may be performed by a UE. At step 1410, the UE transmits an uplink control signal indicating uplink carrier aggregation capabilities of UE. At step 1420, the UE receives an uplink carrier switching configuration from the base station. At step 1430, the UE transmits an SRS symbol over a component carrier according to uplink carrier switching configuration In some embodiments, a UE may be assigned different sets of aggregated component carriers associated with different base stations. FIG. 15 is a diagram of a network 1500 in which the UE 210 is assigned a set of aggregated component carriers 1540 associated with the base station 220, as well as a set of aggregated component carriers 1550 associated with a base station 230. Each component carrier in the set of aggregated component carriers 1540, as well as the set of aggregated component carriers 1550, has a different sub-carrier frequency, as indicated by the labels (f1, f2, . . . f5, f6, f7 . . . f9). It should be appreciated that subscripts in the labels (f1, f2, . . . f5, f6, f7 . . . f9) do not imply, or otherwise denote, a relationship/order between sub-carrier frequencies of the corresponding component carriers 1541-1545, 1556-1557. By way of example, component carrier 1541 may have a higher sub-carrier frequency than component carrier 1542 in some embodiments, and a lower sub-carrier frequency than component carrier 1542 in other embodiments. Likewise, component carriers in a given set of aggregated component carriers are not necessarily contiguous, or otherwise consecutive with one another, in the frequency domain. By way of example, one or more sub-carrier frequencies of individual component carriers 1541, 1542, 1545 in the set of aggregated component carriers 1540 may be interleaved with one or more sub-carrier frequencies of individual component carriers 1551, 1552, 1555 in the set of aggregated component carriers 1550.

The UE 210 may receive downlink signals from, and/or transmit uplink signals to, the base station 220 over one or more of the component carriers 1541-1545 in the set of aggregated component carriers 1540 according to a carrier aggregation and/or carrier selection transmission scheme. Likewise, the UE 210 may receive downlink signals from, and/or transmit uplink signals to, the base station 230 over one or more of the component carriers 1551-1555 in the set of aggregated component carriers 1550 according to a carrier aggregation and/or carrier selection transmission scheme. The BS 220, 230 may be connected via a fast backhaul, which may be used to communicate data and/or control signaling related to carrier aggregation and/or coordinated multipoint (CoMP) transmissions. Alternatively, the BS 220 and 230 may be connected with non-ideal backhaul, and the scenario may be corresponding to a dual connectivity scenario and have multiple TAGs. Both are considered in this disclosure.

The base stations 220, 230 may be required to periodically, or aperiodically, perform channel estimation over the component carriers 1541-1545 and the component carriers 1551-1555 (respectively) in order to select which component carrier(s) will be used for uplink/downlink data transmissions, as well as to select the transmission parameters for the uplink/downlink data transmissions. Accordingly, the UE 210 may need transmit SRS symbols 1521, 1522, 1525 over the component carriers 1541, 1542, 1545 (respectively), as well as transmit SRS symbols 1566, 1567, 1569 over the component carriers 1556, 1557, 1559 (respectively). In some embodiments, the UE 210 may be incapable of simultaneously transmitting uplink signaling over all component carriers in the set of aggregated component carriers 1540 and/or the set of aggregated component carriers 1550, and as a result, may be required to perform SRS switching.

Notably, the propagation delay between the UE 210 and the base station 220 may be different than the propagation delay between the UE 210 and the base station 230. Because of this, uplink transmissions over the component carriers 1541, 1542, 1545 may require a different timing advance (TA) adjustment than uplink transmissions over component carriers 1541, 1542, 1545. In general, an initial uplink TA adjustment value is determined by random access procedure. In particular, the UE 210 generally would transmit random access preambles to the base stations 220, 230, which would then estimate a respective TA value based on a propagation delay associated with the random access preamble, send a corresponding random access response (RAR) specifying the TA value to the UE 210. Thereafter, the UE 210 would use the initial TA value to transmit SRS symbols, and other data, over the PUCCHs and/or PUSCHs, and the base stations 220, 230 would continuously update the TA values based on propagation delays measured according to the SRS symbols.

Having to perform a random access procedure may introduce significant latency into SRS switching procedures, as exchanging the random access preamble and/or RAR messages prior to SRS symbol transmission may unduly delay the SRS symbol transmission. To mitigate the latencies associated with random access procedures during SRS switching, the base station 220 sends a dual connectivity constraint 1522 to the UE 210. The dual connectivity constraint 1522 prohibits the UE 210 from switching from a source component carrier in the set of aggregated component carriers 1540 to a target component carrier in the set of aggregated component carriers 1550 during a set of time periods, and vice versa. Although the dual connectivity constraint 1522 is depicted as being transmitted by the base station 220, it should be appreciated that dual connectivity constraints can be transmitted by any network-side device, such as the base station 230 or a separate network controller.

In one example, the UE 210 accomplishes this by using different transmit chains (TX chains) to transmit uplink signaling over the respective sets of aggregated component carriers 1540, 1550. By way of example, the UE 210 may use the first TX chain 219 to transmit the SRS symbols 1561, 1562, 1565 over the component carriers 1541, 1542, 1545 (respectively) without using the TX chain 218 to transmit any of the SRS symbols 1566, 1567, 1569 over the component carriers 1556, 1557, 1559. Likewise, the UE 210 may use the TX chain 219 to transmit the SRS symbols 1565, 1566, 1569 over the component carriers 1555, 1556, 1559 (respectively) without using the TX chain 219 to transmit any SRS symbol over component carriers 1541, 1542, 1545 in the set of aggregated component carriers 15400.

Figure 16:
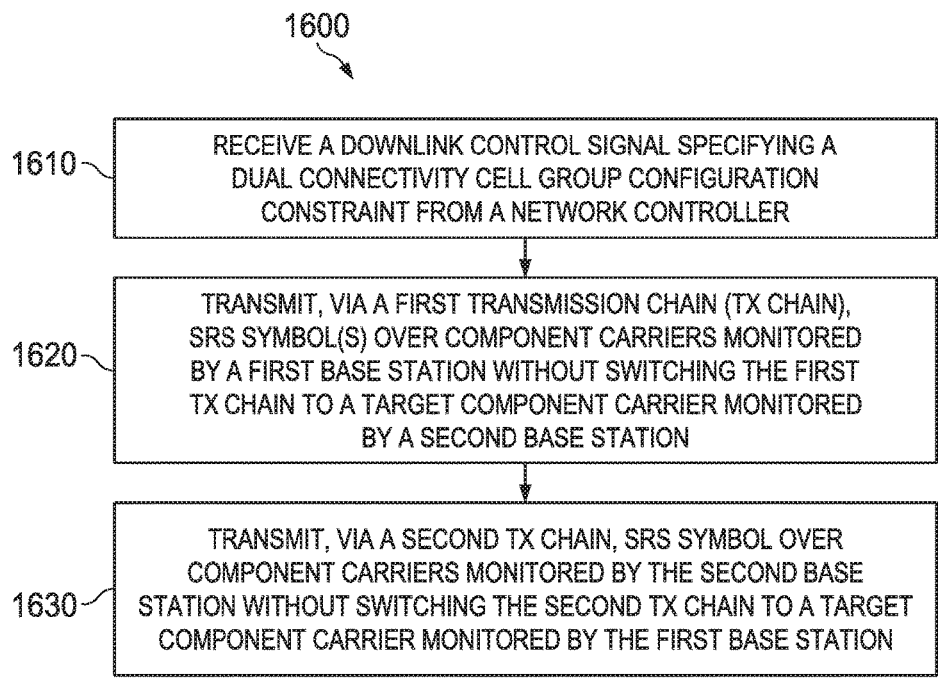
FIG. 16 is a flowchart of an embodiment method for transmitting SRS symbols.

FIG. 16 is a flowchart of an embodiment method 1600 for transmitting SRS symbols over different sets of aggregated component carriers based on a dual connectivity constraint, as may be performed by a UE. At step 1610, the UE receives a downlink control signal specifying a dual connectivity cell group configuration constraint from a network controller. At step 1620, the UE uses a first transmission chain (TX chain) to transmit SRS symbols over component carriers in monitored by a first base station without switching the first TX chain to a target component carrier monitored by a second base station. At step 1630, the UE uses a second TX chain to transmit SRS symbols over component carriers monitored by the second base station without switching the second TX chain to a target component carrier monitored by the first base station.

The dual connectivity constraint may be primarily used when there is no fast backhaul between base stations 220 and 230, and may not be applied in scenarios where there is a fast backhaul connection between the base stations 220 and 230.

When a TX and/or RX chain is adjusted switched from a source component carrier to a target component carrier, there is generally an RF retuning delay associating with adjusting hardware components of the TX or RX chain from source sub-carrier frequency to the target sub-carrier frequency.

Figure 17:
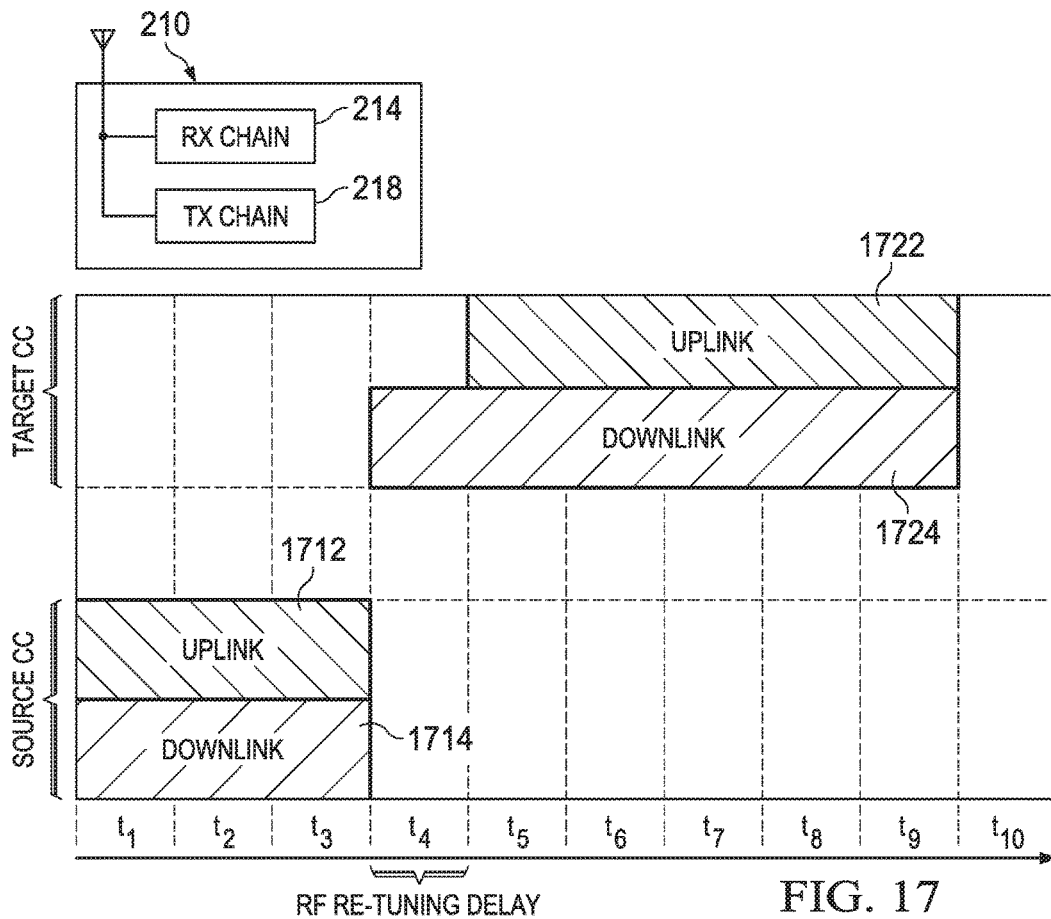
FIG. 17 is a diagram of transmissions that occur prior to, and immediately after, a UE 210 switches from a source component carrier to a target component carrier.

The downlink RF retuning delay of a UE may be approximately equal to an uplink RF retuning delay of the UE in instances where both a TX chain and an RX chain are switched from a source component carrier to a target component carrier. FIG. 17 illustrates an example of transmissions that occur prior to, and immediately after, the UE 210 is switched from a source component carrier to a target component carrier at period $t_3$. In this example, an RX chain 214 of the UE 210 is used to receive both the downlink signal 1714 over the source component carrier and the downlink signal 1724 over the target component carrier, and the TX chain 218 of the UE 210 is used to transmit both the uplink signal 1712 over the source component carrier and the uplink signal 1722 over the target component carrier. Because of this, both the TX chain 218 and the RX chain 214 need to be adjusted to the center frequency of the target component carrier when the UE 210 switches to the target component carrier at the beginning of period t4, and as a result, both the downlink RF re-tuning delay and the uplink RF retuning delay have a duration that is approximately equal to period $t_4$. Consequently, the base station associated with the target component carrier should not begin sending the downlink transmission 1724 until period $t_5$ and should not expect to begin receiving the uplink transmission 1722 until period $t_5$. Other examples may also exist, such as when component carriers are time division duplexed (TDD) such that uplink and downlink transmissions do not overlap in the time domain. In such examples, SRS switching may be performed for an uplink TX chain, and the downlink RX chain may monitor both the source and target component carriers at the same time without switching.

The downlink RF retuning delay of a UE may be approximately zero, or otherwise much less than the uplink RF retuning delay of the UE, in instances where only the TX chain of the UE is switched from a source component carrier to a target component carrier, as may occur in instances where the UE includes sufficiently decoupled RX chains assigned to the source and target component carriers.

Figure 18:
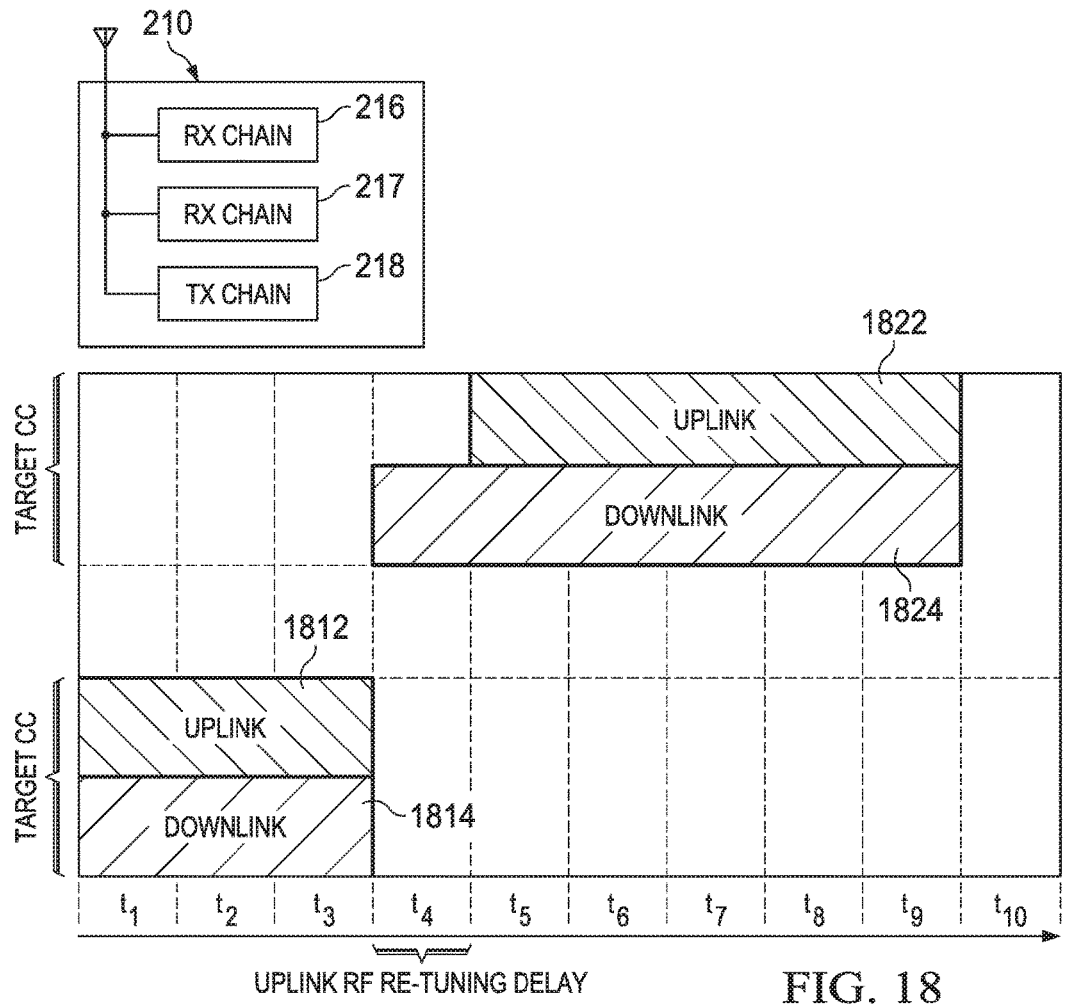
FIG. 18 is a diagram of transmissions that occur prior to, and immediately after, a UE 210 switches from a source component carrier to a target component carrier.

FIG. 18 illustrates an example of transmissions that occur prior to, and immediately after, a UE 210 is switched from a source component carrier to a target component carrier. In this example, an RX chain 216 of the UE 210 is used to receive the downlink signal 1814 over the source component carrier, an RX chain 217 of the UE 210 is used to receive the downlink signal 1824 over the target component carrier, and the TX chain 218 of the UE 210 is used to transmit both the uplink signal 1812 over the source component carrier and the uplink signal 1822 over the target component carrier, via carrier switching. Because of this, only the TX chain 218 needs to be adjusted to the center frequency of the target component carrier when the UE 210 switches to the target component carrier at the beginning of period t4. As a consequence, the UE 210 experiences minimal downlink RF re-tuning delay, meaning that the base station associated with the target component carrier may begin the downlink transmission 1824 during period $t_4$, but should not expect to being receiving the uplink transmission 1822 until period $t_5$. Other examples may also exist, such as when component carriers are time division duplexed (TDD) such that uplink and downlink transmissions do not overlap in the time domain. In such examples, SRS switching may be performed for an uplink TX chain, and the downlink RX chain may monitor both the source and target component carriers at the same time without switching.

Figure 19:
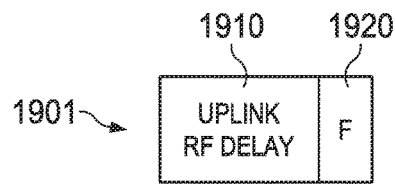
FIG. 19 is a diagram of a frame format for an uplink control message that signals uplink and downlink RF re-tuning delays of a UE.

Because the duration of a UE's uplink/downlink RF retuning delays impact the timing of uplink and downlink transmissions over the target component carrier, it may be helpful, or even necessary, for a UE to notify a base station of those RF retuning delays. Embodiments of this disclosure provide a low-overhead frame format for signaling a UE's uplink/downlink RF retuning delays. FIG. 19 is a diagram of a frame format of an uplink control message 1901 for signaling uplink and downlink RF re-tuning delays of a UE. The uplink control message 1901 includes an uplink RF retuning delay field 910 and a flag field 920. The uplink RF retuning delay field 910 may consists of two or more bits indicating a duration of a UE's uplink RF retuning delay. The bits may express the duration of the UE's uplink RF retuning delay as fractions of an OFDM symbol duration, e.g., 0 symbol duration, 0.5 symbol duration, 1 symbol duration, 1.5 symbol duration, etc. The flag field 920 may consist of a single bit that either is set to a first value to indicate that a downlink RF retuning delay of the UE is equal to the uplink RF retuning delay indicated by the field 910 or is set to a second value to indicate that the downlink RF retuning delay of the UE is equal to zero (or is otherwise below a lower threshold).

Figure 20:
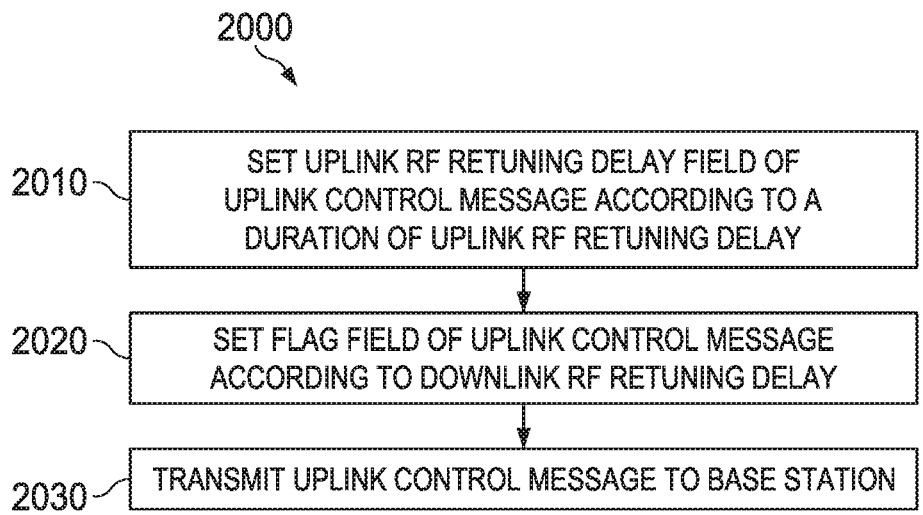
FIG. 20 is a flowchart of an embodiment method for signaling uplink and downlink RF re-tuning delays of a UE.

FIG. 20 is a flowchart of an embodiment method 2000 for signaling uplink and downlink RF re-tuning delays of a UE, as may be performed by the UE. At step 2010, the UE sets an uplink RF retuning delay field of an uplink control message to indicate a duration of the UE's uplink RF retuning delay. At step 2020, the UE sets a flag field of the uplink control message according to a downlink RF retuning delay. In particular, the UE sets the flag field to a first value when the downlink RF retuning delay of the UE is equal to the uplink RF retuning delay or to a second value when the downlink RF retuning delay of the UE is equal to zero (or is otherwise below a lower threshold). The flag field may be referred to as a downlink RF retuning field in some cases.

Figure 21:
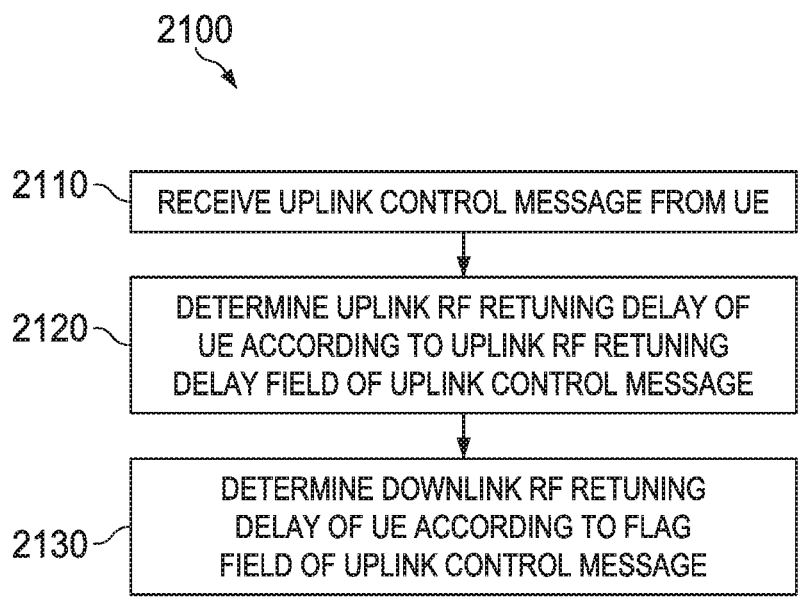
FIG. 21 is a flowchart of an embodiment method 2100 for determining uplink and downlink RF re-tuning delays of a UE.

FIG. 21 is a flowchart of an embodiment method 2100 for determining uplink and downlink RF re-tuning delays of a UE, as may be performed by a base station. At step 2110, the base station Receives an uplink control message from the UE. At step 2120, the base station determines an uplink RF retuning delay of the UE according to an uplink RF retuning delay field of the uplink control message. At step 2130, the base station determines a downlink RF retuning delay of the UE according to a flag field of the uplink control message.

As discussed above, a UE may be instructed to periodically transmit SRS symbols over component carriers in a set of aggregated component carriers according to a periodic SRS switching schedule. In some cases, one of the component carriers in the set of aggregated component carriers may be deactivated before a duration of the periodic SRS switching schedule is over. In such a case, the UE may need to adapt the periodic SRS switching schedule to compensate for the deactivated carrier. In embodiments of this disclosure, a UE is preconfigured to adapt the periodic SRS switching schedule in the event that a component carrier is deactivated.

Figure 22:
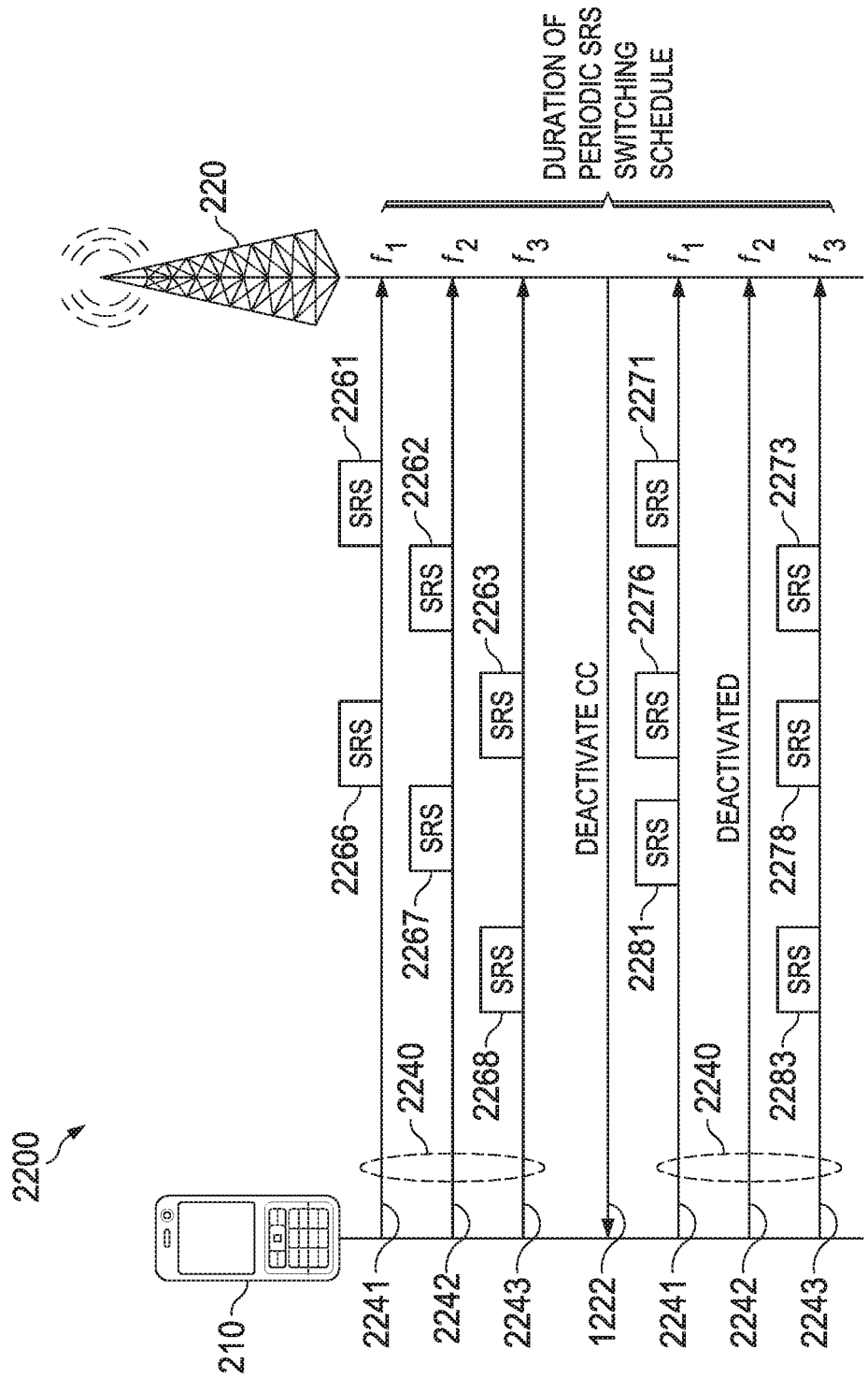
FIG. 22 is a diagram of an embodiment communications sequence for adapting a periodic SRS switching schedule in response to deactivation of a component carrier.

FIG. 22 illustrates an embodiment communications sequence 2200 for adapting a periodic SRS switching schedule in response to deactivation of a component carrier. In this example, the UE 210 has been instructed to periodically transmit SRS symbols over component carriers 2241, 2242, 2243 in a set of aggregated component carriers 1240. Accordingly, the UE 210 periodically transmits the SRS symbols 2261-2268 over the component carriers 2241, 2242, 2243 during a first set of time periods. At some point before the duration of the SRS switching schedule ends, the UE 210 receives a deactivate component carrier message 1222 indicating that the component carrier 2242 has been deactivated. The UE 210 is preconfigured to adapt the SRS switching schedule to compensate for deactivation of the component carrier 2242, and as a result the UE 210 transmits the SRS symbols 2271-2283 over the component carriers 2241, 2243 during a second set of time periods without transmitting any SRS symbols over the deactivated component carrier 2242 during the second set of time periods.

Figure 23:
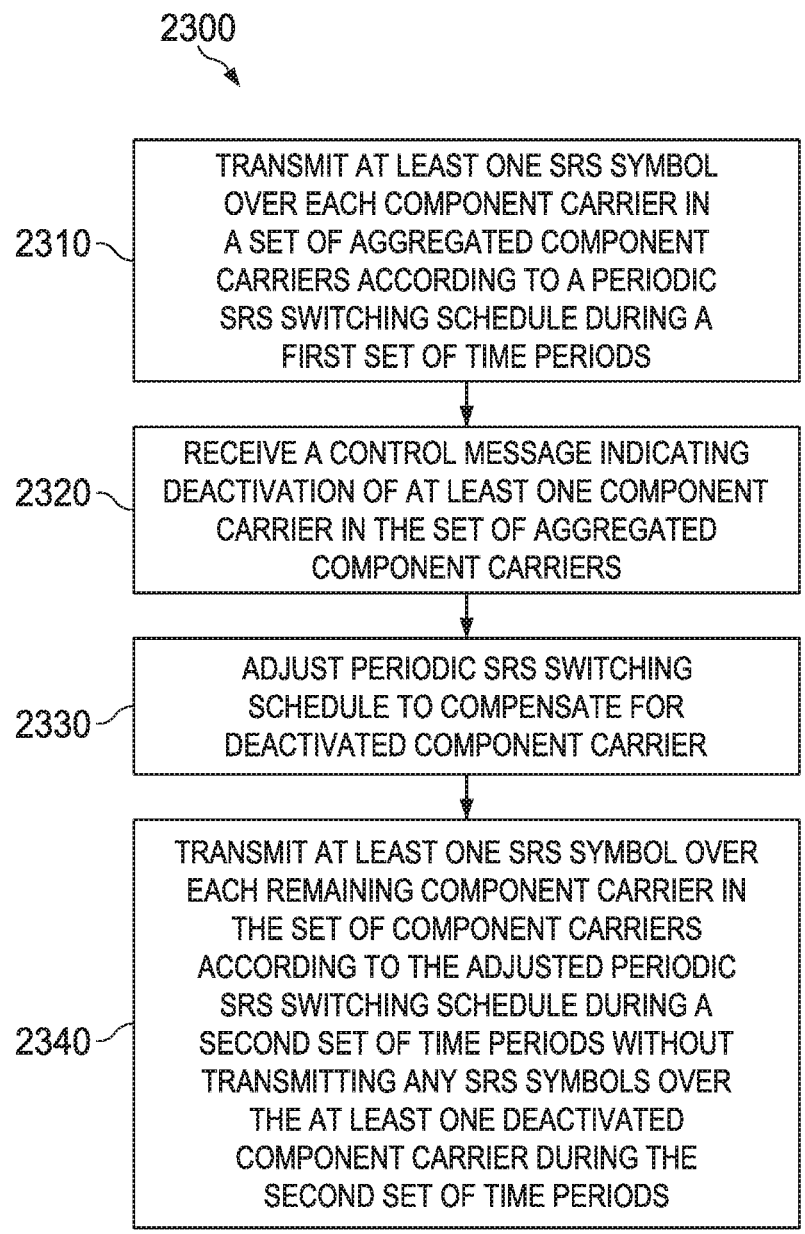
FIG. 23 is a flowchart of an embodiment method for adapting a periodic SRS switching schedule in response to deactivation of a component carrier.

FIG. 23 is a flowchart of an embodiment method 2300 for adjusting a periodic SRS transmission schedule in response to activation of a component carrier, as may be performed by a UE. At step 2310, the UE transmits at least one SRS symbol over each component carrier in a set of aggregated component carriers according to SRS switching configuration during a first set of time periods. At step 2320, the UE receives a control message indicating deactivation of at least one component carrier in the set of aggregated component carriers. The control message may be a media access control (MAC) message, or another type of control message (E.g., a DCI message, an RRC message, etc.), or implicit via an expiration of an activation timer not reset due to new activities. At step 2330, the UE adjusts the periodic SRS switching schedule to compensate for the deactivated component carrier. This adjustment may include re-assigning periodic SRS symbol transmissions from the deactivated component carrier to one of the remaining active component carriers. Alternatively, the adjustment may include removing the deactivated component carrier from the periodic schedule (e.g., a round robin schedule, etc.), such that SRS symbols are transmitted over the remaining activate component carriers on a more frequent basis. At step 2340, the UE transmits at least one SRS symbol over each remaining component carrier in the set of aggregated component carriers according to the adjusted periodic SRS switching schedule during a second set of time periods without transmitting any SRS symbols over the at least one deactivated component carrier during the second set of time periods.

In some scenarios, a base station may want to broadcast a control message that includes multiple SRS parameters (including SRS power control and/or SRS triggers) for one or multiple UEs. Embodiments of this disclosure communicate flag bits within the control message, or separately via higher-layer signaling, that notify the individual UEs of the location of their corresponding SRS instruction amongst the multiple SRS instructions embedded within the control message. FIGS. 24A-24D illustrate frame formats for control messages 2410, 2420, 2430, 2440 carrying multiple SRS instructions 2456-2459. Each of the SRS instructions 2456-2459 may be intended for a different UE, and may have different lengths depending on the information (e.g., SRS parameters, etc.) being conveyed by the SRS instructions.

Figure 24:
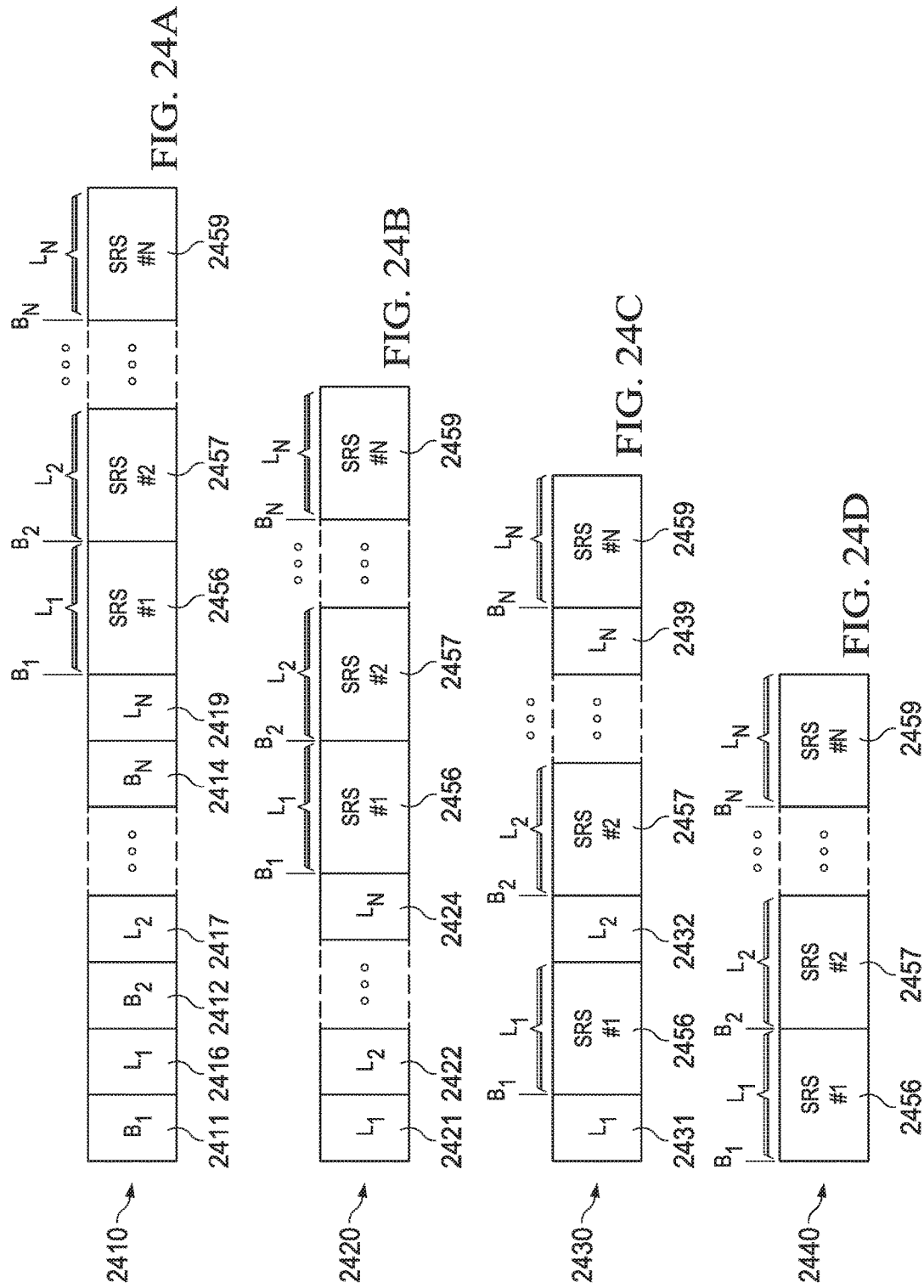
FIGS. 24A-24D are diagrams of frame formats for control messages that carrying SRS instructions.

As shown in FIG. 24A, the control message 2410 includes flag bits 2411-2419 and the SRS instructions 2456-2459. The flag bits 2411-2419 can be used to locate the SRS instructions 2456-2459 within the control message 2410. The flag bit 2411 indicates a starting bit location (B1) for the SRS instruction 2456. The flag bit 2416 indicates a length (L1) of the SRS instruction 2456. The flag bits 2411, 2416 can therefore be used by a corresponding UE to identify the location of the SRS instruction 2456. Likewise, the flag bit 2412 indicates a starting bit location ($B_2$) for the SRS instruction 2457, the flag bit 2417 indicates a length ($L_2$) of the SRS instruction 2457, the flag bit 2414 indicates a starting bit location ($B_N$) for the SRS instruction 2459, and the flag bit 2419 indicates a length ($L_N$) of the SRS instruction 2456.

Similarly, as shown in FIG. 24B, the control message 2420 includes flag bits 2421-2424 that can be used to locate the SRS instructions 2456-2459 within the control message 2410. The flag bit 2421 indicates a length (L1) of the SRS instruction 2456, the flag bit 2422 indicates a length ($L_2$) of the SRS instruction 2457, and the flag bit 2424 indicates a length ($L_N$) of the SRS instruction 2459. The starting bit location (B1) of the SRS instruction 2456 may be a priori information of UEs that receive the control message 2420. Alternatively, the starting bit location (B1) of the SRS instruction 2456 may be signaled by a separate flag bit that is not shown in FIG. 24B. Based on knowledge of the starting bit location (B1) of the SRS instruction 2456, an intended recipient of the SRS instruction 2456 can use the flag bit 2421 to locate the SRS instruction 2456. Likewise, an intended recipient of the SRS instruction 2457 determine the starting bit location (B2) of the SRS instruction 2457 by adding the number of bits indicated by the flag bit 2421 to the starting bit location (B1) of the SRS instruction 2456, and then use the flag bit 2422 to locate the SRS instruction 2457. In a similar way, an intended recipient of the SRS instruction 2459 can add a summation of the number bits indicated by all flag bits preceding the flag bit 2424 to the starting bit location (B1) to determine the starting bit location (BN) of the SRS instruction 2459, and then use the flag bit 2424 to locate the SRS instruction 2457.

In the control message 2430 depicted by FIG. 24C, the flag bits 2431-2434 are interleaved with their corresponding SRS instructions 2456-2459. Similar to the control message 2420, the flag bit 2431 indicates a length (L1) of the SRS instruction 2456, the flag bit 2432 indicates a length ($L_2$) of the SRS instruction 2457, and the flag bit 2434 indicates a length ($L_N$) of the SRS instruction 2459. An intended recipient of the SRS instruction 2456 can use the flag bit 2431 to locate the SRS instruction 2456. An intended recipient of the SRS instruction 2457 can use the flag bit 2431 to locate the flag bit 2432, and the use the flag bit 2432 to locate the SRS instruction 2457. The intended recipient of the SRS instruction 2459 can locate the flag bit 2439 based on all of the flag bits preceding the flag bit 2439, and then use the flag bit 2439 to locate the SRS instruction 2459. As yet another alternative, one or more of the flag bits discussed above may be transmitted via higher layer signaling, and then used to locate the SRS instructions 2456-2459 in the control message 2440 depicted by FIG. 24D.

Figure 25:
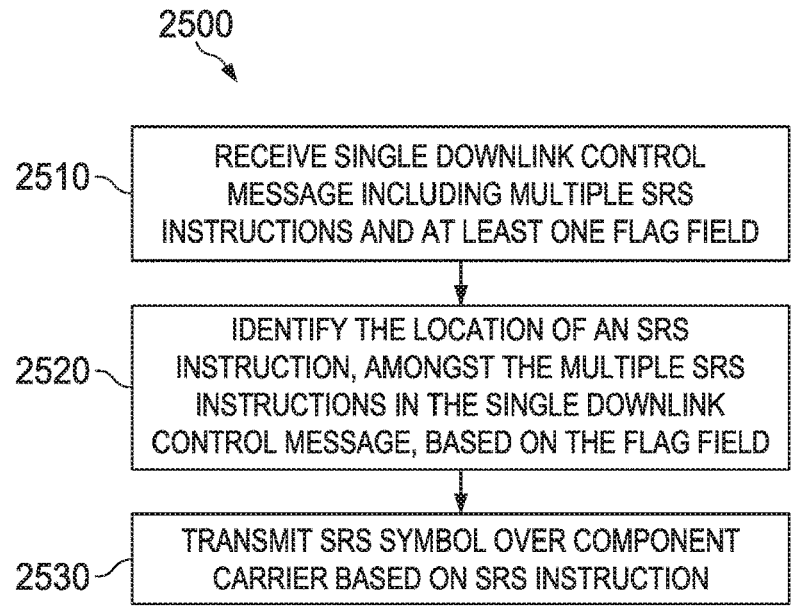
FIG. 25 is a flowchart of an embodiment method for locating an SRS instruction in a control message.

FIG. 25 is a flowchart of an embodiment method 2500 for locating an SRS parameter in a control message, as may be performed by a UE. At step 2510, the UE receives a single downlink control message including multiple SRS parameters and one flag field. At step 2520, the UE Identifies the location of an SRS instruction, amongst the multiple SRS instructions in the single downlink control message, based on the flag field. At step 2530, the UE transmits an SRS symbol over a component carrier based on the SRS instruction.

Figure 26:
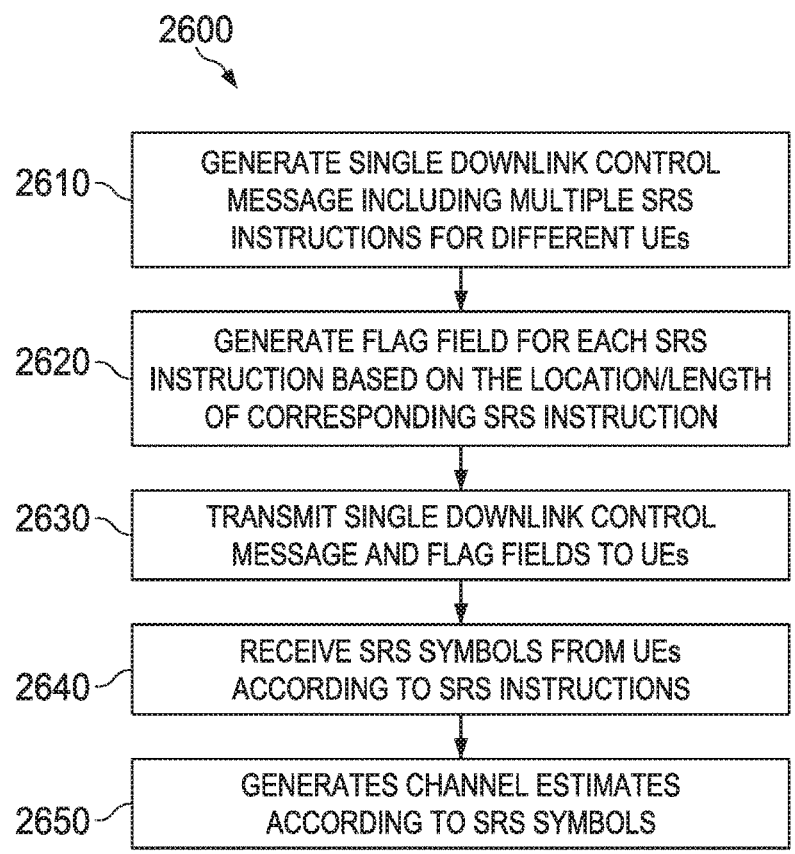
FIG. 26 is a flowchart of another embodiment method for performing channel estimation based on SRS symbols.

FIG. 26 is a flowchart of an embodiment method 2600 for sending a control message that includes SRS instructions for different UEs, as may be performed by a base station. At step 2610, the base station generates a single downlink control message including multiple SRS instructions. At step 2620, the base station generates one flag field for each SRS instruction based on the location and/or length of the SRS instruction. At step 2630, the base station transmits the single downlink control message and the flag fields to the UEs. At step 2640, the base station receives SRS symbols from UEs according to the SRS instructions embedded in the single downlink control message. At step 2650, the base station generates channel estimates according to the SRS symbols.

Figure 27:
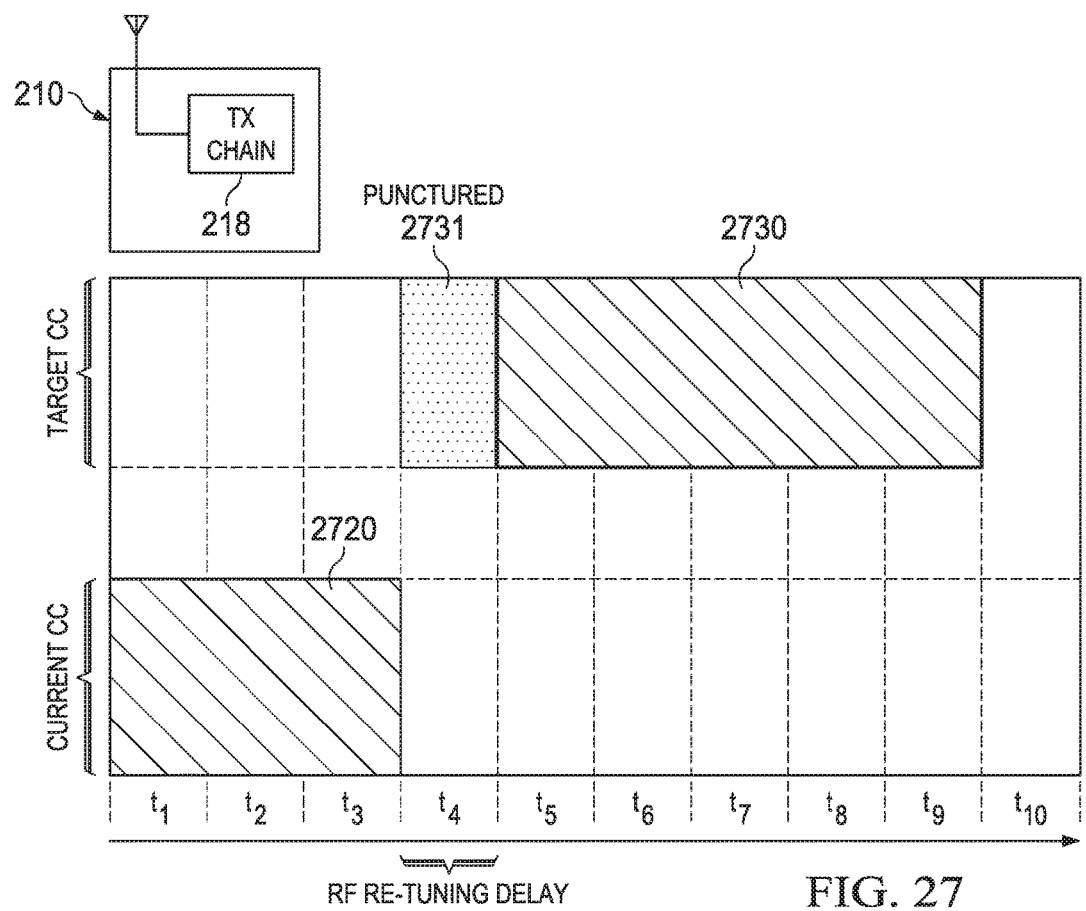
FIG. 27 is a diagram of uplink transmissions that occur prior to, and immediately after, a UE switches from a source component carrier to a target component carrier.

In some embodiments, a UE may puncture a portion of an uplink signal transmitted over a target component carrier that overlaps with an uplink RF retuning delay after switching from a source component carrier to the target component carrier. FIG. 27 illustrates uplink transmissions 2730 that occur prior to, and immediately after, a UE 210 switches from a source component carrier to a target component carrier. In this example, a TX chain 218 of the UE 210 is used to transmit both the uplink signal 2720 over the source component carrier and the uplink signal 2730 over the target component carrier. As a consequence, the UE 210 an uplink RF retuning delay with a duration equal to period $t_4$. In this example, the uplink transmission 2730 is scheduled over periods $t_4$ through $t_{10}$. To compensate for the uplink RF retuning delay, the UE 210 punctures a portion 2731 of the uplink transmission 2730 that overlaps with the period $t_4$. In one embodiment, the UE 210 may perform a rate adjustment (e.g., rate matching) for the non-punctured portion of the uplink transmission 2730 to compensate for bandwidth lost from puncturing the portion 2731. The puncturing may occur on the source component carrier and/or on the target component carrier. Similarly, puncturing or rate matching in DL may also occur.

Figure 28:
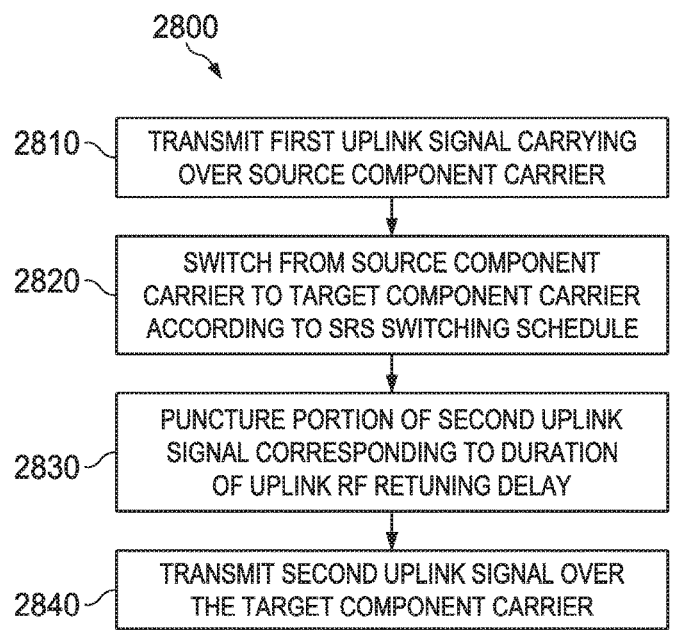
FIG. 28 is a flowchart of an embodiment method for puncturing an uplink signal to compensate for an uplink RF re-tuning delay.

FIG. 28 is a flowchart of an embodiment method 2800 for compensating for an uplink RF retuning delay after switching from a source component carrier to a target component carrier, as may be performed by a UE. At step 2810, the UE transmits a first uplink signal carrying at least a first SRS symbol over a first component carrier. At step 2820, the UE switches from the source component carrier to a target component carrier according to an SRS switching schedule. At step 2830, the UE punctures a portion of a second uplink signal corresponding to a duration of an uplink RF retuning delay. At step 2840, the UE transmits the second uplink signal over the target component carrier.

Embodiments of this disclosure provide techniques for handling scheduling conflicts between SRS symbols and other uplink signals. In particular, some types of uplink signals may be scheduled over a primary component carrier at the same time in which the UE is scheduled to transmit an SRS symbol over a secondary component carrier. If the uplink signal scheduled over the primary component carrier satisfies a criterion, then the UE may prioritize transmission of the uplink signal over the primary component carrier, and delay, or otherwise cancel, the scheduled transmission of the SRS symbol over the secondary component carrier.

Figure 29:
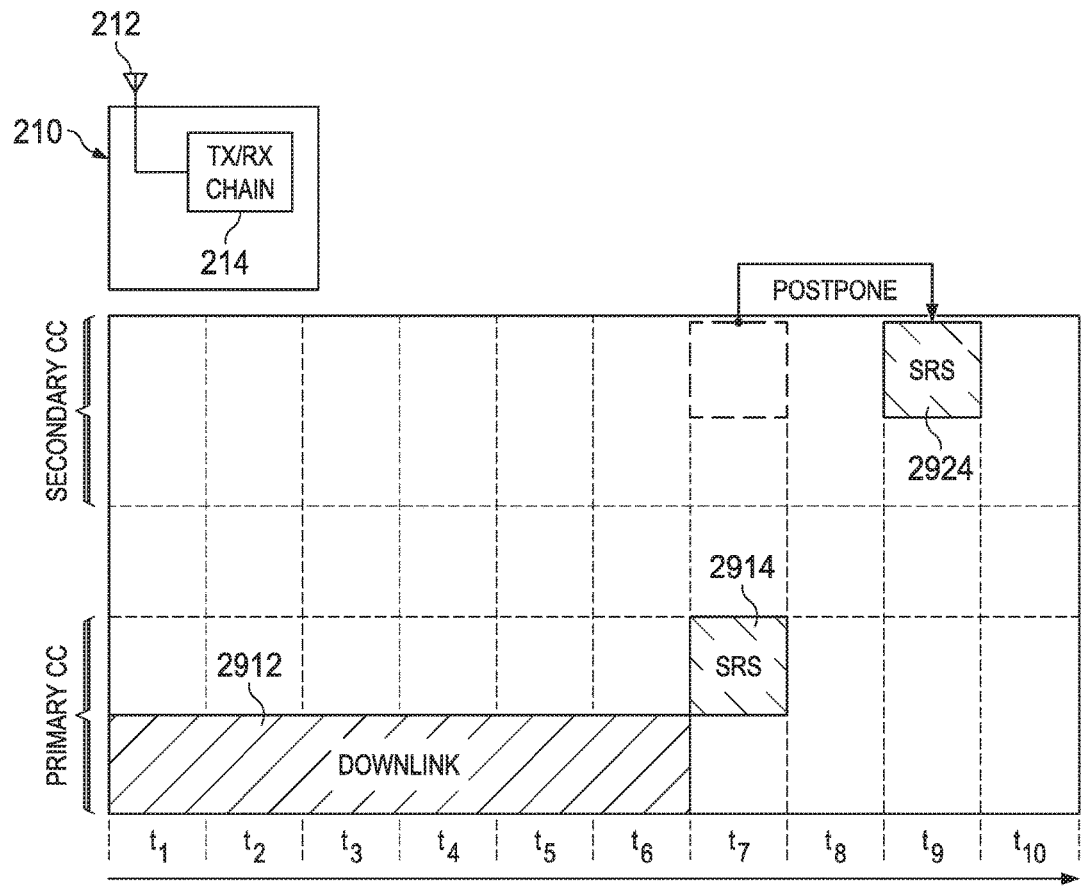
FIG. 29 is a diagram of transmissions that occur prior to, and immediately after, a UE switches from a source component carrier to a target component carrier.

FIG. 29 illustrates transmissions that occur prior to, and immediately after, a UE 210 switching from a primary component carrier to a secondary component carrier. In this example, a TX chain 214 of the UE 210 is used to transmit both receive the downlink signal 2912 and transmit the uplink acknowledgement (ACK) and/or NACK message 2914 over the primary component carrier, as well as to transmit the SRS symbol 2924 over the secondary component carrier. The ACK message 2914 indicates to a base station associated with the primary component carrier that the downlink transmission 2912 was successfully decoded by the UE. The ACK message 2914 is scheduled to be transmitted over the primary component carrier during the same period $t_7$ in which the SRS symbol 2924 is initially scheduled to be transmitted over the secondary component carrier. In this example, the ACK message 2914 is given precedent, and the SRS symbol is delayed until period $t_9$. The period t9 may be the next-available opportunity for transmitting the SRS symbol 2924 over the secondary component carrier. In other examples, the SRS symbol may be delayed indefinitely.

Although in FIG. 29, the ACK message 2914 is prioritized over the SRS symbol 2924, it should be appreciated that other uplink symbols (e.g., channel state information (CSI) messages, etc.) may also be given priority over an SRS symbol transmission.

Figure 30:
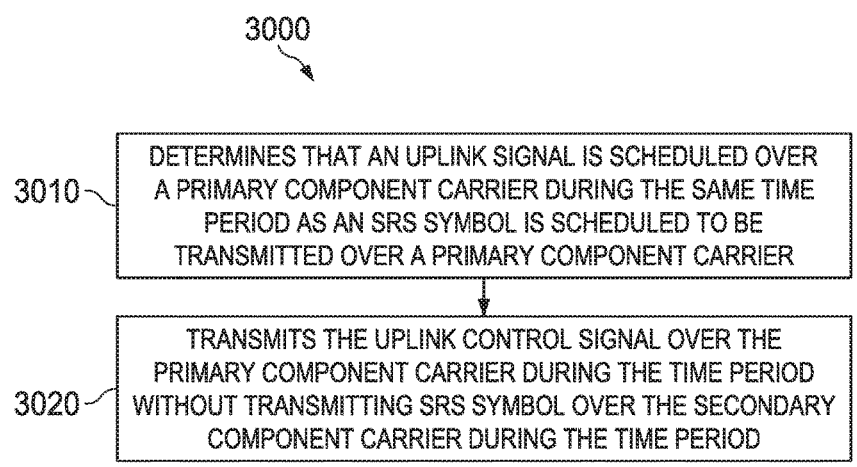
FIG. 30 is a flowchart of an embodiment method for collision handling during SRS switching.

FIG. 30 is a flowchart of an embodiment method 2800 for collision handling during SRS switching, as may be performed by a UE. At step 3010, the UE determines that an uplink signal is scheduled over a primary component carrier during the same time period as an SRS symbol is scheduled to be transmitted over a primary component carrier. At step 3020, the UE transmits the uplink control signal over the primary component carrier during the time period without transmitting SRS symbol over the secondary component carrier during the time period.

Figure 31:
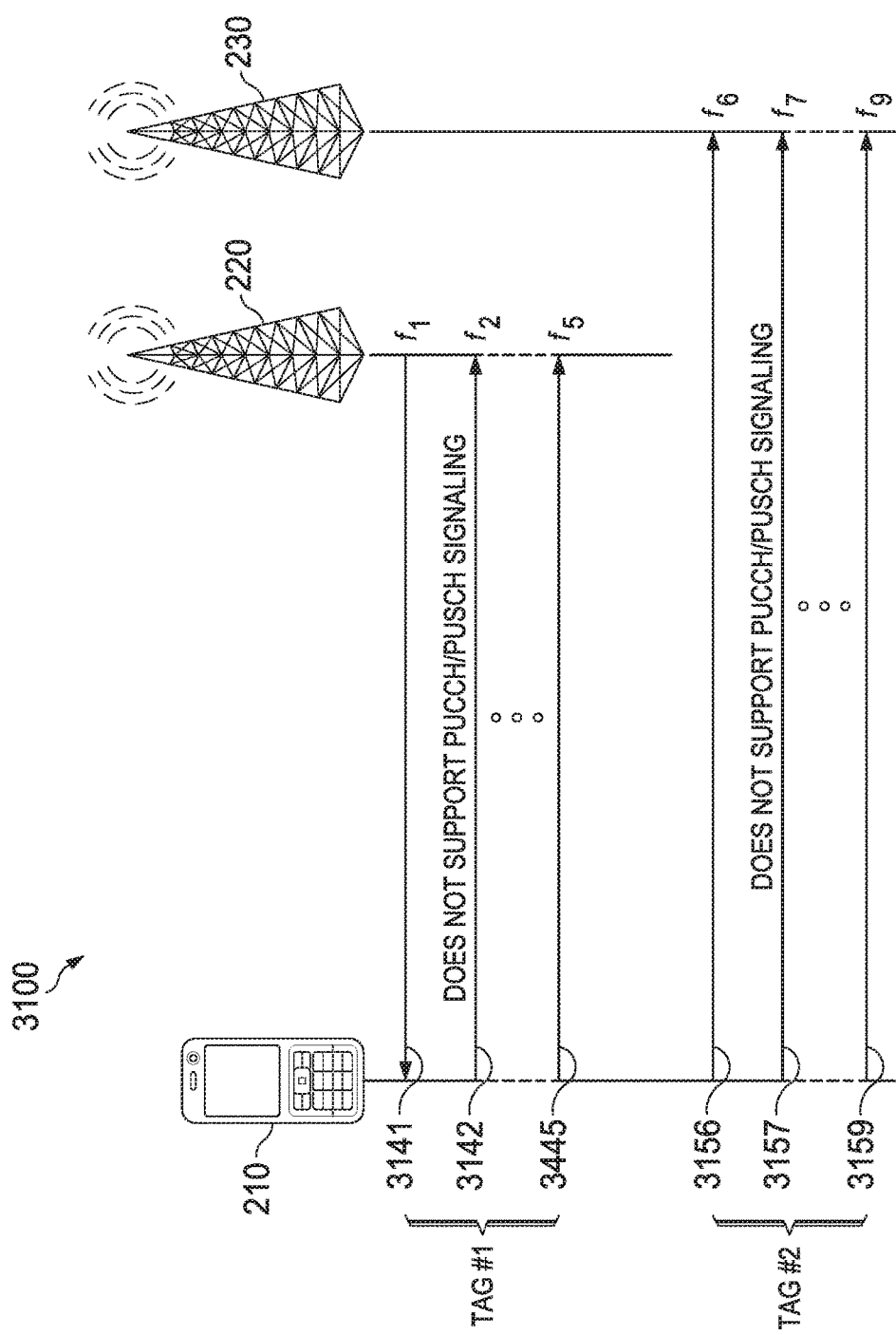
FIG. 31 is a diagram of a network for supporting SRS switching.

In some embodiments, groups of component carriers being monitored by the same may be associated with a common timing advance group (TAG). One or more component carriers in a timing advance group may not support PUCCH/PUSCH signaling. FIG. 31 is a diagram of a network 3000 in which the UE 210 is assigned component carriers 3141, 3142, 3145 associated with a first TAG (TAG #1), as well as component carriers 3156, 3157, 3159 assigned to a second TAG (TAG #2). The UE 210 may use the same TA adjustment value when transmitting uplink signals (e.g., SRS symbols, etc.) over the component carriers 3141, 3142, 3145 associated with the TAG #1. Likewise, the UE 210 may use the same TA adjustment value when transmitting uplink signals (e.g., SRS symbols, etc.) over the component carriers 3156, 3157, 3159 assigned to the TAG #2. In this example, the component carrier 3142 and the component carrier 3157 do not support PUCCH/PUSCH signaling.

Figure 32:
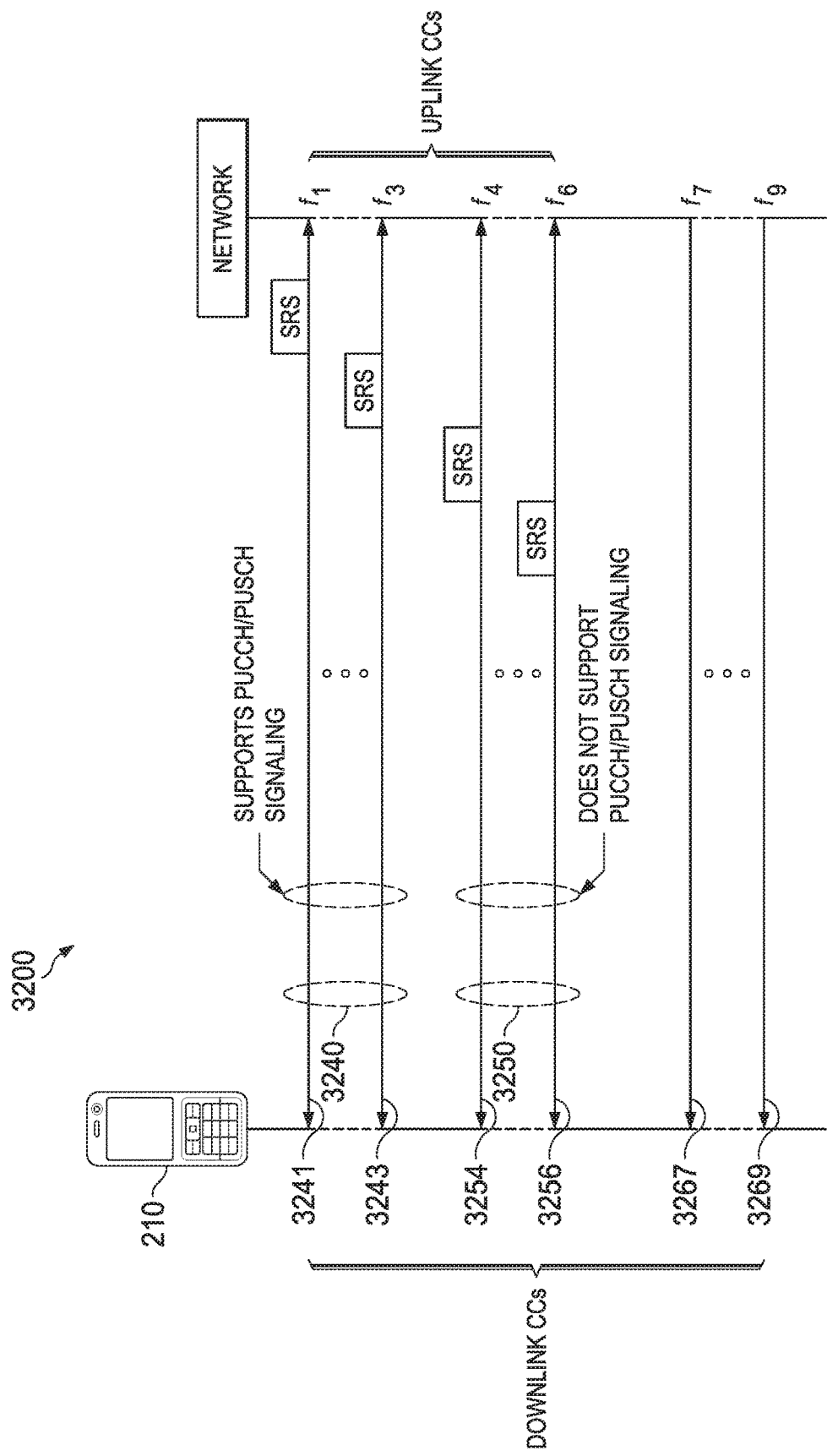
FIG. 32 is a diagram of a network for supporting SRS switching.

FIG. 32 is a diagram of a network 3200 in which a UE 210 transmits SRS symbols over component carriers 3241-3243 in the group of aggregated component carriers 3240, as well as over component carriers 3254-3256 in the group of aggregated component carriers 3250. Component carriers 3241-3243 in the group of aggregated component carriers 3240 support PUCCH/PUSCH signaling, while component carriers 3254-3256 in the group of aggregated component carriers 3250 do not support PUCCH/PUSCH signal(ing), and only SRS and possibly RACH may be supported. The UE 210 receives downlink signaling from the network over component carriers 3241-3243 in the group of aggregated component carriers 3240 and component carriers 3254-3256 in the group of aggregated component carriers 3250, as well as over component carriers 3267-3269. The downlink signaling may be received over two or more of the component carriers 3241-3243, 3254-3256, 3267-3269 in instance where carrier aggregation is applied.

Figure 33:
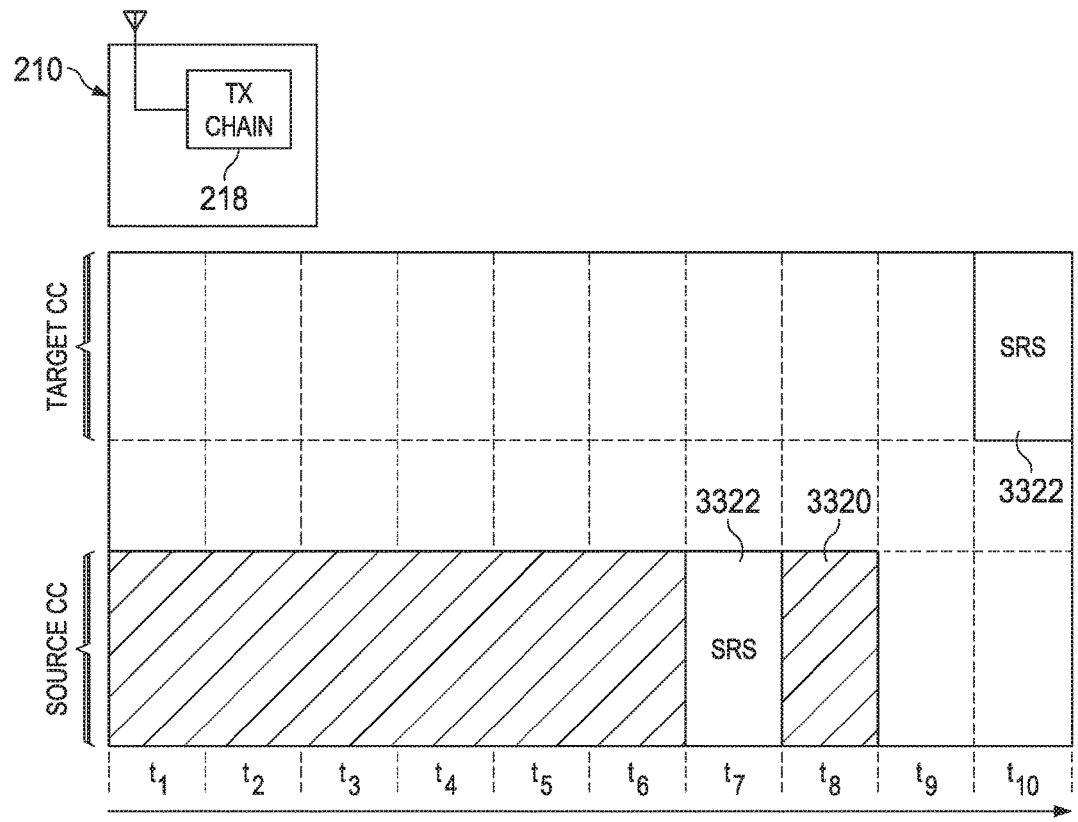
FIG. 33 is a diagram of transmissions that occur in a subframe during an SRS switching operation.

In some embodiments, an uplink RF tuning delay may be experienced during SRS switching. FIG. 33 is a diagram of uplink transmissions that occur during an SRS switching operation. In this example, a TX chain 218 of the UE 210 is used to transmit the uplink signal 3220 over the source component carrier and the SRS symbol 3332 over the target component carrier. The UE 210 experiences an uplink RF retuning delay with a duration equal to period $t_9$. The uplink signal 3320 carries an SRS symbol 3322. Transmission characteristics of the SRS symbol 3322, such as a transmit power level, may be based on characteristics of a PUSCH/PUCCH signaling in the uplink signal 3320. Transmission characteristics of the SRS symbol 3332 may be independent of PUSCH/PUCCH signaling.

Figure 34:
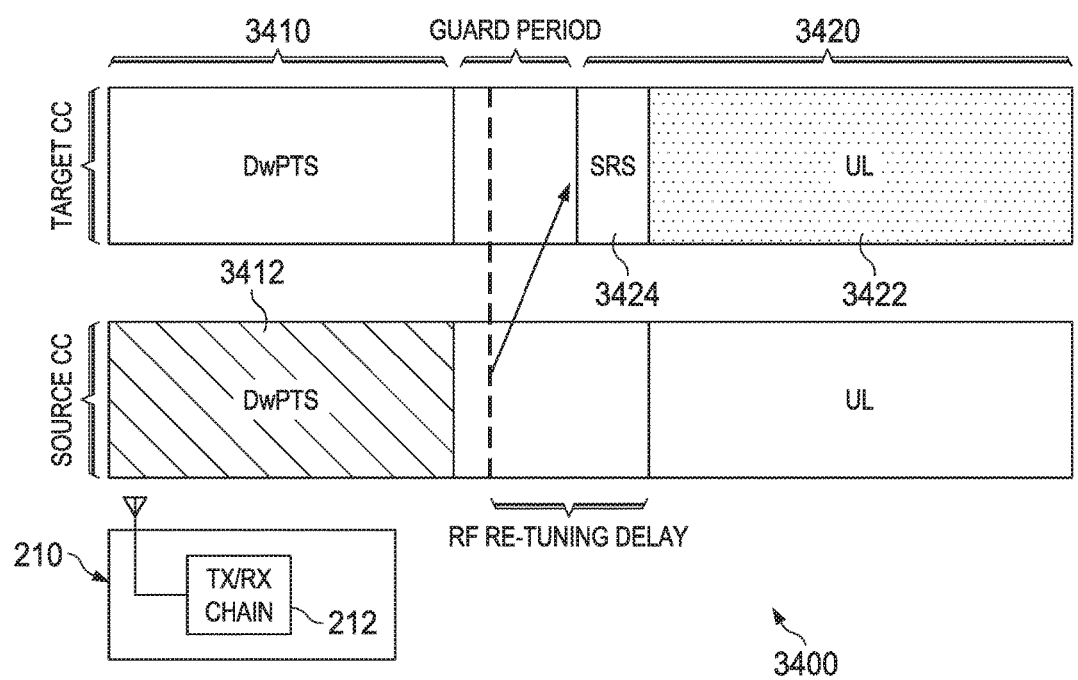
FIG. 34 is another diagram of transmissions that occur in a subframe during an SRS switching operation.

In some embodiments, SRS switching is performed over a time division duplexed (TDD) channel. FIG. 34 is a diagram of transmissions that occur in a subframe 3400 during an SRS switching operation. switches from a source component carrier to a target component carrier. In this example, a transceiver (TX/RX) chain 212 of the UE 210 is used to both receive a downlink transmission 3412 over the source component carrier, and to transmit an SRS symbol 3424 and an uplink signal 3422 over the target component carrier. The UE 210 has an RF retuning delay with a duration that is less than the guard interval between an uplink portion 3420 of the subframe 3400 and a downlink portion 3410 of the subframe 3400. As a result, switching the TX/RX chain 212 from the source component carrier to the target component carrier does not interfere with the downlink transmission 3412.

Figure 35:
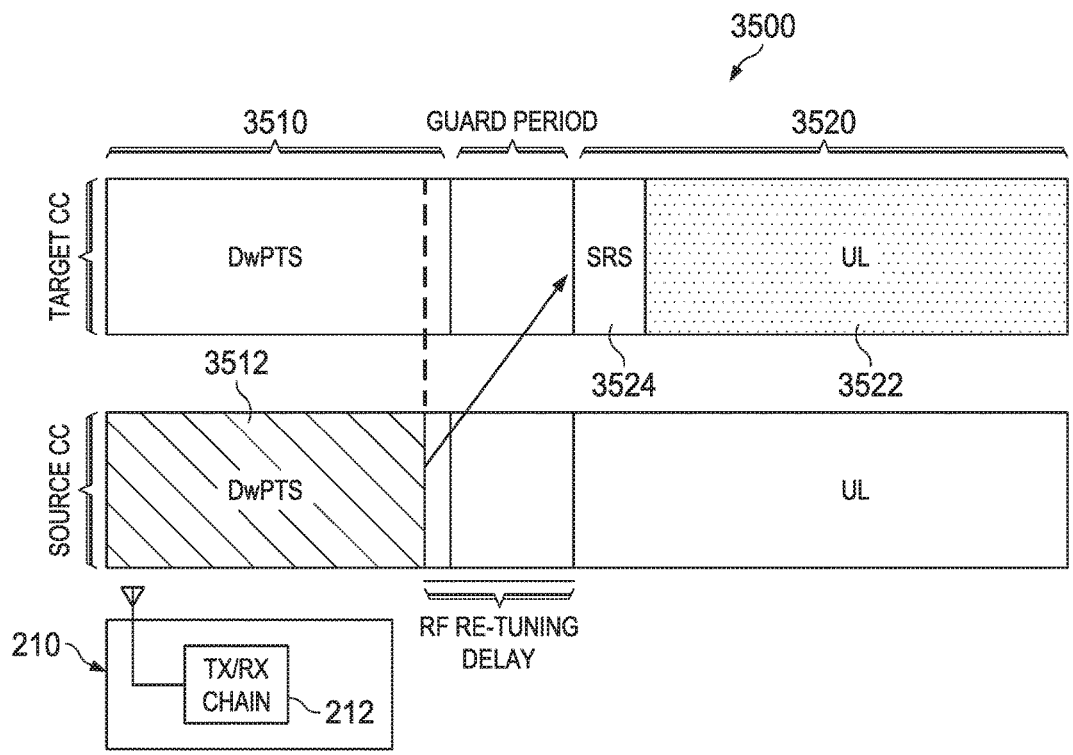
FIG. 35 is yet another diagram of transmissions that occur in a subframe during an SRS switching operation.

FIG. 35 is a diagram of transmissions that occur in a subframe 3500 during an SRS switching operation. In this example, the TX/RX chain 212 of the UE 210 is used to both receive a downlink transmission 3512 over the source component carrier, and transmit an SRS symbol 3524 and an uplink signal 3522 over the target component carrier.

Because an RF retuning delay of the TX/RX chain 212 has a duration that exceeds the guard interval between an uplink portion 3520 of the subframe 3500 and a downlink portion 3510 of the subframe 3500, switching the TX/RX chain 212 from the source component carrier to a target component carrier interferes with, or otherwise requires a shortening or puncturing or dropping on one or more symbols of, the downlink transmission 3512.

Figure 36:
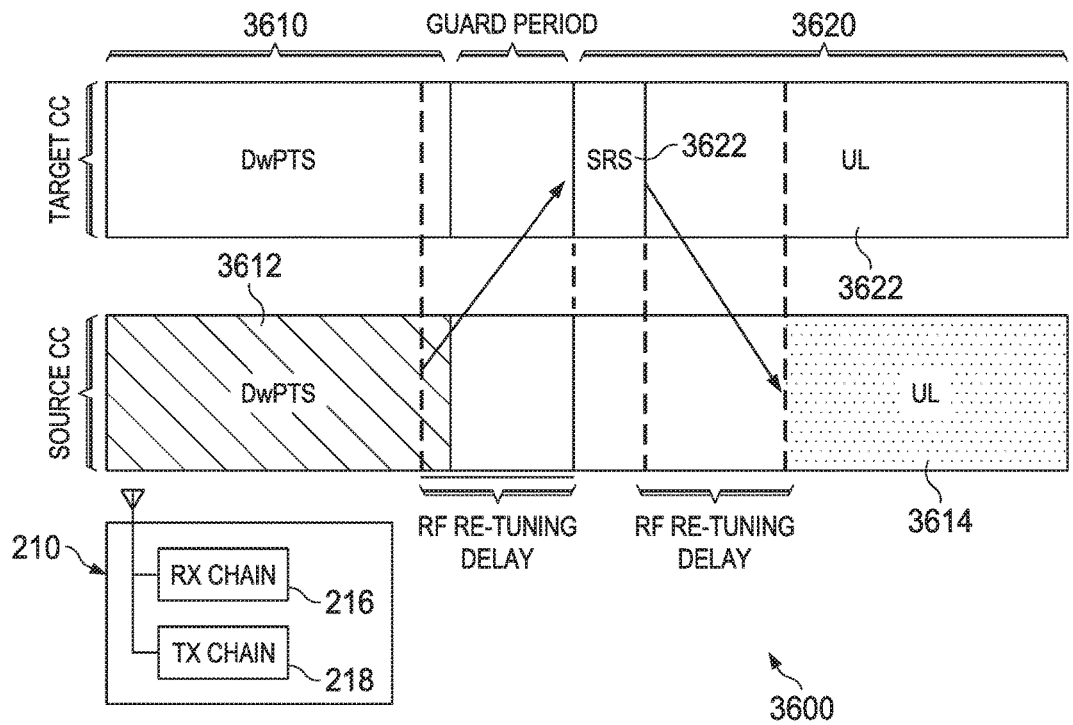
FIG. 36 is yet another diagram of transmissions that occur in a subframe during an SRS switching operation.

FIG. 36 is a diagram of transmissions that occur in a subframe 3600 during an SRS switching operation. In this example, an RX chain 216 of the UE 210 is used to receive a downlink transmission 3612 over the source component carrier, and a TX chain 218 is used to transmit both an SRS symbol 3622 over the target component carrier and the uplink signal 3614 over the source component carrier. Hence, the TX chain 218 is switched from the source component carrier to the target component carrier prior to transmission of the SRS symbol 3622, and then back to the source component carrier prior to transmission of the uplink signal 3614. Although an RF retuning delay of the TX chain 218 has a duration that exceeds the guard interval between an uplink portion 3520 and a downlink portion 3510 of the subframe 3500, the TX chain 218 is switched independently from the RX chain 216, and as a result, switching the TX chain 218 to the target component carrier prior to transmission of the SRS symbol 3622 does not interfere with reception of the downlink signal 3612. However, switching the TX chain 218 back to the source component carrier requires a shortening, or puncturing, or dropping on one or more symbols, of the uplink signal 3614.

Figure 37:
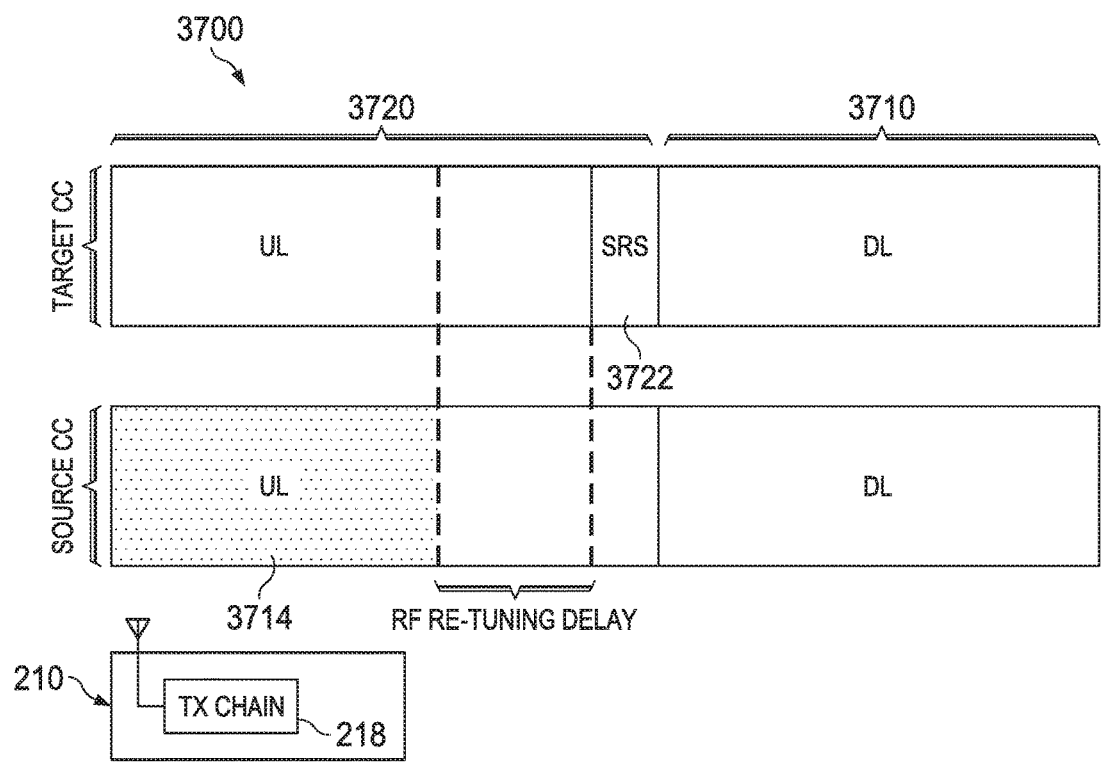
FIG. 37 is yet another diagram of transmissions that occur in a subframe during an SRS switching operation.

FIG. 37 is a diagram of transmissions that occur in a subframe 3700 during an SRS switching operation. In this example, a TX chain 218 of the UE 210 is used to transmit both an uplink signal 3614 over the source component carrier and an SRS symbol 3722 over a target component carrier. Hence, the TX chain 218 is switched from the source component carrier to the target component in-between transmissions of the uplink signal 3714 and the SRS symbol 3722. When an RF retuning delay of the TX chain 218 has a nonzero duration, since there is no guard interval between an uplink portion 3720 of the subframe 3500 and a downlink portion 3710 of the subframe 3700, the TX chain 218 may begin its transition to the target component carrier prior to start of the SRS symbol on the target CC. As a result, the uplink portion 3720 is shortened/punctured, on the part that overlaps with the UL RF retuning time and the SRS transmission.

Carrier aggregation (CA) and carrier selection are techniques that leverage multiple carriers to increase the effective bandwidth available to a given mobile device. CA enables multiple carrier signals to be simultaneously communicated between the UE and a supporting base station, Typically, the UE may be configured with a set of carriers by a base station, such as an enhanced NodeB (eNB). In some instances, the carriers may be from different frequency bands to add greater bandwidth to support high data rate communications and operations, such as streaming video or large data files.

Another technology is to rely on carrier switching or selection (CS) to enable the UE to support more carriers than it's own capability. Carrier switching/selection among all carriers available to the serving base station may allow the UE to access more carriers over time. In this approach, component carriers are selected based on several factors, such as load balancing. While the CS approach generally requires significantly less UE enhancement than the CA approach, one drawback to CS is the transition time involved in carrier switching and selection.

During carrier selection, a mobile device may be assigned a set of component carriers. The base station and/or the mobile device may monitor the channel quality of each carrier in the assigned set, and trigger a switch from a current carrier to a target carrier when a criterion is met, e.g., the channel quality of an target carrier exceeds that of the current component carrier by at least a threshold. As used herein, the term "current carrier" refers to the carrier that a mobile device is transitioning from during a switching operation, and the term "target carrier" refers to a carrier in which the UE is switching to during a switching operation. Although the target carrier may support a higher bit-rate than the current carrier, there are nevertheless some latency and overhead costs that result from switching from the current carrier to the target carrier.

The overhead/latency costs may be particularly significant when beamformed transmissions are exchanged over the target carrier. In particular, it is generally necessary for a mobile device to transmit sounding reference signals (SRSs) over a carrier so that the base station can derive a complex channel response of the downlink channel, and select appropriate downlink beamforming parameters for the carrier. The downlink channel response can be derived from uplink SRS transmission in a TDD component carrier because downlink and uplink channels over the same frequencies are likely to have similar channel responses due to the concept of channel reciprocity. However, the concept of channel reciprocity is typically not applicable to different carriers, as channel response is typically frequency dependent. As a result, uplink SRS transmissions over one carrier are generally not useful in deriving the complex channel response of another carrier. Thus, a mobile device that switches from a current carrier to a target carrier may need to perform an SRS transmission over the target carrier before a beamformed transmission can be communicated by the base station. This may introduce latency into the cell switching process. Embodiments of this disclosure provide SRS frame configurations, and SRS switching techniques, that mitigate the amount of latency associated with SRS transmissions when switching from a current carrier to a target carrier.

Figure 38A:
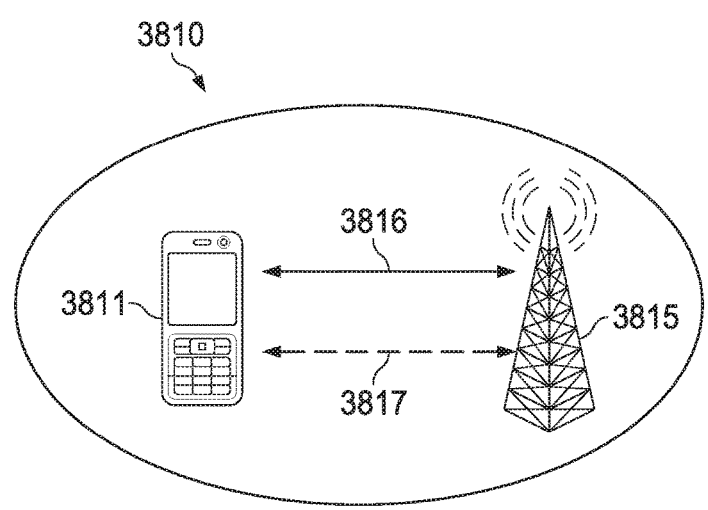
FIG. 38A is a diagram of an embodiment wireless network for supporting carrier aggregation and/or carrier selection.

FIG. 38A illustrates a wireless network 3810 for supporting carrier aggregation and/or carrier switching. As shown, a base station 3811 communicates with the mobile device 3815 over different component carriers 3816, 3817. In some embodiments, the component carrier 3816 is a primary component carrier (PCC), and the component carrier 3817 is a secondary component carrier (SCC). In an embodiment, the PCC carries control information (e.g., feedback from the mobile device 3815 to the base station 3811), and the SCC carries data traffic. In the 3GPP Rel-10 specification, a component carrier is called a cell. When multiple cells are controlled by the same eNodeB, a single scheduler may perform cross scheduling of multiple cells. In the context of carrier aggregation, one high-power node may operate and control several component carriers, thereby forming a primary cell (Pcell) and secondary cell (Scell). AA primary carrier that is communicated from a base station to a mobile device may be referred to as a Downlink Primary Component Carrier (DL PCC),), while a primary carrier communicated from a mobile device to a base station may be referred to as an Uplink Primary Component Carrier (UL PCC). A secondary carrier that is communicated from a base station to a mobile device may be referred to as a Downlink Secondary Component Carrier (DL SCC),), while a secondary carrier communicated from a mobile device to a base station may be referred to as an Uplink Secondary Component Carrier (UL SCC). In Rel-11 design, an eNodeB may control both a Macro cell and a Pico cell. In this case, the backhaul between the Macro cell and the Pico cell is fast backhaul. The eNodeB can control the transmission/reception of both macro cell and Pico cell dynamically.

Figure 38B:
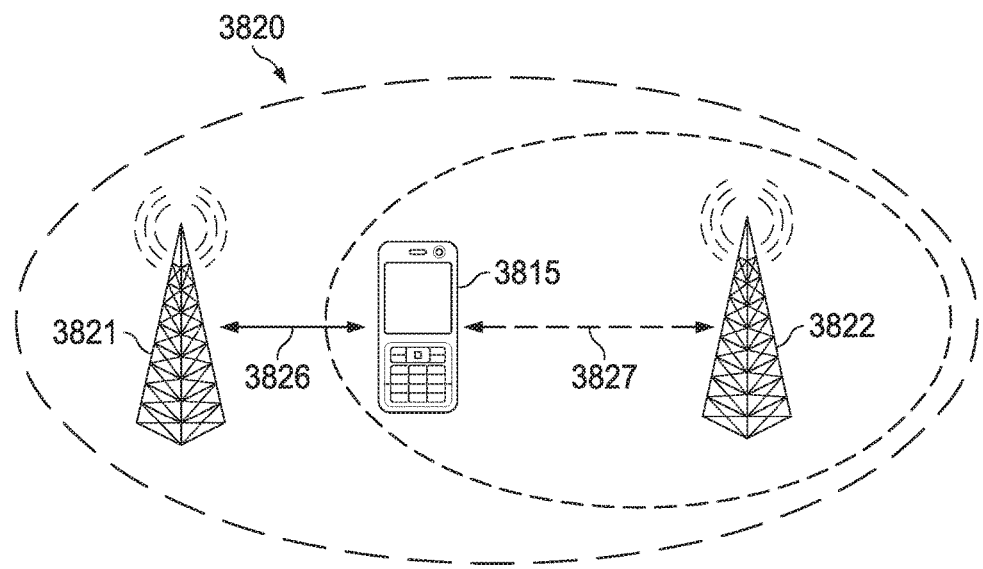
FIG. 38B is a diagram of an embodiment heterogeneous (Het-Net) for supporting carrier aggregation and/or carrier selection.
Figure 38C:
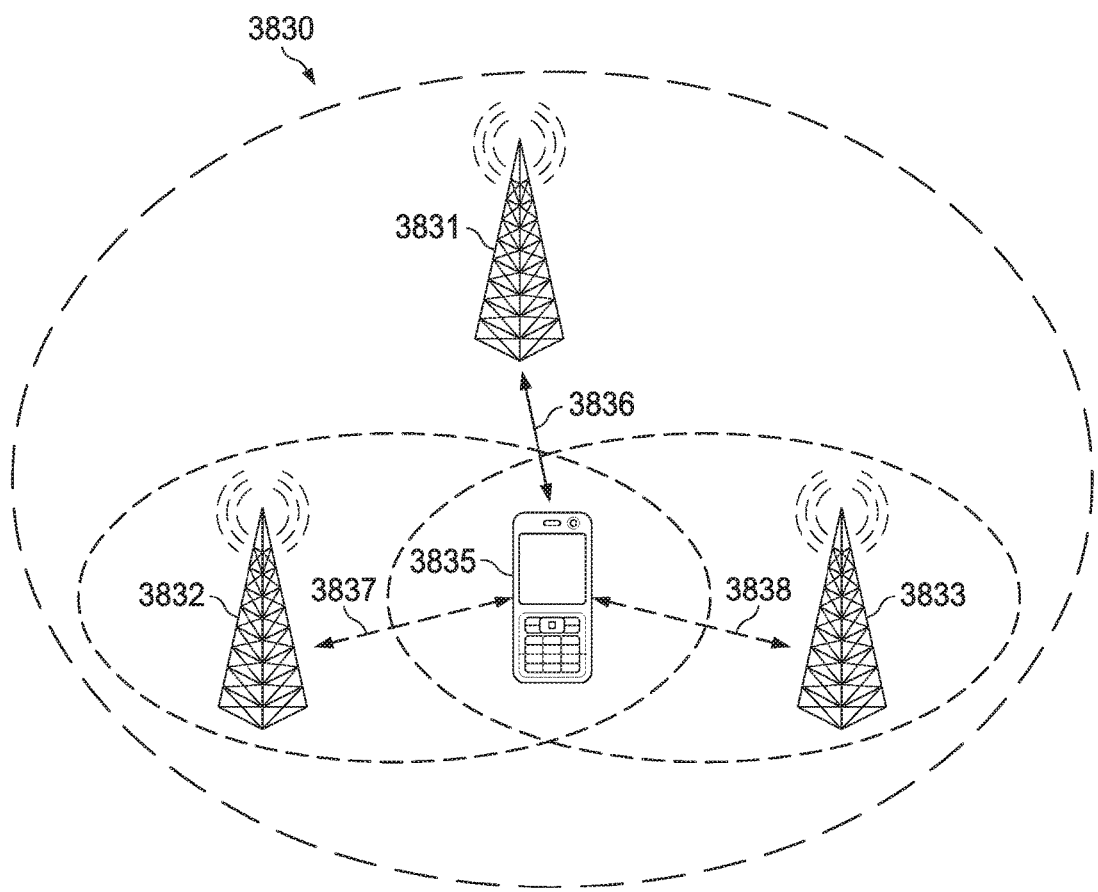
FIG. 38C is a diagram of another embodiment Het-Net for supporting carrier aggregation and/or carrier selection.

In a modern wireless networks, base stations may be grouped together to form a cluster of base stations. Each base station in the cluster may have multiple antennas, and may be providing wireless access to multiple mobile devices in a wireless coverage area of the corresponding base station. Resources may be assigned to the mobile devices based on a scheduling algorithm, e.g., proportional fairness, round robin, etc. FIG. 38B illustrates a wireless heterogeneous network (HetNet) 3820 configured to support carrier aggregation and/or carrier selection. As shown, base stations 3821, 3822 communicate with a mobile device 3825 over different component carriers 3826, 3827. The base station 3821 may be a high-power node (e.g., a macro-cell), and the base station 3822 may be a low power node, e.g., a pico-cell, femto-cell, micro-cell, relay, remote radio head (RRHs), remote radio unit, a distributed antennas, etc. Accordingly, the base station 3822 may have a smaller coverage area than the base station 3821. Low-power nodes may provide improved cellular coverage, capacity and applications for homes and businesses, as well as metropolitan and rural public spaces. FIG. 38C illustrates another wireless heterogeneous network (HetNet) 3830 configured to support carrier aggregation and/or carrier selection. As shown, base stations 3831, 3832, 3833 communicate with a mobile device 3835 over different component carriers 3836, 3837, 3838. The base station 3831 may be a high-power node (e.g., a macro-cell), and the base stations 3832, 3833 may be a low power node, e.g., a pico-cell, femto-cell, micro-cell, relay, remote radio head (RRHs), remote radio unit, a distributed antennas, etc.

Although FIGS. 38B-38C depict base stations communicating with a mobile device over different component carriers, it should be appreciated that, in some implementations, base stations in a Het-Net may communicate with a mobile device over the same component carriers.

Some Het-Nets may have multiple high-power nodes and/or multiple low-power nodes operating over multiple component carriers. Nodes in the same Het-Net may be interconnected by fast or slow backhaul connections depending on the deployment. Fast backhaul connections may be utilized to improve coordination between the nodes, such as to effectuate joint-transmission/reception. Multiple remote radio units may be connected to the same base band unit of the eNodeB by fiber cable to support relatively low latency communications between base band unit and remote radio unit. In some embodiments, the same base band unit processes coordinated transmission/reception of multiple cells. For example, a base band unit may coordinate a joint transmission (e.g., a coordinated multiple point (CoMP) transmission) from multiple base stations to a mobile device transmissions of multiple cells to a terminal to effectuate a coordinated multipoint (CoMP) transmission. As another example, a base band unit may coordinate a joint reception of a signal communicated from a mobile device to multiple base stations to effectuate a coordinated multipoint (CoMP) reception. Fast backhaul connections may also be used to coordinate joint scheduling between different base stations. Densely deployed networks are an extension of HetNets, and include relatively large numbers of densely deployed low power nodes to provide improved coverage and throughput. Densely deployed networks may be especially well-suited for indoor and/or outdoor hotspot deployments.

Figure 39:
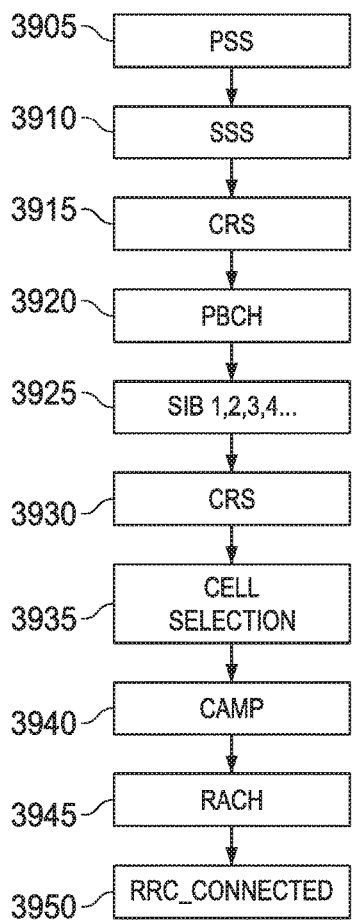
FIG. 39 is a flowchart of an embodiment method for performing synchronization and measurement using reference signals.

In a wireless network, reference signals, data signals, and control signals may be communicated over orthogonal time-frequency resources. For example, the respective signals may be mapped to different resource elements (REs) in a resource block (RB) of a radio frame. FIG. 39 illustrates an embodiment method 3900 for processing signals during carrier selection, as may be performed by a mobile device. At steps 3905 and 3910, the mobile device processes a primary synchronization signal (PSS) and a secondary synchronization signal (SSS), respectively, to determine a cell identity and a frame timing of a physical broadcast channel. At step 3915, the mobile device processes a cell-specific reference signal (CRS) of the physical broadcast channel to obtain channel information. At step 3920, the mobile device processes a physical broadcast channel (PBCH) to obtain system information broadcast (SIB) messages for one or more carriers, e.g., SIB1, SIB2, etc. At step 3925, the mobile device processes SIB messages to obtain downlink control information (DCI) associated with the corresponding component carriers. The DCI may indicate transmission parameters (e.g., modulation and coding scheme (MCS) parameters, etc.) used to transmit the respective candidate carriers. At step 3930, the mobile device processes CRSs in the candidate carriers to estimate a channel quality associated with each of the respective candidate carriers.

At steps 3935, the mobile device performs cell selection based on the channel quality information derived in step 3930. At step 3940 and 3945, the mobile device begins to monitor the selected carrier and performs a random access transmission (RACH) uplink transmission to request resources of the selected carrier be scheduled to the mobile device. At step 3950, the mobile device transitions from an RRC_IDLE mode into an RRC_CONNECTED mode. This may be achieved by exchanging messages with a base station associated with the respective carrier.

In some networks, it may be desirable to implement beamforming and cell selection techniques in the same communications session. Before a beamformed transmission can be performed over a time domain duplexed (TDD) component carrier, it is generally necessary for the mobile device to transmit sounding reference signals (SRSs) over the carrier so that the base station can derive a complex channel response of the downlink channel, and select appropriate downlink beamforming parameters. The downlink channel response can be derived from uplink SRS transmission in a TDD component carrier because downlink and uplink channels over the same frequencies are likely to have similar channel responses due to the concept of channel reciprocity.

However, channel reciprocity is typically frequency dependent, and therefore uplink SRS transmissions over one carrier are generally not useful in deriving the complex channel response of another carrier. Thus, a mobile device that switches from one carrier to another may need to perform an SRS transmission over the new carrier before a beamformed transmission can be communicated by the base station. This may introduce latency into the cell switching process.

One solution to reducing latency during cell switching is for the mobile device to perform SRS transmissions over all candidate carriers, including those candidate carriers that are not being used by the mobile device. However, in current LTE systems, a mobile device may not be permitted to transmit uplink SRSs over component carriers if there is a downlink-uplink control channel disparity, e.g., if there are more downlink control channels than uplink control channels. In particular, a network operator may assign more resources to carry downlink traffic and control signalling, than uplink traffic and control signalling, when there is a higher demand for downlink traffic, e.g., when more downlink traffic is being communicated over a given carrier than uplink traffic, Moreover, some mobile devices may be capable of transmitting SRS signaling over a limited number of uplink component carriers (e.g., two component carriers) at the same time. Table 1 provides carrier aggregation configurations proposed for 4$^{th}$ generation radio access network (RAN4) standardization.

TABLE 1

| WID No. | CA Configuration | Category | BW Class | TDD/FDD | Region | REL |
|---|---|---|---|---|---|---|
| RP-151159 | CA_B1_B3_B19_B42_B42 | 5 DL/1 UL | | TDD + FDD | Japan | R13 |
| RP-151160 | CA_B1_B19_B21_B42_B42 | 5 DL/1 UL | | TDD + FDD | Japan | R13 |
| RP-151512 | CA_B1_B3_B7_B7_B28 | 5 DL/1 UL | | FDD | Australia | R13 |
| RP-131244 | CA_41D | 3 DL/2 UL | D | TDD | USA | R12 |
| RP-140453 | CA_40D | 3 DL/2 UL | D | TDD | China | R12 |
| RP-140950 | CA_40D (+BW) | 3 DL/2 UL | D | TDD | EU | R13 |
| RP-151513 | CA_B3_B3_B7_B7_B28 | 5 DL/1 UL | | FDD | Australia | R13 |

The DL-UL CC number disparity can become even more significant with Rel-13 eCA which standardized up to 32 DL CCs per UE. Consequently, there could be situations where most of the UE's DL CCs cannot benefit from channel reciprocity.

Embodiments that allow mobile devices to quickly switch from one TDD component carrier to another, while still utilizing beamforming, are needed.

In CA, a UE may be capable of transmitting PUSCH, SRS, RACH, and DMRS on 1 UL CC, 2 UL CCs, or even more UL CCs (unavailable as of now). One of the UL CCs is configured as PCell for the UE on which the UE transmits PUCCH, and the other UL CCs, if any, are configured as SCells on which PUCCH may or may not be supported. The UL PCell and UL SCells may be in the same band or in different bands, and they may be FDD, TDD, or FDD+TDD, and they may be in the same timing advance group (TAG) or different TAGs. The UE may be configured with more SCells with only DL, and they may be in the same band or in several bands operating in FDD, TDD, or FDD+TDD. Except for the case with only FDD CCs, all of these scenarios may be considered for SRS carrier based switching. Below table shows some examples.

TABLE 2

| | UL PCell | UL SCell | TDD DL SCell 1 | TDD DL SCell 2 | TDD DL SCell 3 |
|---|---|---|---|---|---|
| Scenario 1, TDD intra-band | TDD, band x | none | band x | band x | band x |
| Scenario 2, TDD intra-band | TDD, band x | TDD, band x | band x | band x | band x |
| Scenario 3, TDD inter-band | TDD, band x | TDD, band y | band x | band y | band z |
| Scenario 4, TDD inter-band | TDD, band x | TDD, band x | band x | band y | band z |

TABLE 2-continued

| | UL PCell | UL SCell | TDD DL SCell 1 | TDD DL SCell 2 | TDD DL SCell 3 |
|---|---|---|---|---|---|
| Scenario 5, F + T | FDD, band x | none | band y | band y | band z |
| Scenario 6, F + T | FDD, band x | FDD, band x | band y | band y | band z |
| Scenario 7, F + T | FDD, band x | TDD, band y | band y | band y | band z |
| Scenario 8, F + T | TDD, band x | FDD, band y | band x | band z | band z |

It should be noted that although current RAN4 requirements (such as band combinations) do not support some CA configuration scenarios, RAN1 design may not be limited to currently supported scenarios. Nevertheless, the network needs to ensure that when operating with SRS carrier based switching, the operations shall comply with RAN4 requirements.

To enable fast carrier switching between TDD CCs, a mobile device may need to perform SRS transmissions on each candidate component carrier. A mobile device may be instructed to switch from one component carrier to another by a base station or controller. For example, a mobile device may be instructed to suspend its transmission on a first component carrier, to switch to a second component carrier, and then to transmit SRS over the second component carrier. The instructions may specify the resources over which to perform the SRS transmissions by indicating an antenna port. The instructions may also identify a timing advance and transmit power level for the SRS transmissions. The UE may then switch back to the first component carrier. The switching may be alternatively triggered by dynamic signalling. The network may need to first configure a UE with SRS on all TDD CCs, even if the UE UL CA capability is much less. Some descriptions will be provided below.

Some general operation designs will be discussed. To facilitate the discussion, they are categorized into three levels:

The carrier level, concerned with the carrier-level configurations for SRS and switching from one carrier to another, etc.;

The subframe level, concerned with on which subframe the SRS switching and transmission should be performed and the relation with other transmissions on that subframe, etc., and The symbol level, concerned with SRS switching symbols and transmission symbols, etc. FIG. 4 illustrates an embodiment SRS carrier based switching scheme. As shown, SRS switching is performed on the carrier level, subframe level, and symbol level, where D/S/U represent downlink/special/uplink subframes, respectively.

There are several considerations for carrier-level general operation principles, requirements, and design. To enable fast carrier switching to and between TDD component carriers (CCs), the network needs to first configure a UE with SRS on more TDD CCs or potentially even all TDD CCs, even if the UE UL CA capability is much less. Then the UE can switch to and between those carriers and transmit SRS. The switching may be according to the network configuration or network indication, including information about the carriers to switch from and to switch to, etc. The transmission of the SRS on the switch-to CC is also according to the network configuration or network indication, including the transmission power, timing, bandwidth, etc.

During a switching from CC1 to CC2, a UE stops any possible transmissions on CC1 according to the indicated timing, switches to CC2 within a transient period, and transmits a signal according to the corresponding network indication. After the transmission, the UE may switch back to CC1 or switch to CC3 according to the corresponding network indication; this action may be viewed as another switching action.

Therefore, a general switching action involves one or more of the following elements: 1) Switching-from CC, the CC the UE is switching from. 2) Switching-from timing, the instance (SC-FDMA symbol location) to break from the switching-from CC. 3) Switching-to CC, the CC the UE is switching to. 4) Transmissions on the switching-to CC, including the signal formats, contents, resources, timing, power, etc., of the transmissions on the CC it switches to. 4) Next switching information, such as if the UE should switch back to the switching-from CC, or go to another CC, or stay in the current CC, etc.

To allow a UE to transmit SRS on more TDD CCs or potentially even all TDD CCs over time, it is necessary to allow SRS to be configured on these TDD CCs, even if the UE does not support UL CA on all the TDD CCs. This is not allowed in current standards. Therefore, a key standards impact is to allow that the number of TDD carriers configured for SRS transmission may exceed the number of carriers dictated by the UE UL CA capability.

SRS transmissions need to be configured on all TDD CCs. In other words, each TDD CC needs to be configured, explicitly or implicitly by RRC signalling, with SRS bandwidth configuration, subframe configuration, transmission comb, antenna ports, cyclic shifts, etc. For different transmission modes, the SRS density in time may be different, such as precoding based transmission modes should have higher density of SRS. In addition, SRS power control parameters for each TDD CC need to be configured.

Some modifications are needed for SRS power control since the current power control for SRS assumes the existence of PUSCH on the same CC. SRS power control configuration without reliance on PUSCH on the same CC needs to be specified, such as SRS power control parameters similar to PUSCH power control mechanism.

A CC set may be used for simplifying the SRS transmission configuration. A set of collocated CCs in the same band sharing the same set of antennas corresponding to the same TAG can be configured as one CC set, which may share common properties such as power control parameters, timing advance (TA), pathloss estimate, quasi-co-location (QCL) properties. The method disclosed in 91035003US01 can be adopted here specially for SRS configuration purpose. Generally, TDD CCs and FDD CCs are in different sets.

To support SRS carrier based switching, the switching-from carrier and switching-to carrier may need to be indicated. In some cases, the indication may be explicit such as indicating a switching from CC1 to CC2 in certain signalling, but in other cases, the indication may be implicit such as when the UE has only 1 CC supporting PUCCH/PUSCH, or the indication may be implicit such as when the UE has only 1 UL SCell supporting PUCCH/PUSCH and the UL PCell is not desired to be interrupted. Furthermore, the explicit indication may be via RRC configuration signalling or via physical layer trigger, and the resulting switching and SRS transmission may be periodic or aperiodic. For example, if the UE supports only one UL CC, then it is clear that the "switching-from" CC should always be the UL PCell. However, if the UE supports 2 UL CCs, it needs to determine the switching-from CC when a switching-to CC is specified. The network may configure in such a case, the switching-from CC should always be the SCell and the PCell never needs to switch its UL transmission. This is a simple solution, and it may minimize interruptions on the PCell which generally handles some more important transmissions (e.g., PUCCH). However, in some situations, it may be desired to switch the PCell as well. One example is there may be a large number of CCs to switch to, and to solely rely on the SCell UL switching to all other CCs may be inefficient. Another example is, as current RAN4 standards do not support intra-band non-contiguous UL CA, both the PCell UL and SCell UL may switch at the same time to avoid intra-band non-contiguous UL transmissions, which may be preferred over PCell UL muting and SCell UL switching. If the UE supports 3 UL CCs with 2 UL SCells (not yet supported in RAN4, though), it needs to determine the switching-from CC when a switching-to CC is specified. The network may configure in such a case, the switching-from CC should always be a predefined SCell and the other SCell never needs to switch its UL transmission. Alternatively, the network may configure the switching-from CC should always be SCell1 if the switching-to CC is among a predefined group of CCs, and the switching-from CC should always be SCell2 if the switching-to CC is among another predefined group of CCs or not in the first predefined group of CCs. Alternatively, the network may allow all CCs (or all SCells) with UL to be a switching-from CC, but which of them will perform an actual switching depends on network signalling, such as a physical-layer signalling transmitted with an aperiodic SRS trigger. In addition, the transmissions on the switching-from CCs may be punctured or dropped, which will be further discussed.

In addition, signalling overhead reduction may be considered. For example, several TDD SCells may share a common SRS configuration (or related SRS configurations), such as antenna ports, aperiodic configuration, etc. That is, for some carriers with common characteristics of SRS transmission, the SRS configuration signaling to configure the common characteristics to these carriers can be considered. This may become especially important if the UE is configured with many (up to 32) DL CCs. Designs such as multiple SRS transmissions over several TDD carriers in one subframe may be considered.

The switching may be according to the network configuration (periodic SRS) or network indication (aperiodic SRS, which also requires RRC configuration).

For a "switching back", if it is not indicated, the UE may stay at the switched-to CC; or the UE automatically switches back to the switching-from CC.

One embodiment is to indicate the switching-from CC and switching-to CC explicitly. For example, a PHY-layer trigger containing (2, 4) defines a switching from CC2 to CC4. It may imply that after the switching to CC4, the UE will automatically jumps back to CC2. Alternatively, it may require a signalling of (2, 4, 2) for a round trip, or (2, 4) and (4, 2) for a round trip. A sequence of CCs may be indicated, such as (2, 4, 5, 6) for switching from CC2 to CC4, then to CC5, then to CC6, or (2, 4) (4, 5) (5, 6) for the same purpose. The combined switching actions can help reduce the switching gap overhead. Again, the indication to switch back to CC2 may need to be indicated, or may be implicit. However, if a switching back is not require for other UL signal transmissions, no explicit indication of switching back to 2 may mean the UE stays on the last indicated CC and perform UL transmissions. In one embodiment, the switching-from CC needs not be signalled explicitly in the triggering signalling as it is implicit from RRC configuration signalling which configures each switching-to CC a switching-from CC. It may be allowed that a switching-to CC is configured with multiple switching-from CC; e.g., CC5 is configured with CC2 and CC1 as the switching CCs. Then the ordering may be implicit as CC2 has higher priority to be the switching-from CC. Alternatively, the ServCellIndex of the CCs are compared and the one with the highest has higher priority. However, a lower-priority CC may be used as the switching from CC if the higher-priority one is in use and not available, or carrying a signal that is more important than SRS (e.g., PUCCH, RACH, but PUSCH/DMRS may be viewed as lower priority, etc.). Without the need of explicitly signalling the switching-from CC helps reduce triggering signalling overhead. However, an explicit indication in the triggering signalling may be supported if the signalling overhead is not considered as a big issue.

It may be possible that multiple CCs are switching together at the same time. This may be separately indicated, such as ((2, 4) and (3, 5)), indicating that CC2 switches to CC4 and CC3 switches to CC5 on the same subframe. However, a preferred embodiment is to indicate ([2,3], [4,5]), which leads to the same operation results but may allow the UE to decide if it performs ((2, 4) and (3, 5)) or ((2, 5) and (3, 4)). In other words, there may be an advantage of only specifying the CCs to be switched from and the final switching outcome without detailing exactly pair of CCs involved in the switching, leaving some flexibility to UE implementation.

The switching from a CC that can support PUCCH/PUSCH causes an interruption to the UL transmission on that CC. While allowing sufficient opportunity for SRS switching, the design should strive for reduced negative impacts (such as reduced interruption durations or reduced interruption times) on other UL transmissions, especially for important UL transmissions such as PUCCH and PCell transmission.

Moreover, for better sounding performance, interference between SRS transmissions and other UL or DL transmissions needs to be better coordinated. This may also impose restrictions on neighboring eNBs' TDD UL-DL configurations.

A SCell DL status may be activated or deactivated. A deactivated CC may still transmit SRS, so that eNB can monitor the link status, although the transmission periodicity may be longer. However the timing needs to be ensured. That is, the UE may need to wake up once in a while to maintain the connection with the deactivated CC, and also send SRS so that TA may be restricted within a reasonable range. The waking up may be associated with the DRS transmissions in the DL, such as in the subframe following the DRS-bearing subframe during a DRS burst, or the next UL TXOP following the DRS-bearing subframe. In other words, the SRS transmission instances are changed to be aligned with DRS burst, including the periodicity but with an offset of possibly one subframe.

Alternatively, a deactivated CC skips all SRS, since there is no DL, even if the SRS transmission on that CC was preconfigured.

When a CC is activated, it serves as a SRS trigger on that CC (MAC trigger). In current mechanism of SCell activation, a MAC signaling is transmitted from the eNB to a UE, indicating a CC to be activated. The MAC signaling also serves as an implicit CSI reporting trigger, requiring the UE to report CSI on n+8 subframe and n+24/34 subframe, where n the subframe when the MAC signaling is transmitted. The UE shall transmit SRS (including SRS switching operation if needed) on n+8 if consistent with the UL-DL configuration on the activated CC, or postpone to the next available UL transmission opportunity as indicated by the network. No PHY-layer trigger is needed for this action, and the transmission is according to pre-configuration. In other words, the MAC activation signaling can serve as a trigger for SRS switching and transmission. When multiple CCs are activated at the same time, the UE may need to transmit SRS on the newly-activated CCs possibly on n+8 (and/or a later subframe) without PHY-layer trigger, and an ordering may be configured or standardized for the SRS transmissions. For example, the CC with lowest ServCellIndex shall transmit SRS on the first SRS TXOP, the CC with the second lowest ServCellIndex shall transmit SRS on the second SRS TXOP, etc. A SRS TXOP is a symbol or a set of consecutive symbols on which SRS can transmit, taking into consideration of switching gaps. Note that a next SRS TXOP may be within the same subframe of this SRS TXOP or within the next subframe of this SRS TXOP.

The following rules may apply to handling temporary reduction in UL capability due to SRS transmission. If UE supports n carrier UL CA, when SRS transmission procedure is ongoing (including retuning periods), UE can only transmit on n−1 other UL carriers. One carrier needs to have "gaps" during SRS procedure. If UE is not UL CA capable, this would be a gap on the PCell. Gap handling may be performed when an UL data transmission is dropped (and NACKed by network), a DL data transmission is not received (and UE sends NACK), and/or Network can prevent collision of first UL transmission and SRS transmission.

Given that SRS transmission causes the UE to exceed its uplink capability, a procedure is needed to handle the temporarily reduced uplink capability. The starting assumption here is that the UE is configured with more UL carriers. Methods for causing a UE to transmit SRS on an SCell are described below.

Case 1: UE does not support UL CA (i.e., only a single carrier transmitted at any time on UL). Case 1 may include one or more of the following steps/features: 1. UE is configured with one or more SCells that support uplink transmission; 2. UE is requested to transmit SRS on an SCell; 3. UE retunes from PCell uplink to SCell uplink (further details on switching in other sections below). UE transmits SRS according to SRS configuration provided (in step 2 or prior to step 2). UE retunes from SCell to PCell; 4. The duration in step 3 is considered an "SRS gap"; 5.

During the SRS gap, the following may be true (a) Any PUSCH transmission UE is supposed to perform is dropped, assumed to have been NACKed and a non-adaptive retransmission is scheduled, (b) Any PDSCH transmission scheduled for the UE is postponed to occur, (c) If DRX inactivity timer and or DRX retransmission timer are running, they are suspended when the UE tunes away and are resumed when the UE returns. The reason for (c) is that DRX inactivity timer can expire during SRS gap, and UE goes into DRX; if there had not been an SRS gap, the UE may have received PDSCH and stayed in active mode.

Case 2: UE supports n carrier UL CA. Case 2 may include one or more of the following steps/features: 1. UE is configured with n or more SCells (i.e., PCell+1 . . . n . . . SCells) that support uplink transmission and 2. UE is requested to transmit SRS on an SCell #n 3. UE selects an SCell k on which it is going to create an "SRS gap". It retunes from SCell k uplink to SCell n uplink, performs SRS transmission and retunes back to SCell k uplink. Note that SCell k can be associated with an RF chain that also supports other SCells. 4. SCell k is chosen using a prioritization scheme with the following features (a) SCell k is chosen such that SRS gap is caused on the fewest number of activated carriers. (b) SCell k is chosen such that the subframe in which SRS transmission occurs is an uplink subframe on SCell k, and there is no uplink transmission scheduled on SCell k during the SRS gap. (c) SCell k is chosen such that the total power required after substituting SRS on SCell n for the SCell k uplink transmission is no more than the maximum allowed transmit power.

There are several considerations for subframe-level general operation principles, requirements, and design.

The SRS has to be transmitted on a UL transmission opportunity (TXOP) indicated by the network, e.g., a UL subframe or the UL portion of a special subframe. Unless any other TXOP is introduced and signalled by the network, the SRS switching has to be consistent with the TDD UL-DL configurations on the switching-to TDD carriers. For example, for periodic SRS switching, the eNB shall ensure that no SRS transmission is configured on a DL subframe of a switching-to CC. For aperiodic SRS switching, the network shall not trigger a SRS transmission on a subframe that will be a DL subframe of a switching-to CC.

For aperiodic SRS transmission on a CC, SRS trigger signalling needs to be used. The existing signalling and mechanism should be generally applicable, though further enhancement and signalling overhead reduction can be considered.

Designs such as multiple SRS transmissions over several TDD carriers in one subframe may be considered. One aperiodic SRS trigger for SRS switching and transmission on multiple CCs (takes turns on those CCs with a predefined order, or indicated order such as in the SRS trigger), the multiple CCs may be in a set.

SRS switching signalling may be combined with SRS trigger signalling. In the trigger, there may be an indication of the switching-from CC and an indication of the switching-to CC.

Moreover, for better sounding performance, interference between SRS transmissions and other UL or DL transmissions needs to be better coordinated. This may also impose restrictions on an eNB's TDD UL-DL configurations for different carriers and even neighboring eNBs' TDD UL-DL configurations. As a baseline, the case with fixed TDD UL-DL configurations for different carriers and neighboring eNBs should be prioritized. Otherwise, SRS switching subframe may be limited to certain subframes (e.g. subframe 1 after the subframe 0 DL), or the eIMTA adaptation has to be limited to be consistent with the SRS switching patterns. Alternatively, the switching patterns also need to be updated with the change of TDD UL-DL configurations (an indicator is sent together with TDD reconfiguration indicator to indicate the new switching pattern). Alternatively, periodic or aperiodic SRS transmission on a switching-to CC is dropped. Alternatively, periodic or aperiodic SRS transmission on a switching-to CC is postponed to the next available UL subframe or in general, SRS TXOP. Finally, for aperiodic SRS switching, the network may ensure the consistency so that it would never conflict with the TDD configuration, and the UE shall assume any aperiodic SRS switching corresponds to an aperiodic trigger always corresponds to an allocated SRS TXOP.

There are various ways to maintain subframe-level consistency. Neighboring eNBs may coordinate with one another such that SRSs are aligned across neighboring eNBs. Neighboring eNBs may coordinate to align UL-DL patterns and/or GPs. Neighboring eNBs may coordinate and/or combine CC switching and antenna switching. It may also be helpful to configure UEs behavior. For example, the UE may not assume it needs to perform simultaneous UL transmissions on more CCs than its UL CA capability. If a TDD SCell is indicated by the network for an aperiodic SRS transmission, the UE may interpret that UL transmissions on other SCells beyond its UL CA capability are dropped or not to be scheduled. If there is a collision between a periodic SRS transmission and another UL transmission (e.g., PUSCH/PUCCH transmission on another CC), then the SRS transmission is dropped.

Within a switching subframe, switching times and guard times need to be reserved, possibly before and after the switching operations. This may change the subframe structures for both the carrier it switches from and the carrier it switches to. For example, to prevent the switching from affecting the next subframe of a TDD carrier, the UE may switch to another TDD carrier in the middle of a subframe, transmit SRS on the other carrier, and switch back to the carrier some time before the ending of this subframe. Due to possible timing differences among the carriers (especially if they are on different bands), the switching back should occur early enough during that subframe to avoid any potential impact on the next subframe. Therefore, it may not be possible to put SRS on only the last (or even the second to last) OFDM symbol of the switching subframe. The current standards allow SRS transmission in the last 6 symbol of a special subframe, but only the last one symbol of a UL subframe which is desired to be enhanced. If SRS transmission is still on the last symbol(s) of a switching subframe, the next subframe may become a partial subframe. The partial subframe may be in UL or in DL. The partial subframe defined in eLAA may be used here. For example, the next subframe in DL may start at the second slot.

The times needed for switching RF from one carrier to another are expected to be dependent on the UE's capability and on the bands in question. Suppose 'switching1' and 'switching2' are the durations required for performing the switch in the two directions. FIG. 9 illustrates embodiment SRS configurations. As shown, the SRS are placed in a manner that reduces the SRS gap.

Within the SRS placement region (as determined above), the SRS symbol can be determined based on some pre-specified rule (e.g., the first full symbol of the SRS placement region).

In one embodiment, there may be one subframe without any PUSCH/PUCCH, just SRS on several CCs. In other words, the entire subframe may be used for several SRS TXOPs. The network indicates the switching orders or SRS transmission orders by one or more UEs. For example, it may indicate the UE with (1, 3, 4, 5) for a subframe, the UE then switches from CC1 to CC3 then to CC4 and CC5 in the subframe. The switching gaps are considered, so the SRS on CC3 may be at the $4^{th}$ and $5^{th}$ symbols (for different RBs and antenna ports on these 2 symbols), then uses $6^{th}$ and $7^{th}$ to switch to CC4, transmits SRS on $8^{th}$ and $9^{th}$, then uses $10^{th}$ and $11^{th}$ to switch to CC5, transmits SRS on $12^{th}$, and switches back on the $13^{th}$ and $14^{th}$. Other UEs may be performing similar operations as well. This may be combined with other embodiments such as the DL subframe as the switching-from CC or MBSFN on the switching-to CCs.

A switching-from operation may occur in a UL subframe or a special subframe. In the latter case, the switching can occur right after the DwPTS is received. That is, the switching-from action can start at the beginning of the GP. However, the number of UL subframes and special subframes may be limited. To increase the opportunity for switching-from operations, an embodiment is to perform the switching-from operation on a DL subframe. If the UE receives no DL grant in a DL subframe, it may switch to another CC in the rest of the subframe. For this to be done, it does not require the UE to have additional capability such as simultaneous transmission/reception on aggregated cells. However, if the UE has the capability such as simultaneous transmission/reception on aggregated cells as indicated in simultaneous Rx-Tx, the UE may be receiving DL on the switching-from CC but also switches its UL to another CC for SRS transmission. Note that the switching-from and switching-to CCs are generally on different bands for this to work. The switching may be a periodic one or for a periodic SRS transmission on the switching-to CC, in which case the UE may start to prepare the switching even in the previous subframe (if no UL transmission was performed, which may be guaranteed by the network's scheduling actions). The switching may also be triggered by PHY-layer signalling, which the UE received at n−4 subframe or even this subframe, in the latter case, sufficient switching gap needs to be reserved for the UE to switch.

An issue that needs to be addressed is the lack of UL SRS TXOP in the switching-to CC. Generally, a SRS TXOP lies in a UL subframe or the UpPTS of a special subframe. In a DL-heavy scenario, the number of configured UL subframes and special subframes may be very limited. There may even be a TDD CC with no UL or special subframe configured at all. One way to provide a SRS TXOP is to utilize dynamic TDD (eIMTA) feature to dynamically change the TDD UL-DL configuration to allow sufficient UL TXOPs for a switching-to CC. If the network or UE does not support eIMTA or not prefer to use eIMTA for a certain SRS switching, one way out is to indicate certain DL subframes on the switching-to CC as MBSFN. The MBSFN pattern may be pre-configured, but a MBSFN can still be used for DL transmissions of DMRS-based transmissions if that subframe is not associated with any SRS transmission. If, however, SRS switching/transmission is indicated, either a periodic one or an aperiodic one, the network/UE perform the following. Assume UE1 is to switch from CC1 to CC2 for SRS on subframe n, which is a MBSFN. First, any UE monitoring CC2 still receives the first 2 OFDM symbols of the MBSFN. No UE would detect any DL grant for the subframe and may turn off its monitoring (buffering) for the rest of the subframe (microsleep). UE1 switches from CC1 to CC2, starts to transmit SRS on a symbol as early as the $3^{rd}$ symbol (right after the MBSFN PDCCH region) or a symbol later than that, and switch away from CC2 before the subframe finishes. As no UE is monitoring the latter portion of the MBSFN, the SRS would not cause any issue on that CC. To avoid interference to other CCs in the same band, it may be useful to configure MBSFN and schedule no UEs on the subframe for all those CCs. The neighboring cells may do the same, unless the UEs are capable of eIMTA interference mitigation. Effectively, the latter portion of the MBSFN may be all used for SRS transmission/switching. If the UE switches from a MBSFN, it may need to receive the first 2 symbols and then switch, which may make the first SRS TXOP x symbols later (x=2, e.g.), if the UE cannot support simultaneous transmission/reception on the aggregated CCs; otherwise the first SRS TXOP can be immediately after the switching-to CC first 2 symbol completes. This has a significant advantage over a special subframe or UL subframe as this can provide more SRS TXOPs.

With more TDD CCs configured for SRS than the UE UL CA capability, the UE behavior should be clearly defined. The UE shall not assume it needs to perform simultaneous UL transmissions on more CCs than its UL CA capability. For example, if a TDD SCell is indicated by the network for an aperiodic SRS transmission on a subframe, the UE shall interpret that UL transmissions on other SCells beyond its UL CA capability are dropped or not to be scheduled (or based on other rules regarding priorities of the transmissions). If there is a collision between a periodic SRS transmission and another UL transmission (e.g., PUSCH/PUCCH transmission on another CC), then the SRS transmission may be dropped on that subframe. In addition, proper collision handling can help reduce the interruptions on other UL transmission, especially for important UL transmissions such as PUCCH and PCell transmission.

For example, the SRS switching has to be consistent with the TDD UL-DL configurations on the TDD carriers involved in SRS switching. For another example, the UE shall not need to perform simultaneous UL transmissions on more CCs than its UL CA capability. If a TDD SCell is indicated by the network for an aperiodic SRS transmission, the UE shall interpret that UL transmissions on other SCells beyond its UL CA capability are dropped or not to be scheduled. If there is a collision between a periodic SRS transmission and another UL transmission (e.g., PUSCH/PUCCH transmission on another CC), then the SRS transmission is dropped. Priority of carriers and priority of signalling should be defined.

UE assumption: The UE shall not assume it needs to perform simultaneous UL transmissions on more CCs than its UL CA capability.

One issue that needs to be resolved is the timing advance (TA) of the transmission, as the UE may not have acquired the TA on the CC. This should not be a problem for intra-band collocated (or QCLed) CCs, as their timings are associated. However, UL timing may be not synchronized due to carrier belonging to an sTAG and no active carriers in the sTAG. If the CC belongs to a TAG with an acquired TA on another CC, the TA may be used. Otherwise, the UE may not have the TA.

One approach is to ensure that the UE has UL timing on carrier before it performs SRS transmission. Such an approach may include one or more of the following steps. 1. UE receives a request to transmit an SRS on a carrier. 2. UE checks whether it has a timing advance for the carrier. 3. If timing advance is current, UE transmits SRS. Otherwise (e.g., TA timer for the sTAG has expired) UE disregards the request to transmit an SRS.

Another way is the UE needs to use some estimated TA provided by the network or perform RACH. The network identifies random access carrier of sTAG, perform RACH to obtain timing advance, and then transmit SRS on carrier. The network may also estimate based on how much time before SRS is transmitted by UE, and how long SRS resource is assigned to UE, which can help the network gain a better understanding of the timing of the UE and decision on if a RACH is needed, or which form of RACH is needed. One RACH for one TAG should be sufficient. Consider the case where UE is in a 3DL 1UL configuration. The second and third DL carrier belongs to a different timing advance group (TAG) than the first. The second carrier provides the reference timing and random access opportunities for the sTAG. Such an approach may include one or more of the following steps 1. UE is requested to transmit SRS on carrier 3. The request also provides a RACH preamble; 2. UE determines that it does not have timing advance for carrier 3 (e.g., TA timer for the sTAG has expired); 3. UE tunes uplink to carrier 2 and performs RACH; 4. UE receives RA response with timing advance (for carrier 2 and 3); 5. UE tunes uplink to carrier 3 and performs SRS transmission.

Alternatively, the UE may need to apply sufficient time gaps before and after the SRS transmission is needed to avoid interfering with other transmissions, and the durations of the gaps depend on the possible timing errors, which is normally at most half an OFDM (or SC-FDMA) symbol duration, but with smaller timing errors, the gaps can be shorter, and the SRS symbol duration can be longer than (such as between 1 and 2 OFDM symbol durations). This avoids RACH but essentially combines the RACH functionality into the SRS transmission. For example, if the UE needs to transmit SRS on CC2 which it has not TA but the network knows the timing error is within a half OFDM symbol duration, the network can indicate the UE to transmit one symbol SRS on CC2 across 2 symbols, with half symbol blanking before and half blanking after. The network does not schedule any transmissions on these 2 symbols (except for other SRS or RACH). If the time error is only ¼ of a symbol, then the blankings can be only ¼ before and after the SRS. In this case the network may indicate the UE to transmit a longer SRS, such as 1.5 symbol duration, which provides more energy for the network to detect. However, SRS of whole symbol durations can always be supported, even though there may be more blanking. This can also be used for multiple symbol SRS transmissions, such as blanking 0.5 before 2 consecutive SRSs and 0.5 after.

After switching from the first component carrier to a second component carrier, a UE may cease all transmissions over the first component carrier at a time specified by the instruction received from the network. The UE may then switch to a second component carrier within a transition period, and transmit a signal according to the instruction received from the network. After the transmission, the UE may switch back to the first component carrier, or alternatively, to a third component carrier according to instructions received from the network. In general, cell switching instructions may identify the current component carrier, the target component carrier, a time instance in which the UE should cease transmission over the current component carrier (e.g., an SC-FDMA symbol location), an instance to begin transmitting signalling (e.g., SRS or otherwise) on the target component carrier, transmission parameters for the target component carrier (e.g., signal formats, contents, resources, timing, power, etc.), and/or other switching information (e.g., should the UE should switch back to the current component carrier after an interval, should the UE switch to another component carrier after the interval, should the UE stay in the target component carrier after the interval). As used herein, the term "current carrier" refers to the carrier that a mobile device is transitioning from during a switching operation, and the term "target carrier" refers to a carrier in which the UE is switching to during a switching operation.

Figure 40:
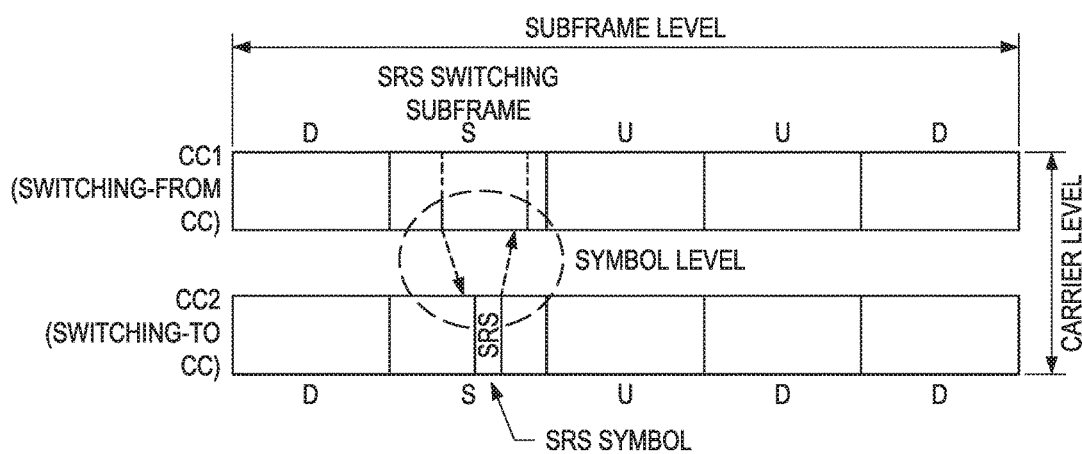
FIG. 40 is a diagram of a carrier based SRS switching scheme.

FIG. 40 illustrates an embodiment SRS carrier based switching scheme. As shown, SRS switching is performed on the carrier level, subframe level, and symbol level, where D/S/U represent downlink/special/uplink subframes, respectively.

One goal of SRS switching is to reduce the number of symbol durations between the last transmission over the current candidate carrier and the first transmission over the target candidate carrier. Another goal of SRS switching is to reduce the number of switching operations as well as combine multiple switching operations. Another goal is to reduce the number of collisions between SRS transmissions in order to decrease the SRS processing complexity at the base station and/or mobile device.

A collision may be due to: 1) There are UL transmissions scheduled on CCs more than UE UL CA capability; 2) There are both UL transmission and DL reception scheduled on the same CC at the same time; 3) The interruption time due to SRS switching in either UL or DL may cause the UE not able to transmit or receive. Specifically, this may affect not only the subframe of SRS transmission on a PUSCH-less CC, it may also affect the next subframe of the switching-from CC (e.g., the PCell) during the switching-back operation.

Figures 41, 42:
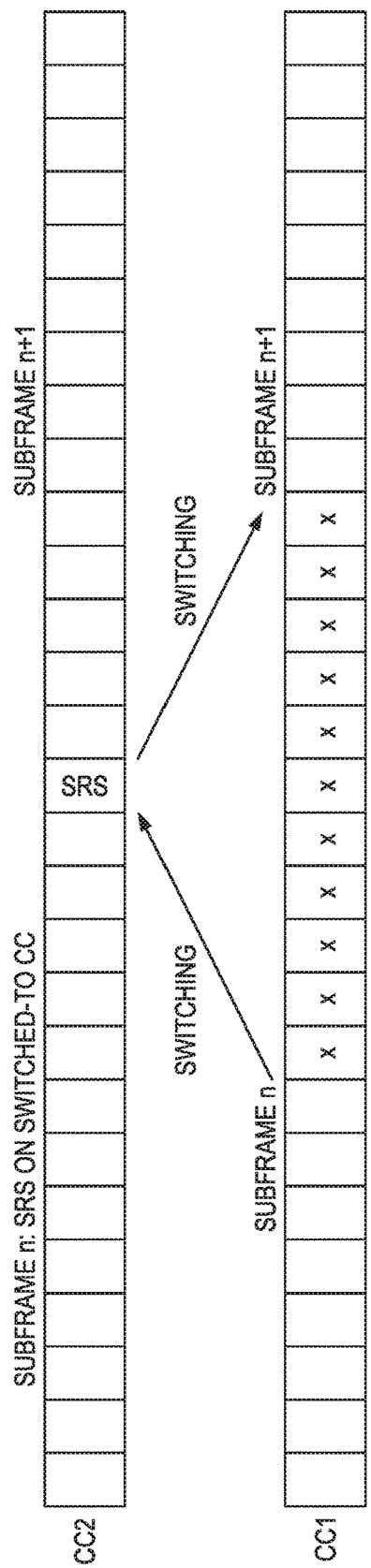
FIG. 41 is a diagram of another carrier based SRS switching scheme.
FIG. 42 is a diagram of an embodiment multiple SRS switching operations and SRS transmissions in one subframe.

Therefore, if a UE RF switching time is >0 us, and if the SRS on the switched-to CC is transmitted not early enough, the beginning symbols of the next subframe is impacted. FIG. 41 is a diagram of a carrier based SRS switching scheme. SRS collisions may occur when a UE performs an SRS transmission in the last symbol of a subframe, and another UE needs to transmits or receives a signal in the first symbol of the next subframe. If the SRS symbol position design considers SRS switching time, then such collisions may be avoided, or at least mitigated. SRS collisions may also be caused by the difference in timing advances between different UEs (e.g., UEs in different TA groups (TAGs)). Those SRS collisions may be eliminated, or at least mitigated, if the SRS symbol position accounts for timing advance difference, e.g., if the SRS symbol positions account for the maximum potential TA differences.

Another goal of SRS switching is to reduce overhead. Each SRS switching operation may involve a certain overhead, and frequently switching back and forth can lead to high overhead. The overhead may include signalling overhead, UE operation overhead, interruptions, etc. It is beneficial to reduce the overhead due to switching. For example, one signalling to trigger more than one SRS switching or SRS transmissions can be considered for signalling overhead reduction, and hence the SRS subframe may allow multiple SRS switching operations and transmissions.

SRS switching may include switching from one TDD carrier to another TDD carrier, switching from a FDD carrier to a TDD carrier, switching between TDD component carriers having different configurations (e.g., different ratios of uplink-to-downlink resources, TDD special subframes, different guard periods (GPs), etc.).

The switching time affects the SRS subframe. For example, if the switching time is longer than the GP of a special subframe configuration, then it may not be possible to use the first symbol of the UpPTS for SRS transmission. If the switching takes up to 2 symbol durations to complete, then the SRS transmission on CC2 may need to be completed at least 2 symbols before the next subframe starts in order for the UE to switch back to CC1, otherwise CC1's next subframe may be affected.

TA and timing error affect the SRS subframe. There are several situations that TA can impact SRS subframe design. For example, if the UE switches from DL reception on CC1 to SRS transmission on CC2, there needs to be a sufficient guard time reserved for the CC2 TA before a SRS symbol can be transmitted. This guard time may be absorbed into the GP in a special subframe, but if CC1 and CC2 are in different TAGs then some time in addition to the GP may be required. The DL reception on CC1 may also be in a DL subframe (e.g., an MBSFN subframe), and a new switching gap needs to be defined.

For another example, if the UE switches from UL transmission on CC1 in TAG1 to SRS transmission on CC2 in TAG2, the TA difference between TAG1 and TAG2 needs to be considered, and there may need to be a guard time before or after the SRS symbol(s) on CC2, otherwise some transmission/reception may need to be dropped. If timing error exists (such as due to timing drift in the UL if the closed-loop timing adjustment for the UL transmissions is not used or has not been used for some time), the maximum possible timing error may need to added to the switching gap.

One embodiment SRS subframe may include more symbol positions for SRS transmissions on a target carrier. To avoid affecting any potential transmissions/receptions on the next subframe, SRS on a target carrier can be transmitted on a symbol previously not assigned to SRS. In some embodiments, unoccupied symbols (e.g., data, control, etc.) in the target carrier can be assigned to carry SRS transmissions.

If RF retuning and TA difference lead to 2 symbol gap for SRS switching, then at more than two symbols (e.g., between two and eleven symbols) may be assigned to carry SRS transmissions in an UL subframe on the target carrier. Similarly, all but the last 2 symbols in UpPTS (including additional SC-FDMA symbols in UpPTS) of a special subframe, and symbols 4~11 in a DL MBSFN subframe can be used SRS transmissions on the target carrier. If more symbols can be allowed for SRS transmission on a target carrier, it is more likely to reduce the number of interrupted subframes due to SRS switching. In other words, for the target carrier, effectively the subframe becomes a SRS subframe, with gaps at the beginning and at the end to absorb switching time, timing error, and TA, and all symbols in the middle can be potentially used for SRS transmissions.

One embodiment SRS subframe may have multiple SRS switching operations and SRS transmissions for a UE To help reduce overhead due to SRS switching, multiple SRS switchings and SRS transmissions can be performed consecutively within one subframe. This is made possible by allowing more SRS symbols on a target carrier.

FIG. 42 shows an example of multiple SRS switchings and transmission, all done within one subframe, in which each operation takes 2 symbol durations. Note that on a target carrier, more than one SRS transmissions can occur (e.g., for different antenna ports and/or for different transmission bandwidths). In contrast, if switching operations are configured or indicated separately and performed separately, then multiple subframes would need to be used for SRS switching, leading to higher overhead.

To avoid interference between SRS and other signals, the SRS subframe may not be scheduled with any other transmissions in the cell (except for the first 2 symbols in the case of MBSFN subframe used as a SRS subframe and the DwPTS in the case of a special subframe used as a SRS subframe). Alternatively, if other transmissions in the cell are to be allowed in the SRS subframe, they may be TDMed with the SRS transmission, resulting in truncated transmissions, such as shortened PUSCH (a partial starting subframe and/or a partial ending subframe may be used) or shortened PUCCH.

There are several embodiments for the switching subframes.

One embodiment is that the target carrier subframe is a special subframe. If the target carrier subframe is a special subframe, all UpPTS symbols may be used for SRS transmission (subject to switching gaps). However, there are special subframe configurations with only 1 symbol UpPTS and not allowing additional symbols to be used for UpPTS (e.g., special subframe configuration 4 with 12 symbol DwPTS); in this case the special subframe may not be suitable as a target carrier subframe, and therefore the next two embodiments listed below need to be considered.

One embodiment is that the target carrier subframe is a UL subframe. If the target carrier subframe is a UL subframe, all symbols may be used for SRS transmission (subject to switching gaps). PUCCH (including the shortened PUCCH format) or PUSCH on the carrier may not be transmitted on this subframe by any UE in the cell unless the SRS occupies a small number of symbols. For example, if the switching gaps and SRS transmissions occur in the second slot of the SRS subframe, other UEs in the cell may still be scheduled to transmit in the first slot of the SRS subframe. Alternatively, if the switching gaps and SRS transmissions occur in the first slot of the SRS subframe, other UEs in the cell may still be scheduled to transmit in the second slot of the SRS subframe. If partial PUSCH and/or PUCCH is to be supported, then proper indication from the network should be provided so that UEs transmitting PUSCH/PUCCH can puncture one or more symbols of the PUSCH/PUCCH transmissions accordingly. Puncturing symbols in a transmission may comprise not transmitting the punctured symbols, or otherwise transmitting null symbols (e.g., symbols transmitted at a zero power level), over one or more resources assigned to carry the transmission. The resources over which the symbols are punctured may be a priori information to the base station and/or UE. In one example, a PUCCH transmission is scheduled to be transmitted in the same subframe as an SRS transmission, and the PUCCH transmission may be shortened in the time domain by puncturing one or more symbols of the PUCCH transmission that have the potential to overlap with, or otherwise collide with, symbols of the SRS transmission. However, it may be possible that all SRS transmission bandwidth is configured to be restricted in PRBs that would not overlap in the PUCCH region. For example, if the bandwidth includes 100 PRBs for a cell, but the eNB configures all UEs associated with the cell with no more than 94 PRBs and none of the PRBs is in the PUCCH control region, then PUCCH and SRS from different UEs are orthogonal in frequency and may be sent simultaneously by different UEs (the same UE should not send PUCCH and SRS on overlapped symbols even if they are orthogonal in frequency). Therefore, a UE may assume that in such a SRS subframe, no SRS from any UE would collide with PUCCH in frequency domain, and the UE is not expected to transmit SRS and PUCCH on overlapped symbols (dropping is adopted if this is to happen).

SRS switching may collide with DL reception. For example, it may impact the latter symbols of DwPTS (or even DL subframes due to non-alignment of subframe boundaries for different bands). In this case, overlapping symbols of PDSCH are punctured. SRS switching is not allowed to impact the control region of DL; or alternatively, the entire DL transmission in the subframe is dropped. In one embodiment, the UE assumes the symbols/slots/subframes that partially or completely overlap with SRS switching are not to be used for UL or DL transmissions by network scheduling.

For example, if the first symbol of a UL subframe is affected due to SRS switching, then the existing shortened PUCCH format may be reused with a shift in time-domain for PUCCH but with the same or shifted RS locations.

FIG. 43 is a diagram of a carrier based SRS switching scheme. As shown, if UE SRS switching collides with beginning symbols in subframe n+1, a shortened PUCCH carrying A/N for subframe n-k is sent on the unaffected symbols in n+1.

In the shortened/punctured PUCCH, the punctured symbols are up to the DMRS symbol, i.e., DMRS symbols should not be punctured. If there is a potential overlap between DMRS symbols and SRS switching, then the priority/dropping rules apply. For PUCCH formats with x symbols before the first DMRS or after the last DMRS, up to x symbols can be punctured. If orthogonal cover code (OCC) is used for UE multiplexing, puncturing may lead to non-orthogonality. There are a few embodiments for this. One is to rely on cyclic shift and FDM only for orthogonality, and no OCC is utilized for orthogonality. For example, with normal CP and delta_shift=2, ACK/NACK from 18 different UEs can be multiplexed with format 1a/1b. With more RBs for PUCCH, the capacity should not be a big problem. Proper configuration of delta_shift and number of PUCCH RBs can be helpful. Another is to configure all UEs with the same punctured PUCCH (with the same number of punctured symbols) to be on overlapping PUCCH RBs, and the OCC is used according to the leftover PUCCH data symbols. For example, if 3 data symbols are left in a slot, then OCC of length 3 is used, and at most 3 UEs can be orthogonally multiplex using OCC. If 2 data symbols are left in a slot, then OCC of length 2 is used. This is similar to shortened PUCCH format 1a/1b which can be reused for the case that the 1$^{st}$ symbol is punctured.

For the purpose of maintaining OCC orthogonality due to puncturing, the eNB may configure larger PUCCH regions related to PUSCH hopping offset so that more RBs may be used for PUCCH. And the UE may select n_CCE (or other UE specific parameters) for DCI properly so that the UEs with different numbers of punctured of PUCCH symbols and different formats of PUCCH use different PUCCH RBs. Alternatively, each mixed format region may be used for one type of punctured PUCCH. The unused RBs may also be used and eNB configuration/indication may be needed for this purpose.

Ack/Nack repetition may also be configured by the eNB with a repetition factor of 2. The repetition may be used only when a collision with Ack/Nack occurs. That is, for subframes not affected by SRS switching, no repetition is used, and for subframes affected by SRS switching, Ack/Nack is repeated, or effectively speaking, delayed to the next Ack/Nack opportunity. The next Ack/Nack opportunity may bundle those delayed from the previous opportunity and those for this opportunity.

One embodiment is that the target carrier subframe is a DL subframe. If the target carrier subframe is a DL subframe, it needs to be a MBSFN subframe, and no PDSCH shall be scheduled. All symbols may be used for SRS transmission (subject to switching gaps). The use of DL subframes for SRS transmissions may help avoid reducing UL resources and may help reduce collision with PUCCH.

On the other hand, there are embodiments for the switching-from subframes. One embodiment is that the target carrier subframe is a special subframe. If the current carrier subframe is a special subframe, the UE can start switching away immediately after DwPTS. In case the GP is sufficient long, the UE may switch back to this carrier for the next subframe or for one or more SRS transmissions on this carrier in UpPTS. However, if the DwPTS is long, this subframe is not suitable to be a switching-from subframe if it would impact the next subframe.

One embodiment is that the target carrier subframe is a UL subframe. If a UL subframe is not scheduled with any UL transmission, then this subframe can be a switching-from subframe. The switching away can start immediately after the previous subframe or after SRS on this carrier is transmitted. After the UE switches back to this carrier, if there is one or more symbol left in this subframe, one or more SRS transmissions may be performed.

One embodiment is that the target carrier subframe is a DL subframe. If a DL subframe is a MBSFN subframe and not scheduled with any PDSCH, then this subframe can be a switching-from subframe. Immediately after the PDCCH region, the UE can start to switch away from this carrier.

Note that the switching for SRS transmission in the UL may cause DL interruption. The DL interruption may be due to the RF retuning in the UL switching, and in this case, the DL interruption caused by the UL retuning is no longer than the RF retuning time (e.g., 2 symbols). This may be the case if the UE has an implementation with a single RFIC or strongly coupled transmission and reception chains. If the UE reports an interruption is needed for CA operations (e.g., CA activation/deactivation, etc.), then it is possible that DL interruption due to UL retuning would occur, otherwise the DL interruption due to UL retuning would not occur. Alternatively this may be a UE capability reported to the network reflecting RF retuning time and whether DL interruption would occur during RF retuning. For SRS transmission on a target carrier, during the transmission the DL may also be interrupted if the UE is not capable of simultaneous reception and transmission in the aggregated cells. The interrupted DL symbols or subframes need to be handled, such as occurring in blank portion of a MBSFN subframe. If there are multiple possibilities of which carrier(s) will be interrupted in DL, needs to specify the DL carrier(s) of interruption. The interrupted DL carrier(s) may be viewed as the switching-from CC(s) for a SRS switching. For example, if a switching occurs in subframe n, and subframe n+1 is affected, and subframe n+1 is a DL subframe, either CC1 or CC2 may be selected as the affected DL subframe. The network can configure or indicate which one should be selected.

The above current carrier subframe types and target carrier subframe types can be combined. It is more likely that in typical operations, the current carrier subframe type and target carrier subframe type are the same, but in FDD+TDD CA, inter-band CA, etc., other cases can happen. Note that when both the switching-from and target carrier s are considered, the SRS transmission symbol positions are not only affected by the subframe types but also the RF IC architecture of the UE. For example, if the transmission and reception of the UE is done by one RF chain or they are tightly coupled, then fewer symbols may be used for SRS transmission; otherwise more symbols may be used for SRS transmission. These are illustrated in FIG. 42. Some more details are described below.

In FIG. 44A, it shows the case that the UE switches from CC2 to CC1 for SRS transmission on CC1 in a SRS subframe. Both carriers are special subframes. The UE is assumed to have single RF design so that the transmission and reception on the CCs are coupled. It is also assumed that the special subframe configurations are aligned, i.e., the durations of DwPTS and UpPTS are the same for the CCs. Then the UE needs to monitor the DwPTS in DL, and starts the switching after the ending of the DwPTS. However, if the UE detects no PDSCH scheduled for the subframe, it may start the switching immediately after the control region ends. For example, if the control region has 2 symbols but the DwPTS has 3 symbols, then the UE may start switching from the $2^{nd}$ symbol (counting from 0) if it does not detect any grant for PDSCH and knows it needs to switch to CC1. However, the DwPTS may contain more CRS after the control region. In legacy systems, the UE may or may not monitor those CRS if there is not PDSCH. This may be kept, but a better way may be to allow the UE not to monitor those CRS so that a switching can occur earlier in time. The network may configure the UE to transmit SRS on CC1's symbol 4 while the control region spans symbol 0 and 1 and the UE needs 2 symbols to switch, even if the DwPTS has, say, 9 symbols. That means the UE should not expect a PDSCH grant, and it can ignore all CRS after the control region but switches to CC1 immediately after the control region. Another alternative is that if the UE is configured to transmit SRS on CC1 on an early-enough symbol (say, symbol 4), then the UE may assume the subframe contains no grant to it to detect and it does not need to monitor CRS either on CC2. In that case, the eNB would not transmit any information to the UE to receive in that subframe. There is also a case that the eNB sends aperiodic SRS trigger a few subframes before to the UE to schedule SRS transmission on CC1, and the UE may behave similarly. If same subframe trigger is used, then the UE should detect the PDCCH in the control region, and if such a trigger is found, then no other DL reception is expected, and the UE can immediately switch away from CC2. Note that there may be some time for the UE to detect the PDCCH for the trigger, so the eNB shall not trigger a SRS transmission on a symbol too early for the UE to transmit. For example, if the control region has 2 symbols, and the UE takes one symbol time to detect and decode the PDCCH (if the UE capability is known to the network), then the earliest switching can occur at symbol 3, and the earlier SRS transmission can occur at symbol 5 on CC1. After the switching, the UE may start the SRS transmission per configuration and indication, including the symbol positions. Note that there may (or may not) be a gap of symbol(s) before the signalled SRS transmissions. There may be one or multiple SRS transmissions on CC1, and the UE may be signalled to switch to yet another CC for SRS transmission if there is sufficient time in the subframe left. Finally, the UE may be scheduled to transmit SRS in UpPTS (on one or two or more symbols) on CC2, so the UE would switch back to CC2 and transmit. If carrier switching to support RACH transmission is also performed, similar concepts and procedures can be adopted.

Figure 44C:
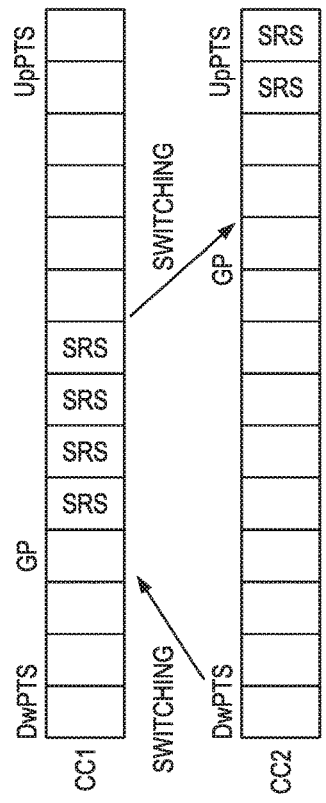
FIG. 44A-44K illustrates embodiments of SRS switching operations with different subframe types and RF architectures.

Similar embodiments may be used for FIG. 44B, where the special subframe configurations are different for CC1 and CC2. But in any event, the UE can switch away from CC2 after it completes the DL reception. The various embodiments discussed above can be adopted for this case. Needless to say, if there is not enough time left on CC2 in UpPTS, then a SRS transmission on CC2 should not be performed as shown in the figure. In FIG. 44C, the same settings as in (a) are assumed except that the UE is assumed to have separate/decoupled transmission and reception RF design, so that the UE can freely switch its transmission from CC2 to CC1 anytime as long as no UL on CC2 is scheduled. Therefore, in the figure, the UE still receives DL for the entire DwPTS, but the UL is switched to CC1 even before the DwPTS ends. The UE may switch the UL even earlier, if the UE knows that SRS switching is to be done in this subframe. For example, if the SRS transmission on CC1 is configured, then the UE can switch even before the subframe starts. For another example, the DwPTS region may span to symbols, but the UE detects trigger for SRS transmission based on PDCCH in symbols 0 and 1 and completes the detection and decoding of DCI in symbol 2, then it can start switching on symbol 3 while the DL reception is still ongoing till symbol 9. However, in this case, the UE needs to report its RF capability, such as capable of simultaneous reception and transmission in the aggregated cells.

Figure 44D:
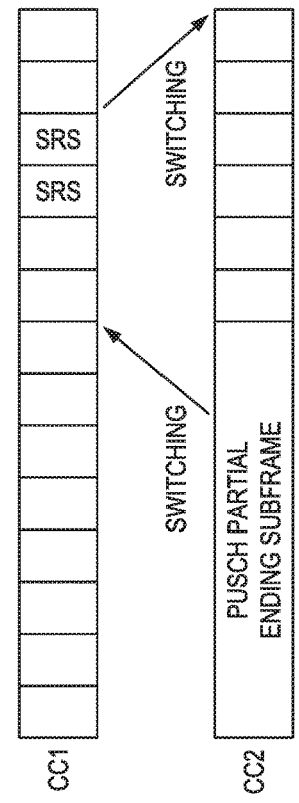
Figure 44E:
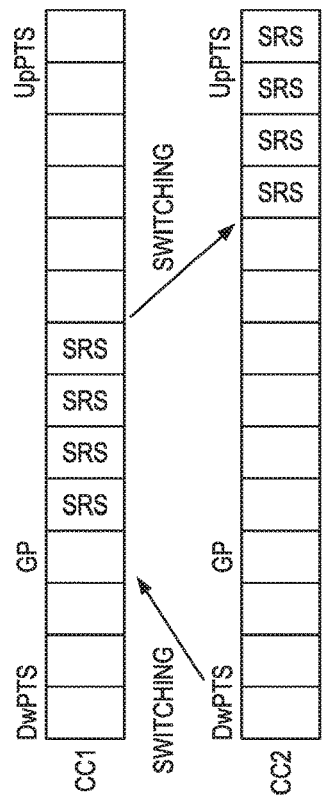
Figure 44F:
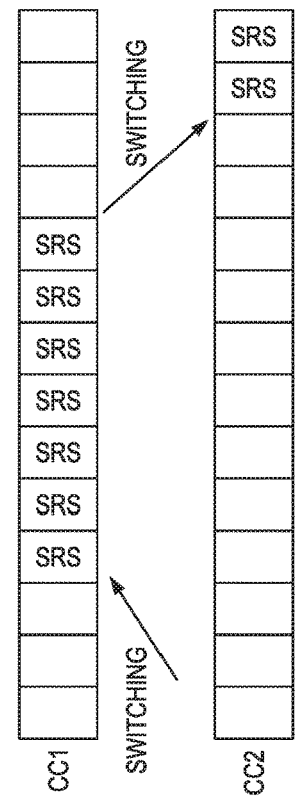

FIG. 44D shows a similar example as (c) but the special subframe configurations are different for the CCs. Similar embodiments can be adopted. FIG. 44E shows an embodiment of switching from a UL subframe to a UL subframe. CC2 cannot be scheduled with any UL transmission overlapping with CC1's SRS transmission and the switching time. However, on non-overlapped symbols, SRS and shortened PUSCH may be transmitted on CC2 (see FIG. 44F for an example).

Figure 44G:
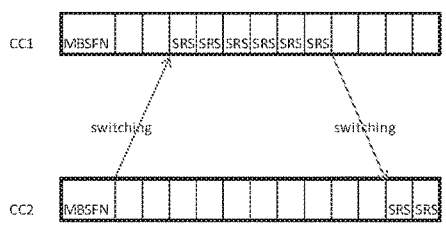
Figure 44H:
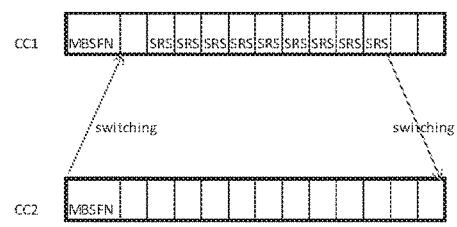
Figure 44I:
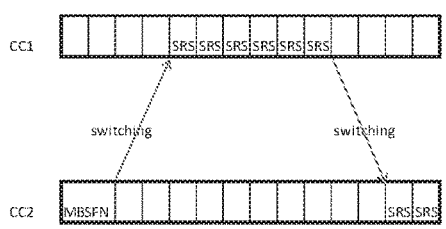
Figure 44:
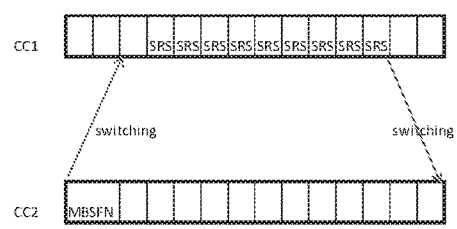
Figure 44K:
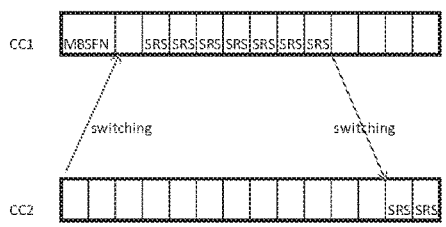

FIG. 44G shows an embodiment of switching from a DL subframe to a DL subframe. Both subframes are configured as MBSFN. Several other cases are shown in FIG. 44I, FIG. 44J, and FIG. 44K, but it is not meant to be exhaustive. Above embodiments apply whenever appropriate, and combinations of them can be done.

The switching-from and/or switching-to subframe may also be a DRS subframe or immediately after a DRS subframe, especially if the carrier is in deactivated mode or the UE is in DRX.

If RACH is to be transmitted, similar designs follow.

The switching gap affects the SRS subframe, from efficiency point of view and feasibility (in terms of currently supported SRS symbol positions) point of view.

For example, if the switching gap (e.g., 900 us) is longer than the duration of GP and UpPTS of a special subframe configuration, then it may not be possible to use the any symbol of the UpPTS for SRS transmission. In this case, the next subframe, which is generally a UL subframe, has to be used for SRS transmission. Clearly, relying on only the last symbol of the UL subframe as currently supported is far from efficient.

For another example, in the case that a UE switches from CC1 to CC2 for SRS transmission on the last symbol of a UL subframe, and if the switching gap takes a non-zero time to complete, then when the UE switches back to CC1, CC1's next subframe will be impacted. If it is desirable to reduce the number of subframes impacted by SRS switching, SRS transmission opportunities supported by current UL subframes are insufficient.

For yet another example, if the switching gap is long, say 500 us or more, then the switching-back action on a special subframe will impact the next subframe, even if the SRS transmission is on the first symbol of UpPTS.

To summarize, one can see that if all RF switching duration values are supported in the standards, then the current SRS symbol positions in special subframes or UL subframes are insufficient. There are two alternative choices:

Choice 1: Add more SRS transmission opportunities; OR
Choice 2: Support all RF switching durations provided by RAN4.

If Choice 2 is decided, then some RF switching durations provided by RAN4, e.g., 500 us, 900 us, will not supported at least in Rel-14, though future releases may provide support for them.

Alternatively, if Choice 1 is decided, RAN1 needs to standardize new SRS transmission opportunities in addition to the up to 6 symbols in UpPTS and the last symbol in UL subframe. The rest of the contribution provides more details for this choice.

With Choice 1, all SRS switching gaps need to be supported. Inevitably, SRS switching operation will span more than one subframe, especially for the cases with long switching gaps. For efficiency, it is preferred to allocate multiple consecutive subframes for SRS switching. For example, one complete SRS switching operation (from switching from CC1 till switching back to CC1) can contain a special subframe, the next UL subframe, and possibly even one more subframe. The UE can perform multiple SRS transmissions on one or more TDD CCs in these subframes. Note that those TDD CCs may lie within one band and there may be no switching gap between the SRS transmissions on those TDD CCs.

Next we consider options for timing advance for SRS on TDD CCs without PUSCH.

A UE may have more TDD CCs with PDSCH than TDD CCs with PUSCH. With proper network configurations and indications, UE can perform switching to any TDD CC and transmit SRS on that CC. One problem that needs to be resolved is the timing advance (TA) of the transmission, as the UE may not have acquired the TA on the CC. Note that in previous releases, a CC without UL may not be configured in any TAG. At least for SRS switching purposes, any CC that will support SRS transmission needs to be configured in a TAG. To do so, the eNB needs to configure a UE with TAGs and add the indexes of all CCs supporting PUSCH/PUCCH/SRS/RACH into corresponding TAGs.

There are two main cases to be considered:

1) If the CC belongs to a TAG with a valid acquired TA on another CC of that TAG, the TA may be used as already defined in the standards.

2) If the CC belongs to a TAG with no valid acquired TA on any CC of that TAG, there are again two cases:

a) At least one CC in the TAG supports PUSCH. In this case, the reason that the TAG does not have a valid acquired TA may be that there is no RACH or TA update for an extended period of time. Then RACH on the CC with PUSCH can be used to acquire the TA, or current TA update mechanism can be used on that CC. The network should ensure that before SRS switching to a CC without PUSCH in the TAG, a valid TA is available for the TAG. For example, before the eNB sends a SRS trigger for a CC, the eNB needs to make sure that the UE has a valid TA for the associated TAG. So from UE point of view, the UE may assume that the eNB would not send a SRS trigger for a CC without a valid TA associated with the CC's TAG. One embodiment is that when the UE receives an activation signalling for a CC in a deactivated TAG with PUSCH and RACH (possibly on a second CC), the UE should transmit RACH. This RACH can be non-contention based, and the time-frequency resources for the RACH may be indicated in the activation signalling. Or alternatively, the UE should not transmit the SRS, and the UE may send a request (e.g., scheduling request) to the eNB to request for a RACH on a CC supporting RACH in the TAG.

b) No CC in the TAG supports PUSCH. This is the main focus of this contribution. There are a few options:

i) Option 1: Introduce RACH on one of the CCs in the TAG.

This requires standards changes including the following. First, the standards should allow a UE to be configured with RACH on more CCs than its UL CA capability, but on those CCs, no PUSCH is configured. Pre-configuration of the transmission resource/preamble code group of new RACH, and employing the PDCCH on the current carrier to trigger the transmission of preamble code in these pre-configured resources on the switched-to carrier could be considered. Second, collision between RACH on a PUSCH-less CC and other UL transmission on another CC may occur if these UL transmissions exceed the UE UL CAP capability, and hence collision handling for the newly introduced RACH needs to be provided. The collision handling is similar to SRS collision handling, but the RACH may have higher priority than SRS to ensure the timing is available. In general, the RACH may have higher priority than any other UL transmissions except for PUCCH carrying ACK/NACK. Alternatively, the RACH may follow the same priority as the aperiodic SRS switching. Third, this RACH may be non-contention based and may be used to acquire a timing advance on a carrier that does not include a physical uplink shared channel (PUSCH). Fourth, considering carrier switching time of possibly a couple of symbol durations, the shortened RACH preamble format 4 may be used. The RACH is also subject to the switching time limitations, so it may take the UE a couple of symbols to switch to a TAG for RACH transmission, and then switch back within another 2 symbols. If the shortened RACH is used in the UpPTS, then the next subframe may be impacted and the UE cannot receive DL or transmit in UL on the switching-back carrier. Then the next DL may become a partial subframe, or the next subframe may become an UL subframe without scheduling any UL transmission on the switching-back carrier by the eNB. In other words, if RACH with shortened form is to be performed in UpPTS, then the next subframe may be UL and without any scheduled transmissions on the carrier. Similar concepts can be adopted for regular RACH. Alternatively, the network may indicate the UE to transmit RACH at least 2 symbols (or another appropriate amount based on the needed switching time) before the subframe ends. This requires the shortened RACH to be shifted away from the last 2 symbols of the special subframe (RACH symbol position should be configured and/or indicated), and regular RACH to be shortened in time domain and leaves sufficient gap before the subframe ends. Non-shortened RACH formats (e.g., format 0), if the switching times plus transmission time can be fit into a subframe, can also be supported. For format 0, the RACH transmission time is about 900 us, so a switching of less than 40 us should work and no other subframe would be affected. For one TAG, one RACH on a carrier in the TAG is sufficient. RACH would not be needed afterward if SRS transmissions in the TAG keep the UE updated with TA adjustment. Therefore, such RACH may be only an initial RACH after serving cell configuration, or after a TAG is activated after deactivation or long DRX. However, as RACH is usually needed only once for a TAG, even if the RACH may collide with other subframe's transmission/reception, this may be acceptable and in these cases, RACH has higher priority and other transmissions are dropped. The network should have the knowledge beforehand and may schedule accordingly to avoid the dropping. The UE may assume no other transmissions/receptions would occur if they collide with RACH.

For the RACH configured on TDD CCs without PUSCH, the UE needs to perform carrier switching. The switching-from CC needs to be specified if the UE supports more than one CC, in RRC configuration for RACH or in DCI for triggering the RACH. For periodic SRS, it is preferred to configure the switching-from CC in RRC configuration. For aperiodic SRS, the switching-from CC may be configured in RRC configuration, or alternatively, specified in PDCCH order for triggering the RACH. Alternatively, as a default, if the UE support only 2 UL CC CA, the switching-from CC for RACH is always the UL CC not associated with PCell, i.e., PCell UL is not impacted. One example is that CC 1 is switching-from carrier while CC 2 is switched-to carrier. The new RACH transmission could be configured and/or indicated in CC 1, and the message 1 is sent in CC 2 followed by message 2 response in CC 1 or CC 2.

Thus, the network can configure non-contention-based RACH on PUSCH-less CC for only one CC in a TAG group without PUSCH, with new configurations such as switching-from CC specified, cross-carrier scheduling of RACH specified, RAR content specified, etc. RACH format 4 should be supported and shifted earlier for non-zero switching time UE so that the next subframe is not affected. Collision handling reuses existing ones for RACH, or follows the rules for SRS switching.

TA adjustment via TA MAC CE can be done based on SRS transmissions. The current support can be used as a baseline. Cross-carrier indication for TA commands may need to be supported. For example, the TA command may be carried on CC1 though it is to be applied for CC2 (or more generally, for the TAG where CC2 is in).

ii) Option 2: UE estimates TA.

UE can estimate TA for TAG2 based on TA for TAG1 (associated with the propagation delay between the UE and cells in TAG1) and DL arrival timing difference between TAG1 and TAG2 (associated with the propagation delay difference to cells in TAG1 and to cells in TAG2). The time synchronization error between TAG1 and TAG2 will lead to some error to the TA estimate for TAG2, but for TDD cells serving the same UE, the time synchronization error is small (e.g., <500 ns).

The UE then transmits SRS after switching to the CC with the estimated TA, say, on symbol n. However, due to estimation error in TA, the SRS may partially overlap with the symbol before it (symbol n−1) and after it (symbol n+1). There are again a few cases:

a. If the eNB does not schedule any other UE on the CC except for possibly SRS, then the overlap will not impact any PUSCH/PUCCH, since as discussed before, the SRS symbol position may lie in the middle of the SRS subframe.

b. If the eNB schedules another UE for SRS transmission on symbol n−1 or n+1, the SRS transmissions from the UEs will partially overlap in time, but both SRS transmissions can be detected by the eNB since the SRS is repeated (i.e., redundant) in time domain associated with the comb structure in frequency domain. The overlap may nevertheless cause some degradation of received SRS, so it is up to the eNB to determine if SRS from another UE may be scheduled or not.

c. If the eNB schedules another UE for SRS transmission on symbol n, the SRS transmissions from the UEs should have cyclic shifts far from each other, such as one uses cyclic shift 0 and the other uses cyclic shift 4.

To summarize this option, UE can estimates TA and transmit SRS on a switching-to CC. Proper eNB implementations can ensure the SRS to be detected by the UE. No standards impact is required for the option, but some RAN4 testing of UE TA estimation may be needed.

iii) Option 3: UE estimates TA and applies extra guard times.

This is similar to Option 2, but the UE leaves some gaps as guard times for the SRS transmission, so that even with some TA estimation error, the SRS would not overlap with the symbol before it or after it. Therefore, there will be any issue if the symbol before or after the SRS transmission is scheduled for other transmissions. To do so, the effective SRS transmission in timing domain is shortened, or 2 symbols are combined for one SRS transmission in the middle of the 2 symbols. This option requires some standards changes.

If DL timing difference between TAGs is significant, e.g., more than a few microseconds but up to about 32 us between a FDD TAG and TDD TAG, and UE knows only FDD TAG TA but not TDD TAG TA, then purely relying on UE estimate of TA for the TDD TAG may result in larger error. However, such an error is bounded by two times the DL transmission timing difference plus propagation time difference. In typical cases, this is bounded by 1 symbol duration. If the eNB can blank one symbol before and one symbol after the SRS transmission symbol(s) by a UE, then no collision/interference would be incurred, and the eNB can rely on searching in time domain to recover the SRS. This is similar to the variable duration RS design described in U.S. patent application Ser. No. 14/863,382 entitled "Device, Network, and Method for Communications with Variable-duration Reference Signals," which is incorporated by reference herein as if reproduced in its entirety. Alternatively, eNB can signal the UE about DL timing differences between 2 TAGs. The signalling may be in the form of TA or TA adjustment. In other words, although the eNB may not have received any signal (RACH or SRS) from a UE on a TAG, it may still send TA signalling to the UE regarding a TAG, and the TA command is actually the difference between the transmission timing difference between the TAGs (possibly plus some other small adjustments provided by the eNB). Alternatively, the network can configure a TA for a TAG without any PUSCH/PRACH/PUCCH, and the TA reflects the transmission timing difference between the TAG and PCell TAG. At the UE side, it receives the TA, but the TA is a relative value to the PCell TA. Alternatively, the TA configured to the UE may be a relative value to the TAG's DL reference timing, and then the UE should adjust its TA relative to the TAG's DL reference timing. The UE may estimate report the DL receiving timing difference to the eNB. It may use the difference to estimate the TA by TA2=TA1+delta_DL−delta_Tx, where TA1 and TA2 are TAs of the $1^{st}$ and $2^{nd}$ TAGs, delta_DL is the DL receiving timing difference (TAG2 DL receiving time minus TAG1 DL receiving time), delta_Tx is the eNB DL transmission timing difference (TAG2 DL transmission time minus TAG1 DL transmission time). Such a formula may also be used by the eNB if all information is available.

Next we discuss periodic SRS and aperiodic SRS designs. It is generally accepted that aperiodic SRS transmission provides the highest flexibility for the network to obtain channel quality information based on sounding. Therefore, switching to a TDD carrier without PUSCH to perform aperiodic SRS transmission may occur.

Aperiodic SRS is configured via RRC signalling and triggered dynamically via DCI formats 0/1A/2B/2C/2D/4 for TDD and 0/1A/4 for FDD. The configuration and DCI may be enhanced to support SRS transmission based on carrier switching. For example, the DCI may indicate a SRS transmission on one or more carriers, including those without PUSCH. Therefore, the carrier ID associated with the SRS transmission may need to be included in the DCI. If the SRS symbol position needs to be indicated (e.g., the SRS transmission starts at symbol x and ends at symbol y, or starts at symbol x and lasts z symbols, for a particular SRS transmission), such information can be included in the DCI. The DCI may schedule other transmissions or receptions for the carrier receiving the DCI or for another carrier, but the scheduled carrier may be the same as or different from the carrier(s) triggered for SRS transmissions. In cases that the indicated SRS transmissions conflict with the other transmissions indicated by the same (or a different) DCI, collision handling mechanisms are provided. To avoid collision due to the same DCI used for both SRS switching triggering and scheduled UL or the Ack/Nack from the scheduled DL, the timing relation between the SRS triggered switching may be changes (such as shifted to the next SRS transmission opportunity) or the DCI for SRS triggered switching requires a separate DCI.

The carrier ID associated with the SRS transmission may need to be specified in the DCI explicitly or implicitly (via association with one of the multiple parameter sets configured via RRC signaling). This implies that cross-carrier triggering of aperiodic SRS can also be supported. More particularly, a DCI sent on CC1 may be used for cross-carrier scheduling of data for CC2 and cross-carrier triggering of SRS transmission on CC3.

Regarding the number of parameter set configured for aperiodic SRS transmission, the current specification supports up to 3 parameter sets via 2 bits in DCI format 4. If the 2-bit trigger becomes insufficient, one more bit could be considered to be added. On the other hand, for each DL CC (include each FDD CC if aggregated), there can be up to 3 parameter sets configured, which could lead to in total a sufficiently large number of parameter sets usable for aperiodic SRS. Note that the DCI sent on a FDD carrier to trigger the SRS transmission(s) on a PUSCH-less TDD CC may also be allowed. In other words, two options may be considered: either increasing the number of SRS request bits or supporting carrier-specific SRS parameter set configuration. Similar to the introduction of carrier-specific SRS parameter sets, which utilizes the carrier dimension to carry more information about the selection of a parameter set without explicit bits in DCI, one could use other dimensions as well for this purpose. For example, if the trigger is sent in a DL grant, then the indication is associated with a group of parameter sets for DL grant. Otherwise, if it is sent in a UL grant, then one in another group of parameter sets is indicated. Likewise, this can further utilize the DCI format dimension, that is, for 0/1A/2B/2C/2D/4 for TDD and 0/1A/4 for FDD, each format of each TDD/FDD configuration may have a format-specific parameter set. The subframe number (or slot number) within a radio frame or subframe type (DL or special subframe) may also be utilize similarly. For example, a trigger sent at subframe 0 and a trigger sent at subframe 1 may both lead to SRS switching in subframe 6, but if the former is used, the UE uses a first parameter set, while if the latter is used, the UE uses a second parameter set.

The switching-from CC may need to be specified for each transmission. One way is to specify the switching-from CC in RRC configuration of parameter sets. Another way is to specify in the DCI trigger. The former has less physical-layer signalling overhead, but it is less flexible than the latter. RAN1 may consider the pros and cons and decide which to be supported.

For enhanced efficiency, SRS switching operations for several SRS transmissions can be configured to be contiguous in time (subject to SRS switching gaps). This requires the aperiodic SRS to support multiple consecutive SRS transmissions (on the same or different CCs), and high-layer signalling to configure one or more SRS configurations at once, and DCI trigger to trigger one or more SRS transmissions at once. For example, the first SRS configuration is for SRS transmission on TDD CC1 in OFDM symbol k, the second SRS configuration is for SRS transmission on TDD CC2 k+1, and so on, and if the associated bit is set, then the UE will perform carrier switching multiple times and transmit SRS on the specified CCs accordingly.

If the SRS symbol position needs to be indicated, such information can be included in the DCI.

In case that the indicated SRS transmissions conflict with the other transmissions indicated by DCI in a subframe (said, subframe n), collision handling mechanisms should be defined. For example, at subframe n+4, the ACK/NACK for the DL transmission in subframe n needs to be transmitted, and other UL transmission (e.g., PUSCH, CQI feedback) needs to be transmitted in subframe n+4 based on the DCI in subframe n. In this case, the SRS transmissions associated with the SRS trigger in subframe n should not occur in subframe n+4. It may be postponed to the next SRS transmission opportunity, until no DL or UL grant is sent to the UE in subframe n. Several alternatives may be considered. First, the SRS transmission may be postponed to the next aperiodic SRS transmission opportunity, and the next aperiodic SRS transmission opportunity may be associated with no operation (for transmission or reception) as coordinated by the eNB, or the next aperiodic SRS transmission is always associated with UpPTS where no ACK/NACK can be sent. Second, DCI for SRS switching may be associated with no other scheduled DL/UL transmission. Third, in the case FDD+TDD CA, FDD and TDD may have different timing relationships, and thus the DCI for SRS in FDD CC may not cause collision to following UL transmission. Fourth, different HARQ timing for other transmissions scheduled in the SRS trigger may be defined. If aperiodic SRS switching is restricted to special subframe UpPTS (e.g., forming a 10-ms periodicity SRS switching pattern or 20-ms periodicity SRS switching pattern), it could avoid many of the potential collisions, especially to Ack/Nack. In this case, the periodic SRS and aperiodic SRS have similar behavior, and the trigger may be omitted. Alternatively, the trigger is to provide additionally information (e.g., SRS parameter set selection) for periodic SRS. Therefore, it is needed to specify SRS transmission opportunity (subframe position and symbol position).

Periodic SRS has been supported in LTE since Rel-8 as the main means for uplink sounding. Though periodic SRS is viewed as not as flexible as aperiodic SRS, periodic SRS is associated with less signalling overhead than aperiodic SRS, and due to its predictability of occurrence, it may be easier for collision avoidance and handling. With proper configurations, periodic SRS may be utilized more efficiently than aperiodic SRS in certain scenarios. In addition, periodic SRS may be configured with relatively long periodicity (e.g., 20 ms or longer, especially if the switching gap is long) and/or associated with lower priority during collision, so that periodic SRS switching may not affect other transmissions. The configured SRS transmission should also avoid certain subframes, such as subframes 0 and 5. Therefore, periodic SRS transmissions may be used for SRS carrier based switching.

The configuration of periodic SRS can use existing mechanism and signalling as the baseline. For enhanced efficiency, SRS switching operations for several SRS transmissions can be configured to be contiguous in time (subject to SRS switching gaps). This requires the periodic SRS configuration to allow multiple consecutive SRS transmissions (on the same or different CCs), and high-layer signalling to configure one or more SRS configurations at once. For example, the first SRS configuration is for SRS transmission on TDD CC1 in OFDM symbol k for bandwidth configuration 1, the second SRS configuration is for SRS transmission on TDD CC1 in OFDM symbol k+1 for bandwidth configuration 2, and so on. That is, multiple consecutive SRS transmissions on the same CC may be for different bandwidth configurations, antenna ports, and so on. Multiple consecutive SRS transmissions on several CCs may also be configured. For example, the first SRS configuration is for SRS transmission on TDD CC1 in OFDM symbol k, the second SRS configuration is for SRS transmission on TDD CC2 k+1, and so on.

It is needed to configure SRS transmission opportunity (subframe position and symbol position) for periodic SRS, and the configuration should take into account of switching time to reduce the impact to other transmissions. For example, if the switching time is nonzero, the configured SRS symbol position should avoid the last symbol of a subframe.

An issue with periodic SRS is that, if the SRS is rather frequent, it may incur high overhead and cause many disruptions to normal transmission/reception. One way out is to focus on relatively-long-periodicity SRS for SRS switching (e.g., 20 ms or longer), especially if the switching gap is long. For more short-term sounding, the network can rely on aperiodic SRS. In this case, the long-periodicity SRS switching should have relatively high priority. For example, the priority of 40 ms periodicity SRS switching may have higher priority than other UL transmissions (except for possibly those carrying Ack/Nack). Note that even if the Ack/Nack is designed as of lower priority, this generally would not cause any problem as the eNB can schedule accordingly beforehand so that no Ack/Nack needs to be collide with the long-periodicity SRS. Another way is to allow short-periodicity SRS for SRS switching, but the priority is low, so that its disruption to normal transmission/reception can be reduced. When a long-periodicity SRS collides with a short-periodicity SRS, the short one may be dropped.

A preferred resource for periodic SRS switching/transmission is the special subframe UpPTS. One embodiment is 20 ms periodicity, for subframe 1 (or subframe 6 for configuration 0/1/2/6).

For a deactivated carrier or a carrier in DRX, periodic SRS is not transmitted according to current standards. SRS carrier based switching should also follow the same principle, i.e., a UE will switch to a PUSCH-less TDD carrier for SRS transmission only if that carrier is activated and in Active time. This also helps reduce SRS switching overhead. When the UE is in DRX and/or deactivated, then no periodic SRS would be transmitted. However, aperiodic SRS may still be transmitted.

It may also be possible to support periodic SRS switching only, since as seen above, periodic SRS and aperiodic SRS may be configured and used very similar to each other.

General Assumptions and Considerations for Collision Handling

The switching time is reported by UE as a part of UE capability; known by UE and eNB. The report may be indicating one or more of the following values: 0 us, 30 us, 100 us, 200 us, 300 us, 500 us, 900 us. Not all values may be supported for SRS switching, especially for longer switching times. The reporting may be for each pair of CCs, but the overhead would be high. In general, the UE may only need to report a few categories of switching times. For example, intra-band switching usually has the same switching time. For another example, inter-band switching may also have a same switching time. In case the switching from band A to band B has a different time for the switching from band A to band C, both times may be reported, or alternatively for simplicity, the maximum of the two times may be reported.

Collision on some symbols, if to occur, is known to UE and eNB before it occurs

Collision may cause a UE unable to use some resources (e.g. a subframe), but such resources are still usable by eNB (for other UEs)

Multiple options can be considered; they may be combined

When a collision may occur, priorities are defined to drop a certain transmission This consideration is aligned w/ RAN1 agreement; TBD in next meetings If SRS switching affects the next subframe:

A/N has higher priority; the SRS switching is dropped

Aperiodic SRS has higher priority than other UCI/PUSCH

Periodic SRS has lower priority

Figure 45:
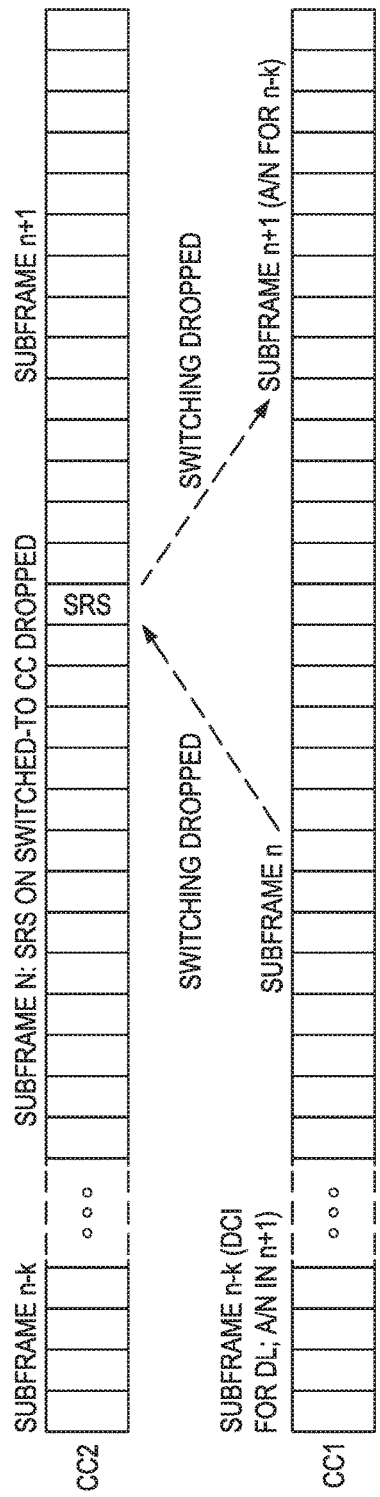
FIG. 45 is a diagram of yet another carrier based SRS switching scheme.

FIG. 45 is a diagram of a carrier based SRS switching scheme. As shown, in this example, if UE SRS switching may collide with the A/N in subframe n+1, the switching in subframe n is dropped.

(E)PDCCH, scheduling request, RI/PTI/CRS may have higher priority than SRS. A-periodic SRS may have higher priority than other CSI and short-periodicity P-SRS. If aperiodic SRS collides with (long or short) periodic SRS, the periodic one is dropped. If one periodic SRS collides with another periodic SRS, the one with shorter periodicity and/or more recent SRS transmission is dropped.

Alternative, periodic SRS could be assigned with higher priority due to its predictability and hence the network can avoid certain collisions via scheduling implementation. For example, periodic SRS with 40 ms or longer may even be allowed to have higher priority than Ack/Nack.

Furthermore, to avoid collisions and dropping of SRS and other transmissions, one can define different priorities for different subframe sets. For example, on one subframe set, SRS has lower priority than other UL transmissions, while on another subframe set, SRS has higher priority than other UL transmissions. The sets may be related to pre-configured UL transmissions (SRS or others) so that these pre-configured UL transmissions can be better protected. For example, if the network wants to protect periodic CSI feedback, it can signal to the UE that the corresponding subframes (and possibly more) are subframes where SRS has low priority; SRS may still be configured or triggered since the subframe pattern may have a different granularity in time. Similarly this can be used to protect SRS. The network can also schedule UL transmissions according to the subframe priorities in implementation.

Potential collision can be avoided by scheduling restriction and UE assumption. For example, SRS switching in subframe n may affect the next subframe n+1 (especially if the SRS transmission symbol is not early enough in subframe n and the switching time is not short enough), but subframe n+1 may be scheduled for UL transmission (e.g., ACK/NACK for a previous subframe). If the eNB has information about UE switching time and hence it can know if a potential collision may occur, it can restrict its scheduling of UL/DL transmissions (including SRS transmission on a switched-to CC) so that the collision would not actually occur. Correspondingly, the UE should be able to assume that if a SRS switching is to be performed in subframe n and the SRS switching affects subframe n+1, no transmission/reception by the UE is expected via network implementation. If SRS switching affects the next subframe:

UE shall assume that no PUCCH (nor PUSCH) be scheduled for the next subframe eNB should ensure this by no scheduling for the next subframe in DL or UL a few subframes before Con: the entire next subframe may not be usable by the UE (still usable by eNB for other UEs)

Figure 46:
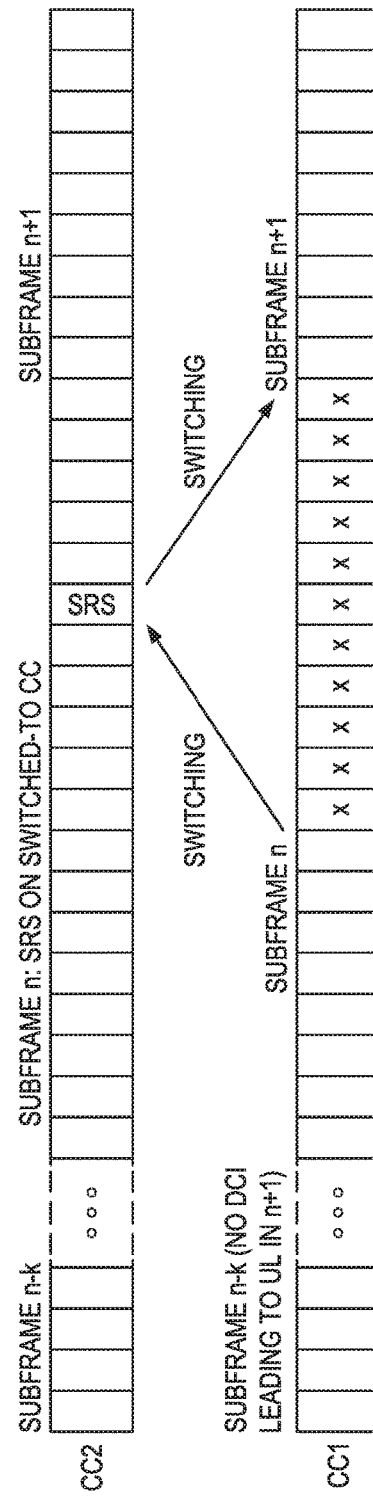
FIG. 46 is a diagram of yet another carrier based SRS switching scheme.

FIG. 46 is a diagram of a carrier based SRS switching scheme. As shown, in this example, if UE SRS switching causes the beginning symbols of subframe n+1 are lost for the UE, then in subframe n-k (associated with n+1), eNB does not schedule the UE in DL (w/ A/N in n+1) or in UL for n+1

SRS Switching Affects the Next Subframe's A/N:

Suppose SRS trigger is sent in a DCI in subframe n. If there is also a DL grant in subframe n, then both ACK/NACK of the PUSCH and SRS need to be transmitted in subframe n+k, which may cause a collision. If there is a UL grant in subframe n, then the UL transmission will also occur in subframe n+k, another collision shall occur. New HARQ timing is introduced, or reuse HARQ timing for interruptions due to measurement gap or SCell activation New and flexible SRS transmission timing is introduced, so that SRS switching is postponed to the next admissible SRS transmission opportunity without any other scheduled transmission. Alternatively, the SRS may be sent after n+k in the first subframe with SRS switching configuration (e.g., a special subframe), where there is no collision. The SRS switching configuration may be preconfigured with a periodicity (e.g., 5 ms, 100 ms, or 20 ms), and it may include special subframe. All SRS switching may be restricted to those subframes with SRS switching configuration.

Figure 47:
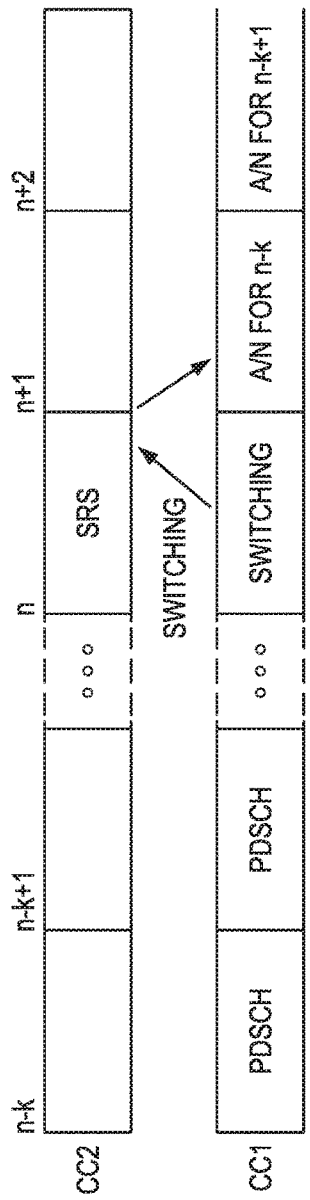
FIG. 47 is a diagram of yet another carrier based SRS switching scheme.
Figure 48:
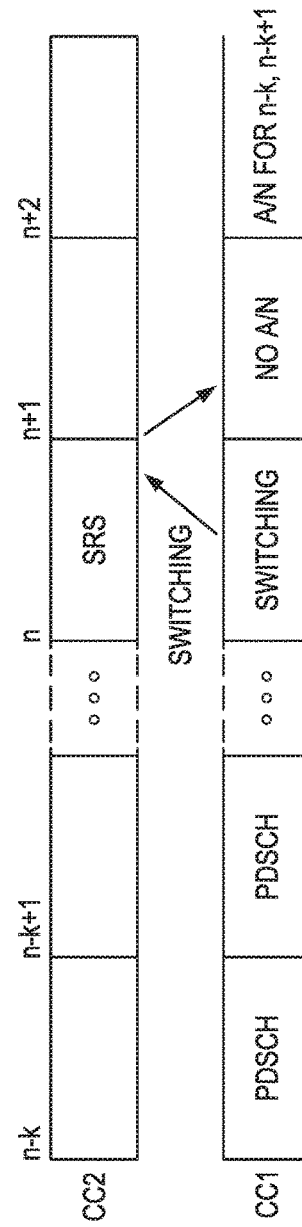
FIG. 48 is a diagram of yet another carrier based SRS switching scheme.

FIG. 47 is a diagram of a carrier based SRS switching scheme. As shown, in this example, if Collision w/ the next subframe A/N may occur w/ legacy HARQ timing FIG. 48 is a diagram of a carrier based SRS switching scheme. As shown, in this example, if Collision w/ the next subframe A/N is avoided w/ new HARQ timing w/ bundled A/N Another Option is Alternative Indication of A/N If SRS switching affects the next subframe's A/N:

A/N indicated with SRS transmission (e.g., SRS switching is performed if it is ACK; or via cyclic shifts/sequences of SRS, or via comb, RB allocations etc. For example, if it is Ack, then configuration 1 or parameter set 1 is used for SRS, and otherwise, configuration 1 or parameter set 1 is used for SRS. Multiple Ack/Nack bits may also be supported via combinations of SRS parameter sets. In this case, the network needs to configure the parameter sets and association with Ack/Nack. Or the parameter sets for aperiodic SRS may be reused here.)

Figure 49:
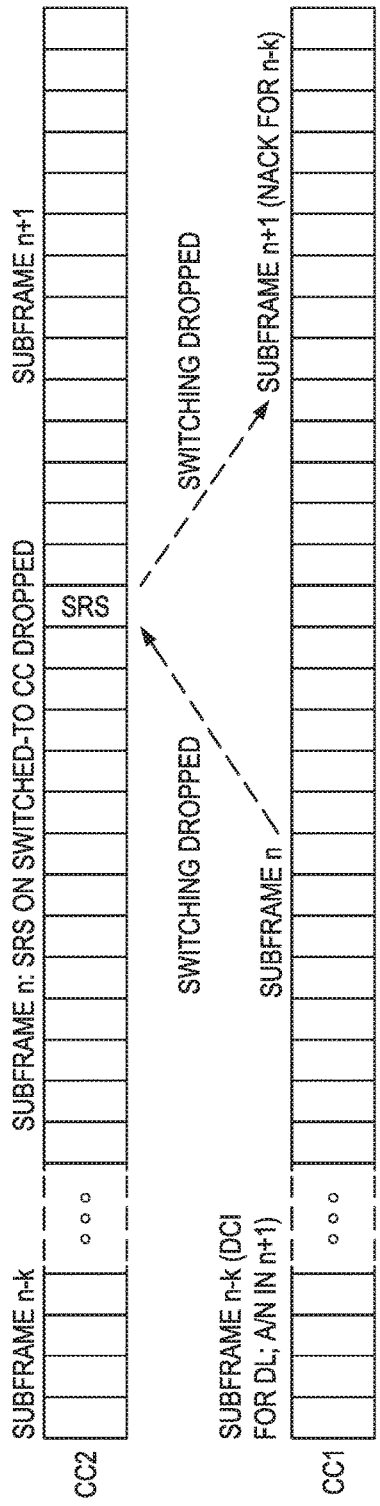
FIG. 49 is a diagram of yet another carrier based SRS switching scheme.

FIG. 49 is a diagram of a carrier based SRS switching scheme. As shown, in this example, if SRS switching collides w/ Nack, SRS switching is dropped; Nack is sent.

Figure 50:
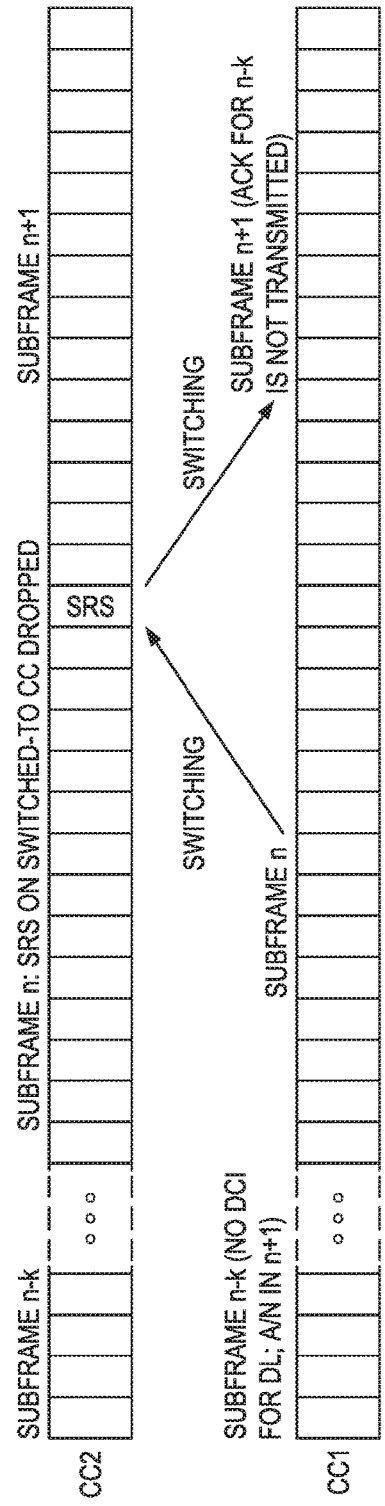
FIG. 50 is a diagram of yet another carrier based SRS switching scheme.

FIG. 50 is a diagram of a carrier based SRS switching scheme. As shown, in this example, if SRS switching collides w/ Ack, SRS switching is sent; Ack is sent.

Another Option is to: Restrict to Scenarios without Collisions

UE can switch fast enough, e.g., 0 us for intra-band; or

UpPTS is long enough, e.g., with 4 or 6 OFDM symbols for SRS

Example 1

UE switching time is 0 us→switching in a special or UL subframe causes no collision with the next subframe Example 2

Figure 51:
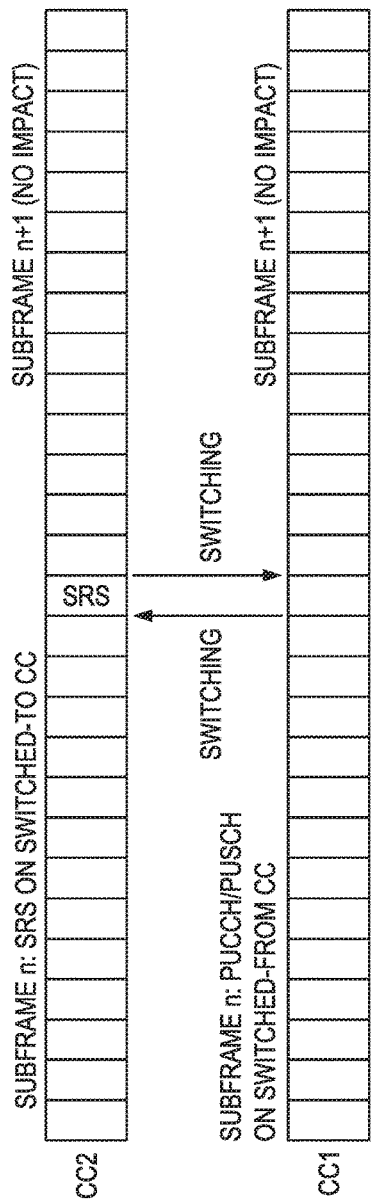
FIG. 51 is a diagram of yet another carrier based SRS switching scheme.

UE switching time is 30 us→all SRS symbols in a special subframe (except the last) can be used Note that no UCI exists in special subframes, and PUCCH is punctured/shortened in UL subframes with cell-specific SRS configured FIG. 51 is a diagram of a carrier based SRS switching scheme. As shown, in this example, no RF retuning delay is incurred by the UE.

Figure 52:
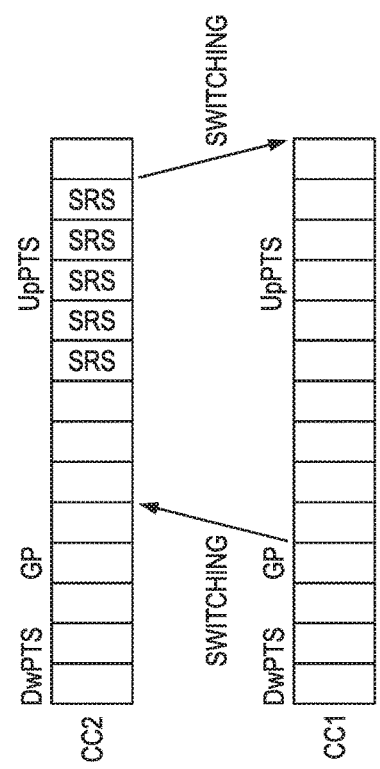
FIG. 52 is a diagram of yet another carrier based SRS switching scheme.

FIG. 52 is a diagram of a carrier based SRS switching scheme. As shown, in this example, a relatively short RF retuning delay is incurred by the UE.

If the switching subframe or next subframe carries PUSCH, PUSCH can be punctured up to the DMRS of PUSCH. In other words, DMRS should not be punctured, and if the SRS switching overlaps with DMRS symbols, priority/dropping rules apply. The punctured PUSCH may be transmitted with higher power, lower MCS levels, or modified beta values so that the reliability can be improved.

Another Option is TA Modification.

Restrict to special subframe SRS switching; network specifies larger TA for the switched-to CC (if the CCs are in different TAGs)

Via RAR and/or TA adjustment

Figure 53:
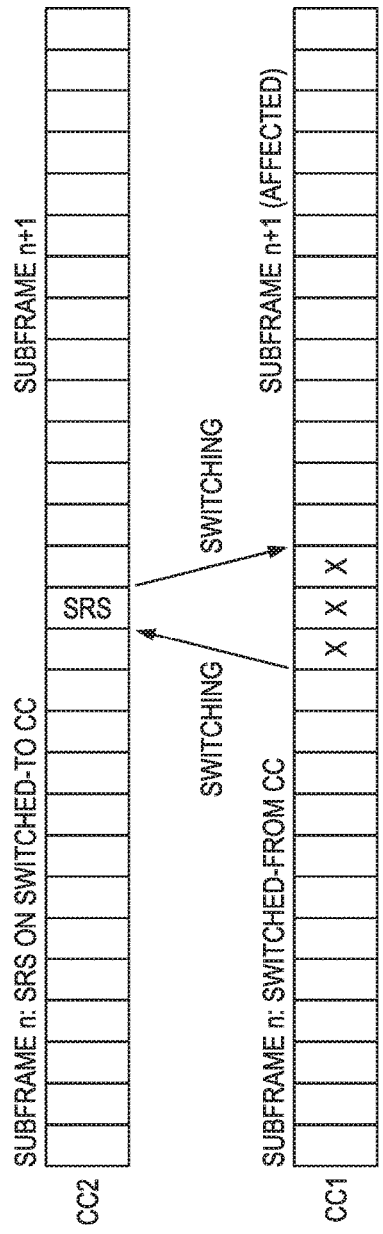
FIG. 53 is a diagram of yet another carrier based SRS switching scheme.

FIG. 53 is a diagram of a carrier based SRS switching scheme. The SRS is transmitted on the last symbol of subframe n on CC2, so the RF retuning for the switching back operation overlaps with the beginning symbol of subframe n+1, if normal TA on CC2 is applied. As shown, in this example, collision w/ subframe n+1 with normal TA for CC2.

Figure 54:
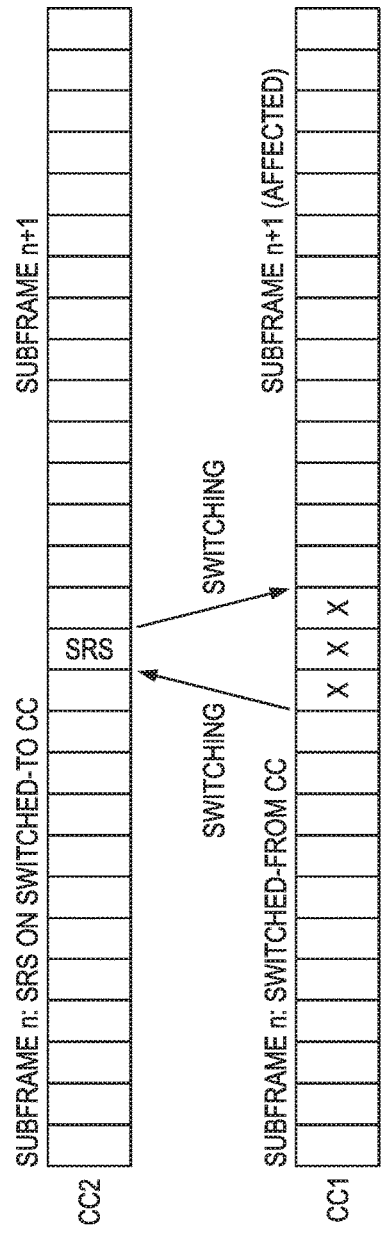
FIG. 54 is a diagram of yet another carrier based SRS switching scheme.

FIG. 54 is a diagram of a carrier based SRS switching scheme. The SRS is still transmitted on the last symbol of subframe n on CC2, but with a larger TA indicated, the UE performs the switching to CC2 and the SRS transmission on CC2 earlier, and hence the UE can switch back to CC1 earlier so that it does not overlap with the subframe n+1. As shown, in this example, No collision w/ subframe n+1 with larger TA for CC2.

An embodiment is to embed an A/N (or UCI) into a PUSCH. One issue with this is there may be not any PUSCH scheduled for that subframe. To resolve this, the eNB may indicate the UE that for the upcoming subframe with collision, PUSCH is used instead of PUCCH. The resource allocation of that PUSCH may be sent in DCI. Alternatively, the PUSCH may be semi-persistent scheduled, i.e., configured as SPS. The eNB may configure the SPS periodicity the same as SRS switching periodicity, so that the subframe affected by SRS switching back operation can use punctured PUSCH for UCI.

SRS power control should also be introduced to PUSCH-less CCs. For supporting closed-loop power control, the network needs to configure a new TPC-SRS-RNTI for a PUSCH-less CC with SRS transmission. The TPC command cannot be sent in DL grants and is carried in UL grants in DCI. However, those PUSCH-less CCs have no UL grants for them. So cross-carrier indication of TPC command for PUSCH-less CCs is needed. The cell ID associated with the TPC command needs to be indicated in the UL grant with format 0/4. Alternatively, DL grant can be modified for SRS TPC, with cross-carrier indication or same-carrier indication. Group DCI 3/3A may be used alternatively, but TPC-SRS-RNTI needs to be used; cross-carrier or same-carrier indication may be allowed. The reference power Po_PUSCH is not available for the CC without PUSCH, so this needs to be defined. It may be replaced by a new value Po_SRS for the PUSCH-less CC. Alternatively, a different CC's Po (which has PUSCH) may be used for this PUSCH-less CC. In either case, the network should specify in RRC configuration. The following shows one embodiment configuration of SRS and PRACH on a PUSCH-less CC, which is updated from TS 36.331.

RadioResourceConfigCommon

The IE RadioResourceConfigCommonSIB and IE RadioResourceConfigCommon are used to specify common radio resource configurations in the system information and in the mobility control information, respectively, e.g., the random access parameters and the static physical layer parameters. Table 3 provides a configuration for a radio resource configuration common information element. Tables 4 and 5 provide explanations for various SRS parameters.

RadioResourceConfigCommon information element

TABLE 3

| RadioResourceConfigCommon information element |
| --- |
| ``` |
| -- ASN1START |
| RadioResourceConfigCommonSIB ::=      SEQUENCE { |
|     rach-ConfigCommon                     RACH-ConfigCommon, |
|     bcch-Config                           BCCH-Config, |
|     pcch-Config                           PCCH-Config, |
|     prach-Config                          PRACH-ConfigSIB, |
|     pdsch-ConfigCommon                      PDSCH-ConfigCommon, |
|     pusch-ConfigCommon                      PUSCH-ConfigCommon, |
|     pucch-ConfigCommon                      PUCCH-ConfigCommon, |
|     soundingRS-UL-ConfigCommon              SoundingRS-UL-ConfigCommon, |
|     uplinkPowerControlCommon                UplinkPowerControlCommon, |
|     ul-CyclicPrefixLength                 UL-CyclicPrefixLength, |
|     ..., |
|     [[ uplinkPowerControlCommon-v1020         UplinkPowerControlCommon-v1020 |
|     OPTIONAL-- Need OR |
|     ]], |
|     [[ rach-ConfigCommon-v1250                RACH-ConfigCommon-v1250          OPTIONAL-- Need OR |
|     ]], |
|     [[ pusch-ConfigCommon-v1270               PUSCH-ConfigCommon-v1270         OPTIONAL -- Need OR |
|     ]] |
| } |
| RadioResoureeConfigCommon ::=        SEQUENCE { |
|     rach-ConfigCommon                        RACH-ConfigCommon               OPTIONAL, |
|     --Need ON |
|     prach-Config                           PRACH-Config, |
|     pdsch-ConfigCommon                       PDSCH-ConfigCommon |
|     OPTIONAL, -- Need ON |
|     pusch-ConfigCommon                       PUSCH-ConfigCommon, |
|     phich-Config                           PHICH-Config                     OPTIONAL, |
|     Need ON |
|     pucch-ConfigCommon                       PUCCH-ConfigCommon |
|     OPTIONAL, -- Need ON |
|     soundingRS-UL-ConfigCommon               SoundingRS-UL-ConfigCommon |
|     OPTIONAL, -- Need ON |
|     uplinkPowerControlCommon                 UplinkPowerControlCommon        OPTIONAL, |
|     -- Need ON |
|     antennaInfoCommon                        AntennaInfoCommon               OPTIONAL, -- |
|     Need ON |
|     p-Max                                  P-Max                            OPTIONAL, -- |
|     Need OP |
|     tdd-Config                             TDD-Config                       OPTIONAL, - |
|     Cond TDD |
|     ul-CyclicPrefixLength                  UL-CyclicPrefixLength, |
|     ..., |
|     [[ uplinkPowerControlCommon-v1020         UplinkPowerControlCommon-v1020 |
|     OPTIONAL-- Need ON |
|     ]], |
|     [[ tdd-Config-v1130                       TDD-Config-v1130                 OPTIONAL-- Cond TDD3 |
|     ]], |
|     [[ pusch-ConfigCommon-v1270               PUSCH-ConfigCommon-v1270         OPTIONAL -- Need OR |
|     ]], |
|     [[ uplinkPowerControlCommon-v13xy         UplinkPowerControlCommon-v13xy |
|     OPTIONAL-- Need ON |
|     ]] |
| } |
| ``` |

TABLE 3-continued

RadioResourceConfigCommon information element

```
RadioResourceConfigCommonPSCell-r12 ::=       SEQUENCE {
    basicFields-r12                            RadioResourceConfigCommonSCell-r10,
    pucch-ConfigCommon-r12                     PUCCH-ConfigCommon,
    rach-ConfigCommon-r12                      RACH-ConfigCommon,
    uplinkPowerControlCommonPSCell-r12         UplinkPowerControlCommonPSCell-r12,
    ...,
    [[ uplinkPowerControlCommon-v13xy          UplinkPowerControlCommon-v13xy
    OPTIONAL-- Need ON
    ]]
}
RadioResourceConfigCommonSCell-r10 ::=         SEQUENCE {
    -- DL configuration as well as configuration applicable for DL and UL
    nonUL-Configuration-r10                    SEQUENCE {
        -- 1: Cell characteristics
        dl-Bandwidth-r10                       ENUMERATED {n6, n15, n25, n50, n75, n100},
        -- 2: Physical configuration, general
        antennaInfoCommon-r10                      AntennaInfoCommon,
        mbsfn-SubframeConfigList-r10           MBSFN-SubframeConfigList     OPTIONAL, -
- Need OR
        -- 3: Physical configuration, control
        phich-Config-r10                       PHICH-Config,
        -- 4: Physical configuration, physical channels
        pdsch-ConfigCommon-r10                     PDSCH-ConfigCommon,
        tdd-Config-r10                             TDD-Config                    OPTIONAL--
Cond TDDSCell
    },
    -- UL configuration
    ul-Configuration-r10                       SEQUENCE {
        ul-FreqInfo-r10                        SEQUENCE {
            ul-CarrierFreq-r10                     ARFCN-ValueEUTRA              OPTIONAL, -
- Need OP
            ul-Bandwidth-r10                       ENUMERATED {n6, n15,
                                                   n25, n50, n75, n100}          OPTIONAL, --
Need OP
            additionalSpectrumEmissionSCell-r10            AdditionalSpectrumEmission
        },
        p-Max-r10                              P-Max                         OPTIONAL, -- Need
OP
        uplinkPowerControlCommonSCell-r10          UplinkPowerControlCommonSCell-r10,
        -- A special version of IE UplinkPowerControlCommon may be introduced
        -- 3: Physical configuration, control
        soundingRS-UL-ConfigCommon-r10             SoundingRS-UL-ConfigCommon,
        ul-CyclicPrefixLength-r10              UL-CyclicPrefixLength,
        -- 4: Physical configuration, physical channels
        prach-ConfigSCell-r10                      PRACH-ConfigSCell-r10         OPTIONAL, -
- Cond TDD-OR-NoR11
        pusch-ConfigCommon-r10                     PUSCH-ConfigCommon
    }                                                                           OPTIONAL, -- Need
OR
    ...,
    [[ ul-CarrierFreq-v1090                    ARFCN-ValueEUTRA-v9e0         OPTIONAL--
Need OP
    ]],
    [[ rach-ConfigCommonSCell-r11              RACH-ConfigCommonSCell-r11
    OPTIONAL, -- Cond ULSCell
        prach-ConfigSCell-r11                  PRACH-Config                  OPTIONAL, --
Cond UL
        tdd-Config-v1130                       TDD-Config-v1130              OPTIONAL, -- Cond
TDD2
        uplinkPowerControlCommonSCell-v1130
                            UplinkPowerControlCommonSCell-v1130              OPTIONAL-- Cond
UL
    ]],
    [[ pusch-ConfigCommon-v1270                PUSCH-ConfigCommon-v1270      OPTIONAL -
-Need OR
    ]],
    [[ pucch-ConfigCommon-r13                  PUCCH-ConfigCommon            OPTIONAL, -
- Cond UL
        uplinkPowerControlCommonSCell-v13xx            UplinkPowerControlCommonPSCell-r12
        OPTIONAL-- Cond UL
    ]]
    ul-Configuration-r14                       SEQUENCE {
        ul-FreqInfo-r14                        SEQUENCE {
            ul-CarrierFreq-r14                 ARFCN-ValueEUTRA
            ul-Bandwidth-r14                   ENUMERATED {n6, n15,
                                                   n25, n50, n75, n100}          OPTIONAL, --
Need OP
            additionalSpectrumEmissionSCell-r10            AdditionalSpectrumEmission
```

TABLE 3-continued

RadioResourceConfigCommon information element

```
    }
    soundingRS-UL-ConfigCommon-r14      SoundingRS-UL-ConfigCommon-r14,
    prach-ConfigSCell-r14               PRACH-ConfigSCell-r10        OPTIONAL, --
Cond STAG
    }                                                                OPTIONAL, -- Need OP
}
BCCH-Config ::=                         SEQUENCE {
    modificationPeriodCoeff             ENUMERATED {n2, n4, n8, n16}
}
PCCH-Config ::=                         SEQUENCE {
    defaultPagingCycle                  ENUMERATED {
                                            rf32, rf64, rf128, rf256},
    nB                                  ENUMERATED {
                                            fourT, twoT, oneT, halfT, quarterT, oneEighthT,
                                            oneSixteenthT, oneThirtySecondT}
}
UL-CyclicPrefixLength ::=               ENUMERATED {len1, len2}
-- ASN1STOP
```

TABLE 4

RadioResourceConfigCommon field descriptions additionalSpectrumEmissionSCell
The UE requirements related to additionalSpectrumEmissionSCell are defined in TS 36.101 [42]. E-UTRAN configures the same value in additionalSpectrumEmissionSCell for all SCell(s) of the same band with UL configured. The additionalSpectrumEmissionSCell is applicable for all serving cells (including PCell) of the same band with UL configured.
defaultPagingCycle
Default paging cycle, used to derive 'T' in TS 36.304 [4]. Value rf32 corresponds to 32 radio frames, rf64 corresponds to 64 radio frames and so on.
modificationPeriodCoeff
Actual modification period, expressed in number of radio frames = modificationPeriodCoeff* defaultPaging Cycle. n2 corresponds to value 2, n4 corresponds to value 4, n8 corresponds to value 8 and n16 corresponds to value 16.
nB
Parameter: nB is used as one of parameters to derive the Paging Frame and Paging Occasion according to TS 36.304 [4]. Value in multiples of 'T' as defined in TS 36.304 [4]. A value of fourT corresponds to 4 * T, a value of twoT corresponds to 2 * T and so on.
p-Max
Pmax to be used in the target cell. If absent the UE applies the maximum power according to the UE capability.
ul-Bandwidth
Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth.
ul-CarrierFreq
For FDD: If absent, the (default) value determined from the default TX-RX frequency separation defined in TS 36.101 [42, table 5.7.3-1] applies.
For TDD: This parameter is absent and it is equal to the downlink frequency.
UL-CyclicPrefixLength
Parameter: Uplink cyclic prefix length see 36.211 [21, 5.2.1] where len1 corresponds to normal cyclic prefix and len2 corresponds to extended cyclic prefix.

TABLE 5

| Conditional presence | Explanation |
|---|---|
| TDD | The field is optional for TDD, Need ON; it is not present for FDD and the UE shall delete any existing value for this field. |
| TDD2 | If tdd-Config-r10 is present, the field is optional, Need OR. Otherwise the field is not present and the UE shall delete any existing value for this field. |
| TDD3 | If tdd-Config is present, the field is optional, Need OR. Otherwise the field is not present and the UE shall delete any existing value for this field. |
| TDD-OR-NoR11 | If prach-ConfigSCell-r11 is absent, the field is optional for TDD, Need OR. Otherwise the field is not present and the UE shall delete any existing value for this field. |
| TDDSCell | This field is mandatory present for TDD; it is not present for FDD and the UE shall delete any existing value for this field. |
| UL | If the SCell is part of the STAG or concerns the PSCell and if ul-Configuration is included, the field is optional, Need OR. Otherwise the field is not present and the UE shall delete any existing value for this field. |
| ULSCell | For the PSCell (IE is included in RadioResourceConfigCommonPSCell) the field is absent. Otherwise, if the SCell is part of the STAG and if ul-Configuration is included, the field is optional, Need OR. Otherwise the field is not present and the UE shall delete any existing value for this field. |
| STAG | This field is mandatory present if the SCell is part of the STAG; otherwise it is not present and the UE shall delete any existing value for this field. |

SRS Switching-from CC and Switching-to CC

The set of agreements regarding SRS switching between LTE component carriers (CCs) reached in RAN1 #86 include:

In addition to all existing parameter configurations
In case the UE supports multiple switching-from CCs, selected by
  Option 1: rule(s) defined
  Option 2: RRC configuration
Details of embodiments for SRS switching-from CC and switching-to CC are described below.

Switching-from CC

For SRS switching, it is necessary to specify the switching-from CC. The switching-from CC is the CC whose UL transmission is suspended when SRS is transmitted on the switching-to, PUSCH-less CC. The reason for suspending the UL transmission on the switching-from CC is to avoid exceeding the UE UL CA capability.

To analyze how to specify the switching-from CC, the following cases are considered.

Case 1: The Case of Only 1 Allowed Candidate CC with PUSCH

In this case, for a switching-to, PUSCH-less CC, there is only 1 candidate CC with PUSCH as the switching-from CC. Then the switching-from CC has to be the only candidate CC. The switching-from CC can be specified in the standards. There is no need for RRC configuration of the switching-from CC.

Several scenarios exist in which there is only 1 candidate CC with PUSCH allowed as the switching-from CC for a switching-to CC:

Case 1-1: The UE does not support UL CA.

For this UE, it supports only one CC with PUSCH, namely, the PCell. The switching-from CC must be the PCell.

Case 1-2: The UE supports UL CA, but the UE transmitter RF architecture allows only 1 candidate switching-from CC for a switching-to CC.

As an example, suppose a UE supports 2 bands and 2 CCs in each band (CC1/CC2 in band 1 and CC3/CC4 in band 2). CC1 is the PCell which has PUCCH/PUSCH, and CC3 is the SCell with PUSCH. The UE RF architecture may use a dedicated RF for each bands but not the other band. Then a switching from CC3 to CC2 for SRS transmission on CC2 is infeasible, and a switching from CC1 to CC4 for SRS transmission on CC4 is also infeasible. Therefore, the only switching-from candidate for CC2 is CC1, and the only switching-from candidate for CC4 is CC3. Of course such a restriction has to be reported to the network by the UE so both the network and UE know before the configuration of SRS switching.

This example also shows that, even though it may appear desirable to always use a SCell with PUSCH as the switching-from CC for a UE supporting UE CA, this may not be always feasible. A UL-CA-capable UE may still have to use the PCell as the switching-from CC for some PUSCH-less CCs, despite the fact that it has SCell(s) supporting PUSCH.

Case 2: The Case of Only 1 Preferred Candidate CC with PUSCH

In this case, for a switching-to, PUSCH-less CC, there are multiple allowed candidate CCs with PUSCH to be the switching-from CC, but there is only 1 preferred candidate CC with PUSCH as the switching-from CC. There are two scenarios:

Case 2-1: The only preferred candidate can be pre-determined

For this scenario, the only preferred candidate CC can be pre-determined by the UE capability (which is reported to the network) and configuration of CCs (e.g., which CC is the PCell, which CCs support PUSCH, which CCs need to be the switching-to CCs, etc.). The candidate CC can be either pre-configured via RRC signalling or specified in standards and then determined by UE/eNB without signalling.

There are a few different cases:

Case 2-1-1: The only preferred candidate is determined by RF requirements in existing standards and efficient requirement A UE may support UL CA, and the UE transmitter RF architecture allows multiple candidate switching-from CCs for a switching-to CC, but RF requirements in existing standards limit the candidate switching-from CCs to be effectively one for a switching-to CC. One example of the RF requirements in existing standards is the contiguous requirement for intra-band UL CA. As of now, RAN4 RF requirements allow only contiguous UL CA. This limits the switching-from candidates. For example, suppose in a band, there are contiguous CC1/CC2/CC3, and CC2 is between CC1 and CC3. Suppose a UE supports all 3 CCs for PDSCH aggregation and CC1/CC2 for PUSCH aggregation. If the UE needs to switch to CC3 for SRS transmission, it has to suspend the UL on CC1 to avoid violating the contiguous requirement. Therefore, though it may appear that either CC1 or CC2 can switch to CC3, CC2 is not a preferred candidate and practically speaking only CC1 can be the switching-from CC. (If CC2 was selected as the switching-from CC for CC3, then when transmitting SRS on CC3, neither CC1 or CC2 can transmit, an unfavourable design with low efficiency.)

Case 2-1-2: One allowed candidate is the PCell, and the other allowed candidate is a SCell.

If the PCell is one of the two allowed candidates, it should be protected as much as possible, and the SCell should be the switching-to CC. (However if the abovementioned contiguous requirements in RF determine the PCell is not preferred, then the SCell has to be chosen as the switching-from CC.)

Case 2-1-3: The allowed candidates are SCells, but only one is more decoupled from the PCell than others do. The coupling may be due to the shared RF by the PCell and a candidate SCell.

It is desirable to select the SCell whose switching-from operation does not affect the PCell. For example, if a SCell with PUSCH is in the same band as the PCell (or share the RF with the PCell), then preferably another SCell with PUSCH is selected as the switching-from CC; otherwise during the RF retuning due to the SRS switching, the PCell may be interrupted. This can be done either via a rule or via RRC configuration, and the results are the same.

Case 2-1-4: The only one preferred candidate is selected by other criteria.

If the switching-from operations of all of the candidate SCells affect the PCell, or if the switching-from operations of none of the candidate SCells affect the PCell, it may be desirable to select a SCell whose operations (e.g., UL transmission) are less likely to collide with the SRS switching.

Furthermore, it may be desirable to select a SCell whose operations (e.g., UL transmission) would be consistent with others SRS switching operations by the UE.

Furthermore, it may be desirable to select a SCell whose switching from operation is the faster than from other candidates.

The above procedure may lead to a unique choice of the switching-from CC. In this case, the unique choice can be determined by UE/eNB if they follow the same selection rules, or alternatively, the eNB decides and configures for the UE via RRC signaling, which should have the same outcome as the rule-based choice.

Case 2-2: The only preferred candidate can only be determined on the fly

Case 2-2-1: If the switching-from operations of all of the candidate SCells affect the PCell, or if the switching-from operations of none of the candidate SCells affect the PCell, it may be desirable to select a SCell whose operations (e.g., UL transmission) would not collide with the SRS switching, one example of such is an idle SCell or a deactivated SCell. That is, this allows the network/UE to utilize the degree of freedom of the carrier domain to avoid collisions. However, this cannot be pre-configured and has to rely on the eNB and UE to decide on the fly.

Case 2-2-2: Furthermore, it may be desirable to select a SCell whose operations (e.g., UL transmission) would be consistent with others SRS switching operations by the UE.

Case 2-2-3: Furthermore, it may be desirable to select a SCell whose switching from operation is the faster than from other candidates.

Case 3: The Case of Multiple Candidate CCs with PUSCH

When the above rules (when applicable) still lead to multiple switching-from candidates, the following may be considered:

Case 3-1: The switching-from CC may be specified as any one of the candidate; to avoid ambiguity, RRC configuration of the switching-from CC can be used. This may have the advantage of network controlling the switching-from CCs within the cell coverage area.

Case 3-2: The switching-from CC may be specified as the SCell with the highest CC index.

Case 3-3: The switching-from CC may be any of the candidate SCells. The choices of the switching-from CC make no difference to the UE transmission/reception, and can be transparent to the eNB.

In addition to suspending UL transmission on the switching from CC when the switching-to CC is transmitting the SRS, the UL transmission (and possibly DL reception) on the switching-from CC may be interrupted during the RF retuning times (before and after the SRS transmission on the switching-to CC). When a collision occurs due to the interruptions, collision handling can be applied.

In case of dual connectivity, cross-group switching is not supported due to the lack of fast enough communication/coordination between the MCG and SCG. Therefore, the above discussions were cell-group specific. When the above discussions are applied to the SCG, the PCell refers to the PSCell in the group. Therefore, the switching-from and switching-to CCs are within the same cell group.

The switching-from CC may be deactivated. This does not affect the CC to be used as a switching-from CC. It may be preferred to select a deactivated SCell as the switching-from CC if rule-based approach is used. Similarly, it may be preferred to select a SCell in DRX as the switching-from CC if rule-based approach is used.

Observations

Based on the above elaborated discussions, It is observed herein that:

The switching-from CC for a switching may be pre-determined or determined on the fly:

RRC configuration based approach leads to a pre-determined outcome;

If the rules are based on static settings (the UE capability and CC configurations) only, the rule-based approach leads to a pre-determined outcome;

If the rules depend on dynamic scheduling outcomes, the rule-based approach requires the UE/eNB to determine the switching-from CC on the fly.

For most cases, the rule-based approach using only the static settings and RRC configuration based approach lead to the same outcome, and the rules can be easily described and implemented.

For a few cases, the rule-based approach using only the static settings may provide some more flexibility than the RRC configuration based approach, with somewhat higher complexity at the eNB and UE.

For a few other cases, the rule-based approach based on dynamic scheduling outcomes may provide more flexibility and reduce collision, at the price of increased complexity at the eNB and UE.

For a few cases, switching from any of a set of CCs can be transparent to the network.

Therefore, an embodiment adopts RRC configuration of the switching-from CC. The RRC configuration of the switching-from CC takes into consideration UE capability and RF requirements, and may also take into consideration reduced negative impact to other operations.

In an embodiment, the switching-from CC is configured via RRC signalling.

It is needed for the UE to report sufficient information for SRS switching configuration, e.g., switching times for inter-band RF retuning and intra-band RF retuning. In some cases, the inter-band retuning time depends on the specific band pair, then for different band pairs, the UE needs to report different retuning times. In some cases, the inter-band retuning time depends on the specific CC pair, then for different band pairs, the UE needs to report different retuning times. In some cases, the intra-band retuning time depends on the specific CC pair, then for different CC pairs, the UE needs to report different retuning times. In some cases, the inter-band and intra-band retuning time depends on the specific CC pair and the activities of the CC pair, or the band(s) with the CC pair, then for different band pairs, the UE needs to report the maximum retuning times for the CC pair under all possible activities. In some cases, the UE may select and report CC pairs to the eNB and the eNB further selects from the reported for SRS switching.

Switching-to CC and Configuration/Indication

For a SRS switching, the switching-to CC needs to be specified.

For periodic SRS switching, the switching-to CC has to be configured via RRC signalling.

For aperiodic SRS switching, the switching-to CC may be configured via RRC signalling, or may be determined via RRC configuration and the A-SRS trigger jointly.

The A-SRS trigger contains a 3-bit CIF. Then the switching-to CC is the CC associated with the CIF. This may be used for A-SRS trigger based on DL DCI and group DCI, and the CIF has to be enabled and configured, i.e., cross-carrier scheduling/indication is configured.

The A-SRS trigger does not contain CIF, but the bit(s) sent in the A-SRS trigger is associated with a CC via RRC configuration. Then the associated CC is the switching-to CC. For example, for a CC that the UE is monitoring the A-SRS trigger, the parameter set 1 is configured for SRS transmission on CC1, the parameter set 2 is configured for SRS transmission on CC2, and the parameter set 3 is configured for SRS transmission on CC3, and so on. Note that multiple parameter sets can be configured for the SRS transmission on a same CC (the SRS transmission configurations may differ for these different parameter sets). This may be used for A-SRS trigger based on DL DCI and group DCI, and it does not require cross-carrier scheduling be configured.

The A-SRS trigger does not contain CIF, and no bit(s) sent in the A-SRS trigger is associated with a CC via RRC configuration. Then the CC receiving the A-SRS trigger is the switching-to CC. This may be used for A-SRS trigger based on DL DCI and group DCI, and it does not require cross-carrier scheduling be configured.

The above three options can be combined and all supported. If the UE is configured with cross-carrier scheduling for some carriers, it is reasonable to reuse the CIF for SRS switching for these carriers; otherwise, the A-SRS trigger parameter sets or same-carrier indication can be used for specifying the switching-to CC.

In an embodiment, the switching-to CC of a P-SRS is specified by RRC configuration signalling.

In an embodiment, the switching-to CC of a A-SRS is specified by CIF (if configured), A-SRS trigger bit and associated parameter set configured by RRC, RRC configuration signalling alone, or the CC receiving the A-SRS trigger.

Switching for RACH on a PUSCH-Less CC

For RACH on a PUSCH-less CC, the switching-from CC and switching-to CC also need to be specified. The switching-to CC is the CC indicated by the PDCCH order for the RACH (i.e., if CIF is present, then the CC associated with the CIF value is the one to transmit RACH; otherwise the CC receiving the PDCCH order is the one to transmit RACH), which is the same behavior as the current RACH. For the switching-from CC, there are a few alternatives:

The switching-from CC for the PDCCH order of the RACH is pre-configured by RRC signalling. In this case, for the same CC, the associated switching-from CC for RACH and switching-from CC for SRS could be different.

The switching-from CC for the RACH on a CC is specified to the same as the switching-from CC for the SRS switching. This is a simple solution, but it cannot be used for a CC whose switching-from CC is not pre-determined. If the option of SRS switching-from CC determined on the fly is not supported, this option should be supported for its simplicity. Alternatively, the rules used for determining a switching-from CC for SRS switching can be applied here for the switching for RACH, e.g., avoid/reduce interruption to the PCell or PSCell, utilize the deactivated CC or CC in DRX, etc.

In an embodiment, the switching-to CC for RACH on a PUSCH-less CC is the CC indicated by the PDCCH order.

In an embodiment, the switching-from CC for RACH on a PUSCH-less CC is the same as the switching-from CC for the associated SRS switching.

DCI Design for SRS Switching

The set of agreements regarding SRS switching between LTE CCs reached in RAN1 #86 include:
Down selection from TPC command options:
  Option 1: by UL grant DCI 0/4 (with cross-carrier indication)
  Option 2: by DL DCI (with cross-carrier indication)
  Option 3: by group DCI
  Adopt Option 3 and only apply to SRS-only CC without PUSCH
    Joint group DCI for triggering and TPC
    FFS: Number of bits for each UE and the meaning for the states of the field
    Introduce RNTI for the group
For A-SRS, trigger is carried in:
  DL scheduling DCI and group DCI
  Group DCI is only used for SRS-only CC without PUSCH Details of embodiments for downlink control information (DCI) design are described below.

Group DCI Jointly for TPC Command and A-SRS Trigger

A new group DCI format is needed to support joint indication of TPC command and A-SRS. The existing group DCI format 3/3A for TPC commands can be considered as a baseline for the new design while incorporating A-SRS triggers. Several aspects are discussed below.

Search Space for the DCI

The group DCI needs to be transmitted in a search space common to a group of UEs instead of in UE-specific search spaces. One option is to use the common search space in the PCell, but this then requires significant signalling overhead for cross-carrier indication and may cause more collisions in the common search space. Another option is to use a search space in each CC without PUSCH with the lowest indexed CCEs (0~3 for aggregation level 4 and 0~7 for aggregation level 8), similar to the case of UE monitoring DCI format 1C on each LAA SCell introduced in Rel-13. If more search space is needed (e.g., to support two DCIs to two groups of UEs in one subframe), CCEs 4-7 may be included for aggregation level 4. Yet another option is to use a search space in each CC that the UE monitors PDCCH with the lowest indexed CCEs. Note that the PDCCH on these CCs may contain CIF for cross-carrier scheduling on another CC, and the same cross-carrier indication relation can be utilized for indicating the CC for TPC command and A-SRS trigger.

It is observed herein that the UE needs to monitor the search space with the lowest CCE indexes associated with each SRS-switching CC, on the PCell and a set of SCells, or all the serving cells or all the serving cells on which the UE monitors PDCCH.

Payload Size for the DCI

To help reduce the number of blind detections by a UE, the payload size of the group DCI (including possible zero-padding) is preferred to be equal to the size of a DCI that the UE already monitors. Generally, the UE monitors DCI format 0/1A associated with every CC, so it is desirable that the payload size of the group DCI is equal to that of DCI format 0/1A on the same CC. Note that DCI formats 3/3A also have the same size as DCI formats 0/1A.

It is observed herein that the group DCI payload size (with padding) should be the same as DCI format 0/1A.

RNTI for the DCI

AN RNTI common to the group of UEs in a carrier is needed. Each UE in the group will be configured with the group RNTI. The range of the RNTI values can be the same as those for TPC of PUSCH/PUCCH. In case the number of UEs in a carrier is large, there may be a need to configure more than one group RNTI on the carrier so that different groups of UEs are associated with different group RNTIs. One RNTI may be configured for all SRS-switching CCs of a UE, or alternatively, each SRS-switching CC is configured with a CC-specific RNTI. If the new DCI format supports TPC-only content and TPC+trigger content, they may also be differentiated by different group RNTIs.

It is observed herein that a group RNTI needs to be configured for the group DCI.

Indication of UEs and CCs in the DCI

One option for the DCI design is that the DCI indicates only the UE but not the switching-to CC of the UE. This corresponds to the case of no cross-carrier indication. In this case, the UE needs to monitor the group DCI on each CC with SRS switching, but the CIF needs not be present in the DCI and the overall overhead may be reduced. The indication of the UE can be similar to that in DCI format 3/3A, i.e., each UE associated with the group is configured with an index of a location within the PDCCH.

Another option is to indicate both the UE and the CC associated with the TPC command and A-SRS triggering. In other words, cross-carrier indication is utilized. Note that cross-carrier indication from only the PCell is not desirable as it may need up to 5 bits (or equivalent) to specify the CC for a UE. However, the current cross-carrier indication mechanism of up to 3-bit CIF may be adopted. In addition, similar to DCI format 3/3A, each UE associated with the group is also configured with an index of a location within the PDCCH.

It is observed herein that the group DCI indicates a UE via an index of a location in the PDCCH, and indicates a CC of the UE via 0-bit CIF (same-carrier indication) or 3-bit CIF (cross-carrier indication).

TPC Commands in the DCI

All DCI formats with TPC commands use a 2-bit field for the TPC command for PUSCH/PUCCH, except that in 3A, only 1 bit is used. Therefore, it is reasonable to support a 2-bit field in the new group DCI for SRS TPC command, and if a compact form is needed, a 1-bit field may also be considered.

It is observed herein that the group DCI supports a 2-bit field or a 1-bit field for each TPC command.

A-SRS Triggers in the DCI

In DCI formats 0/1A/2B/2C/2D/6-0A/6-1A, a 1-bit trigger is used for A-SRS, whereas in DCI format 4, a 2-bit trigger is used. For the new group DCI, both may be supported. For the case of a 1-bit trigger, one A-SRS parameter set can be supported, while for the case of a 2-bit trigger, three A-SRS parameter sets can be supported. If more A-SRS parameter sets are needed, at most one more bit (i.e., at most a 3-bit trigger) may be considered. On the other hand, if for each DL CC (include each FDD CC if aggregated), there can be up to 3 parameter sets configured, this could lead to in total a sufficiently large number of parameter sets usable for aperiodic SRS. In other words, RAN1 may consider either increasing the number of SRS request bits or supporting carrier-specific SRS parameter set configuration. It is observed herein that the group DCI supports at least the 1-bit and 2-bit trigger for A-SRS.

The time offset between the trigger and the associated SRS transmission has already been defined in existing standards and can be reused for SRS switching. However, if there is a need to modify the time offset for SRS switching to help avoid collision with other transmissions, a time offset may be included with the trigger, similar to eLAA SRS trigger. The time offset in the group DCI may be common to all SRS requests in the DCI.

For the group DCI for TPC command and A-SRS, an embodiment provides support for one or more of the following:

A search space with the lowest indexed CCEs on all the serving cells (same-carrier indication) or all the serving cells on which the UE monitors PDCCH (cross-carrier indication)

Same payload size as DCI formats 0/1A (with padding)

Group RNTI 0-bit CIF (same-carrier indication) or 3-bit CIF (cross-carrier indication)

2-bit TPC command and 1-bit TPC command in compact format

At least 1-bit and 2-bit trigger

Optionally a time offset indication.

The above discussion may lead to a large number of combinations for the DCI format contents. To simplify, down selection of the DCI format contents should be considered.

First, there are cases that A-SRS may not be configured or triggered, but TPC command is needed for P-SRS. Therefore, it makes sense to have a DCI format with TPC only. This is effectively the DCI formats 3/3A, but on a CC supporting P-SRS transmission or SRS transmission. No other field needs to be included in the DCI format. The RNTI may be called as SRS-TPC-RNTI. Note that the length of DCI formats 3/3A is the same as DCI formats 0/1A.

Second, when A-SRS is configured, the group DCI needs to contain SRS requests for A-SRS and their associated TPC commands. There are at least these combinations: 1) 0 or 3 bit CIF, 2) 1 or 2 bit TPC, and 3) 1 or 2 bit trigger. To further simplify, note that the UE already needs to monitor the TPC-only DCI format on each CC with SRS, so it is reasonable that the UE monitors every CC with A-SRS for the TPC+trigger DCI format without considering cross-carrier indication. Then, 1 or 2 bit TPC and 1 or 2 bit trigger may be supported, which amounts to 4 combinations and may be differentiated by a 2-bit flag in the DCI or RNTI. Alternatively, further down selection can be considered.

An embodiment for the group DCI, focus on the following down selections:

TPC-only DCI (similar to 3/3A) on every CC with P-SRS, and TPC+trigger DCI on every CC with A-SRS, with 1 or 2 bit TPC and 1 or 2 bit trigger.

TPC-only DCI
  a. Reuse DCI formats 3/3A
  b. UE monitors this format on every CC with P-SRS in a search space with the lowest indexed CCEs
  c. With a configured group RNTI TPC+trigger DCI
  a. With 1 or 2 bit TPC and 1 or 2 bit trigger
  b. Same payload size as DCI formats 0/1A (with padding)
  c. UE monitors this format on every CC with A-SRS in a search space with the lowest indexed CCEs
  d. With a configured group RNTI
  e. Possibly with a time offset indication.

Other variations can be considered. E.g., a one bit flag is included in the DCI to tell the UE if the DCI is for TPC only or not, or a one bit flag is included in the DCI to tell the UE if the DCI is for trigger only or not, or a two bit flag is included in the DCI to tell the UE if the DCI is for TPC only, TPC+trigger, trigger only. In addition, flags can be used to tell the UE the lengths or presence of some fields, e.g., 1 or 2 bit TPC, 1 or 2 bit trigger, presence of timing offset, presence of CIF, etc. The flags may be jointly encoded. Alternatively, the flags may not be present, and the DCI format contents differences are signalled via group RNTIs. In other words, for UEs using different formats, they are configured in different groups and each group is associated with a dedicated RNTI.

DL DCI for A-SRS Trigger

Currently, aperiodic SRS is configured via RRC signalling and triggered dynamically via DCI formats 0/1A/2B/2C/2D/4 for TDD and 0/1A/4 for FDD. Among them, DCI formats 1A/2B/2C/2D are for DL. These DCI formats may be enhanced to support A-SRS switching. There seems to be no need to support other DL DCI formats for A-SRS switching. If aperiodic SRS is not configured on a serving cell, the SRS request field may still present and the current standards do not define how the UE may utilize it. This field is now useful to trigger A-SRS on the associated CC. The associated CC may be the CC receiving the DCI (if CIF is not configured) or a different CC (if CIF is configured). No change in the standards is needed to support this behavior except that RRC signalling needs to configure A-SRS on the associated CC.

Similar to the "A-SRS triggers in the DCI" section above, the number of bits and time offset are as follows. The DL DCI formats have a 1-bit trigger. It is likely needed to increase the trigger to be at least 2 bits. This changes the DCI payload sizes and the network should configure the UEs if the new payload size is used. In addition, the time offset may be included so that the triggered SRS switching and transmission can be at a different time from the ACK/NACK associated with the DL DCI.

For DL DCI 1A/2B/2C/2D for A-SRS, an embodiment provides support for a 2-bit trigger and optionally a time offset indication.

Other Considerations on SRS Switching

The set of agreements regarding SRS switching between LTE CCs reached in RAN1 #86 include:

R14 SRS switching supports RF retuning time no longer than X us
- Option 1: X=200
- Option 2: X=300
- Option 3: X=500
- Option 4: X=900

In addition, in RAN4 discussions, whether to support SRS switching to a deactivated CC was brought up. Details of embodiments for maximum switching time support for Rel-14 and SRS switching to a deactivated CC are described below.

Maximum RF Switching Time to be Supported in Rel-14 SRS Switching

The following RF switching times have been agreed by RAN4:

[RAN4]: Given that the RF switching time may have some dependency on the CA scenarios and UE implementation, RAN4 agrees that the RF switching time can be defined in the following values:
- 0 us
- 30 us
- 300 us
- 500 us
- 900 us For RAN1 design, it would be useful to decide on a maximum value of the switching times so that RAN1 can provide efficient support for UEs with switching times no longer than the maximum value. To select the maximum value, it is desirable to consider the switching times that can have no or little negative impact on other transmissions and receptions. If a switching time always leads to negative impact on other transmissions and receptions for any configurations, then RAN1 can consider how to efficiently support such a switching time in later releases.

It can be seen that for a switching time of 500 us or longer, there is always a negative impact on other transmissions and receptions for any configuration. To see this, notice that 500 us amount to 8 OFDM symbols. Regardless where the SRS is transmitted in currently supported SRS symbol positions, the next subframe is affected. Therefore, in an embodiment X should be strictly smaller than 500 us.

On the other hand, if the switching time is 300 us or shorter, there exists at least one configuration that no other transmissions or receptions are affected at all, even if the maximum timing advance difference (32.47 us) is considered. To see this, notice that 300 us plus 32.47 us amount to at most 5 OFDM symbols. With TDD special subframe configuration 0 (3 OFDM symbols for DwPTS) and 6 OFDM symbols for UpPTS, SRS transmission can be performed at the first symbol of the UpPTS, and neither the DwPTS of the current subframe or any symbol of the next subframe is affected by the SRS switching. If the switching time is shorter, more configurations can support SRS switching and more SRS transmission positions can be allowed without affecting other operations. Therefore, in an embodiment X is chosen as 300 us.

In an embodiment, R14 SRS switching supports RF retuning time no longer than 300 us.

Deactivated Carriers

It should be noted that for a deactivated carrier, SRS is not transmitted according to current standards. SRS switching between LTE component carriers should also follow the same principle, i.e., a UE will not switch to a PUSCH-less TDD carrier for SRS transmission if that carrier is deactivated. This also helps to reduce SRS switching overhead. A LS from RAN1 to RAN4/2 can be considered to clarify this issue.

The following excerpt from TS 36.321 is included for information:

5.13 Activation/Deactivation of SCells

The MAC entity shall for each TTI and for each configured SCell:
if the SCell is deactivated:
not transmit SRS on the SCell;"

In an embodiment, for SRS switching, there is no switching to a deactivated CC.

Power Headroom Report for SRS Switching

Introduction

The set of agreements regarding SRS switching between LTE CCs regarding the power headroom report for the power control mechanism reached in RAN1 #86 include:
Support 2 types of PHR as in Rel-13 Details FFS Details of embodiments for the two types of power headroom reports for SRS on TDD CCs without PUSCH are described below.

Consideration for PH for SRS on TDD CCs without PUSCH

The power control formula for SRS on TDD CCs without PUSCH is, if the UE transmits the SRS in subframe i for serving cell c, the transmit power can be calculated based on the formula below:

$$P_{SRS,c}(i) = \min[P_{CMAX,c}(i), \{10 \log_{10}(M_{SRS,c}) + P_{O\_SRS,c}(j) + \alpha_{SRS,c}(j) \cdot PL_c + f_{SRS,c}(i)\}] \text{ [dB]}$$

where $P_{CMAX,c}(i)$ is the configured UE transmit power defined in TS36.101 in subframe i for serving cell c; $P_{O\_SRS,c}(j)$ and $\alpha_{SRS,c}(j)$ are parameters defined for SRS power control in subframe i for serving cell c, where j=0 for P-SRS and j=1 for A-SRS; $M_{SRS,c}$ is the bandwidth of the SRS transmission in subframe i for serving cell c expressed in number of resource blocks; and $f_{SRS,c}(i)$ is the current SRS power control adjustment state for serving cell c.

A remaining issue is the PHR for SRS on TDD CCs without PUSCH. Based on the power control formula, if the UE transmits the SRS in subframe i for serving cell c, the PH can be calculated based on the formula below:

$$PH_{SRS,c}(i) = P_{CMAX,c}(i) - \{10 \log_{10}(M_{SRS,c}) + P_{O\_SRS,c}(j) + \alpha_{SRS,c}(j) \cdot PL_c + f_{SRS,c}(i)\} \text{ [dB]}$$

where $P_{CMAX,c}(i)$ is the configured UE transmit power defined in TS36.101 in subframe i for serving cell c; $P_{O\_SRS,c}(j)$ and $\alpha_{SRS,c}(j)$ are parameters defined for SRS power control in subframe i for serving cell c, where j=0 for P-SRS and j=1 for A-SRS; $M_{SRS,c}$ is the bandwidth of the SRS transmission in subframe i for serving cell c expressed in number of resource blocks; and $f_{SRS,c}(i)$ is the current SRS power control adjustment state for serving cell c.

If the UE does not transmit SRS in subframe i for serving cell c, the PH can be calculated based on the formula below:

$$PH_{SRS,c}(i) = \tilde{P}_{CMAX,c}(i) - \{P_{O\_SRS,c}(1) + \alpha_{SRS,c}(1) \cdot PL_c + f_{SRS,c}(i)\} \text{ [dB]}$$

where $\tilde{P}_{CMAX,c}(i)$ is computed assuming MPR=0dB, A-MPR=0dB, P-MPR=0dB and $\Delta T_c$=0dB, where MPR, A-MPR, P-MPR and $\Delta T_c$ are defined in TS36.101.

In an embodiment, the two types of $PH_{SRS,c}(i)$ are calculated based on agreed SRS power control formula, and there are various alternatives on how the SRS-only PHR is triggered and reported.

Collision Handling for SRS Switching

Analysis of Collisions

There are collisions caused by different reasons and they may take different forms. To effectively handle collisions, the following analysis of collisions is provided.

Type 1: A Collision Caused by UE Capability Limitations or Requirement Violations If the operations configured/scheduled for a UE exceed the UE capability, a collision may occur. In addition, if the operations configured/scheduled for a UE violate requirements/regulations, such as band combination requirements, a collision may occur.

For example, for a UE capable of transmitting in UL on one CC at a time, to transmit SRS on a switching-to CC while at the same time transmitting on the switching-from CC would exceed the UE UL capability and hence this is a collision. In this case, only one transmission can be allowed at a time. See [1] for discussions on switching-to and switching-from CC for SRS switching.

For another example, for a UE supporting 2 UL CC CA, transmitting SRS on CC1 in Band A and another signal on CC2 in Band B may be a collision, if the UE can support only one band at a time, or if a RF requirement forbids simultaneous transmissions on Bands A and B.

For yet another example, configuring/scheduling a UE to perform two transmissions on overlapping resources also leads to a collision, such as indicating the UE to transmit A-SRS on the same symbol as a configured P-SRS causes a collision.

Type 2: A Collision Caused by RF Retuning

Collisions may occur during RF retuning.

For example, during the switching from CC1 to CC2, RF retuning may cause all CCs within the same band as CC1 not able to transmit, and it may also cause all CCs within the same band as CC2 not able to transmit.

For another example, if the SRS transmission on a PUSCH-less CC is performed in the last OFDM symbol of a subframe, and if the UE RF retuning time is non-zero, then the next subframe (UL or DL) will be affected.

Type 1 collisions may occur on the symbols for SRS transmission by the switching-to CC. On the other hand, Type 2 collisions may occur during the RF retuning time of a SRS switching, but not on the symbols for SRS transmission by the switching-to CC. Both UL and DL may be affected during the collision. Likewise, RACH transmission on a PUSCH-less CC may also cause both types of collisions. Collision handling mechanisms should be applied to all the signals on all OFDM symbols of all affected CCs during the collision.

Collision handling mechanisms should be applied to all the signals on all OFDM symbols of all affected CCs during the collision.

Collision Handling for SRS on TDD CCs without PUSCH

In case of collisions, how to determine which transmission (or reception) should be kept/dropped and enhancements to avoid collisions should be defined.

The potential solutions could be:
Option 1: Define priority/dropping rules.
Option 2: Allow punctured signals.
Option 3: Change A-SRS timing or HARQ timing.

In Option 1, given a certain configured SRS transmission, when it is in collision with PUSCH/PUCCH/PRACH/etc. in another UL carrier, the factors including periodic/aperiodic SRS type and channel/UCI type as well as PCell/SCell type, could be considered when deciding the dropping rule and prioritized transmission.

SRS switching can have higher priority than normal data transmissions (PUSCH/PDSCH).

DL control channels, (E)PDCCH should have higher priority than SRS switching. Signals carrying RRC configuration information, MAC control information, and associated feedback should have higher priority than SRS switching.

As a general guideline, signals carrying ACK/NACK, SR, and signals involved in RACH procedure, should have higher priority than SRS switching. However, if the negative impact of SRS switching on ACK/NACK can be limited (e.g., via RAN4 requirement of lost ACK/NACK for a CC to be no more than 0.5% due to SRS switching), A-SRS and long-periodicity P-SRS may have higher priority than ACK/NACK.

SRS switching should have higher priority than CSI feedback on TDD CCs as SRS provides a better means of obtaining CSI. However, long-term CSI feedback carrying RI/PI/CRI for FDD CCs should have higher priority than SRS switching.

The priority/dropping rules should be applied after collision avoidance via puncturing signals is applied. In other words, if puncturing signals can resolve the collision, then the priority/dropping rules are not applicable; otherwise, the priority/dropping rules are applied.

Embodiment

Consider the following priority/dropping rules:
(E)PDCCH, RI/PTI/CRI for FDD, RRC/MAC signaling, SR, RACH, [ACK/NACK]>A-SRS>long-periodicity SRS> [other ACK/NACK]>short-periodicity SRS>other CSI>normal PUSCH/PDSCH.

In option 2, one can introduce some forms of punctured PUCCH/PUSCH/PDSCH formats to handle a collision of SRS transmission on a different carrier.

PUCCH/PUSCH/PDSCH symbols overlapping with SRS switching may be punctured so that punctured signals and the SRS switching could both be maintained.

This could consider to reuse existing partial PDSCH/PUSCH as in LAA/eLAA as much as possible, such as partial ending subframe, subframe with only one slot, PUSCH without the 1$^{st}$ or the last symbol, etc. The number of symbols to be transmitted/received needs not be indicated to the UE since both eNB and UE know how many symbols are in overlap with SRS switching.

Punctured PDSCH can be considered.

Punctured PUSCH can be considered. However, no DMRS symbol of the PUSCH should be punctured; if DMRS would be impacted, priority/dropping rules should be applied. In addition, if ACK/NACK is embedded in the PUSCH, no ACK/NACK symbol should be punctured; if ACK/NACK would be impacted, priority/dropping rules should be applied.

Punctured PUCCH can be considered. However, no DMRS symbol of the PUCCH should be punctured; if DMRS would be impacted, priority/dropping rules should be applied. The puncturing may or may not lead to non-orthogonality among multiplexed UEs depending on the PUCCH format and means of multiplexing. If a PUCCH format defined in TS36.213 uses orthogonal cover code in time-domain on data symbols (not DMRS symbols) of PUCCH, then puncturing leads to non-orthogonal multiplexing and should not be used; otherwise, PUCCH data symbols can be punctured and orthogonality is preserved.

Embodiment

Partial PDSCH/PUSCH subframes, punctured PDSCH, PUSCH (not impacting DMRS symbol or ACK/NACK symbol), and PUCCH (not impacting DMRS) formats can be considered.

In option 3, change HARQ timing or A-SRS transmission timing could be considered. Suppose SRS trigger is sent in a DCI in subframe n. If there is also a DL grant in subframe n, then both ACK/NACK of the PUSCH and SRS need to be transmitted in subframe n+k, which may cause a collision. Hence, it could be considered to change ACK/NACK timing to be in a later subframe by reusing the ACK/NACK timing in eIMTA. Alternatively, the SRS may be sent after n+k in the first subframe with SRS switching allowed (e.g., a special subframe), where there is no collision. The SRS trigger may also be associated with a timing offset, similar to eLAA SRS trigger, which indicates to the UE a different opportunity for SRS switching. eLAA has 3 bits to indicate the offset to subframe n+k in terms of number of subframes, i.e., 000 is for 0 subframe offset, and so on. For SRS switching, few bits can be considered, such as one or two bits. Also for SRS switching, the offset is in terms of the SRS transmission opportunity as configured to the UE, which corresponds to $T_{SRS,1}$, $T_{offset,1}$, and $k_{SRS}$ in TS36.213.

Yet another embodiment for collision handling is to enable PUCCH/PUSCH transmission on switching-to CC. If the UE switches to a CC for SRS, then the UE stays on the CC for other UL Tx until the next switching occurs. The pro is that no dropping of transmissions. This effectively leads to UL fast carrier switching.

Multiple Antenna Support for SRS

For TDD system, sounding is very important for system performance improvement. The DL CSI is greatly dependent on sounding. Since all of the antennas would be utilized in DL reception, it is needed to support sounding for all of the antennas of UE.

With the different DL and UL capabilities, UE can sound one or several antennas at a time. The following summaries the different UL capability cases:
1. 2 Rx in DL
   a. 1 Tx in UL, not supporting transmit antenna selection
   b. 2 Tx in UL
   c. 1 Tx in UL, supporting transmit antenna selection
2. 4 Rx in DL
   a. 1 Tx in UL, not supporting transmit antenna selection
   b. 2 Tx in UL, not supporting transmit antenna selection
   c. 4 Tx in UL
   d. 1 Tx in UL, supporting transmit antenna selection
   e. 2 Tx in UL, supporting transmit antenna selection For Cases 1a, 2a, 2b, it is impossible to sound all the antenna since transmit antenna selection is not supported, that is, UE is not capable of transmitting on the other antenna(s). These cases are excluded in our considerations below.

For 2 antenna cases, UE can support sounding of the 2 antennas through UL 2×2 MIMO (Case 1b) or 2 antenna switching (Case 1c), which are already supported in specification for different capability UE. With the introduction of SRS carrier based switching, sounding of the 2 antennas can be performed on a PUSCH-less carrier without additional standard impact, via RRC configuration for P-SRS and RRC configuration plus DCI indication for A-SRS.

For Case 2c, the sounding by all 4 Tx antennas is already supported in R13, and it can be combined with SRS carrier based switching without additional standard impact. However, UEs supporting 4 Tx in UL rarely exist in the real network. It may need a long time before the UE with uplink 4 Tx capability can be popularized. For 4 Rx in DL, the typical UE capabilities should be Cases 2d and 2e. Therefore, to sounding all the 4 uplink antenna, Cases 2d and 2e should be the main focus for SRS enhancement.

For 4 antenna cases, if UE has only 1 UL Tx antenna capability (Case 2d) or 2 UL Tx antenna capability (Case 2e), 4 antenna switching should be introduced to sound all the antennas. The 4 antenna switching will benefit the sounding of all the CCs, including CCs with or without PUSCH.

The sounding enhancement on frequency and spatial domains will significantly improve the DL throughput, which is the motivation of SRS carrier based switching WI. It is proposed to introduce 4 antennas switching (Cases 2d and 2e) for the SRS with carrier switching.

In Rel-13, for 2 antenna switching, the Tx antenna is switched at each SRS transmission instance for P-SRS. 2 Tx antenna switching over one carrier is performed based on a predefined pattern calculated from RRC configured parameters. For a UE with 4 antennas, the antenna switching should include all the 4 antennas. With the carrier switching in Rel-14, UE can also perform antenna switching for SRS transmission combined with carrier based switching. Therefore, the sounding can be preformed by different carriers and antennas.

The switching of antennas for SRS transmission with carrier switching can be based on a predefined pattern calculated from RRC configured parameters. The mechanism is similar with 2 Tx antenna switching supported in Rel-13. The predefined switching pattern should facilitate the sounding of all antennas. All the antennas should have the opportunity of SRS transmission on CCs with or without PUSCH. The enabling of antenna switching with carrier switching can be configured by RRC. The carrier switching for SRS transmission will perform the antenna switching based on the predefined pattern.

For SRS carrier based switching, P-SRS and A-SRS are both supported. For CCs with or without PUSCH, SRS should be configured separately by RRC. For CCs with PUSCH, legacy sounding procedure can be reused for all the cases except 2d, 2e. For cases 2d and 2e, new antenna switching formula can be defined to support sounding of all the 4 Tx antennas. For case 2e, the 4 Tx antennas can be divided into 2 groups with 2 antennas in each group. Antenna switching can be performed both between antenna groups and between antennas within a group.

For CCs without PUSCH, new sounding procedure can be defined to address the combination of antenna and carrier switching. The UE capable of UL 4×4 MIMO can sound 4 antennas at a time. For the UE with 1 UL Tx antenna capability, 4 Tx antenna switching is used for sounding 1 antenna at a time. With RF retuning time, the frequent carrier switching will bring larger retuning time overhead. To support 4 Tx antenna switching, the overhead of switching antennas+carriers should be improved.

The latency of sounding all the antennas and carriers may be large. To reduce the latency of sounding, it is better to sound all the 4 Tx antennas on a CC when carrier switching proceeds for SRS on the CC. The SRS from 4 Tx antenna should be transmitted on different symbols with short interval to reduce latency. For TDD system, at least for PUSCH-less CCs, multiple symbols (e.g., all 4 additional symbols in UpPTS) in a subframe can be used for SRS transmission of 4 Tx antennas by the same UE. In current TS36.213, it has "For TDD serving cell, and if the UE is configured with two or four additional SC-FDMA symbols in UpPTS of the given serving cell, all can be used for SRS transmission and for trigger type 0 SRS at most two SC-FDMA symbols out of the configured additional SC-FDMA symbols in UpPTS can be assigned to the same UE." If such a restriction is removed, then all 4 additional symbols in UpPTS can be used by the same UE for SRS transmission. In addition, for trigger type 0, if SoundingRS-UL-ConfigDedicatedUpPTsExt is configured and SoundingRS-UL-ConfigDedicated are configured, both shall be used. For trigger type 1, if SoundingRS-UL-ConfigDedicatedAperiodicUpPTsExt and SoundingRS-UL-ConfigDedicated are configured, both shall be used.

For SRS switching requirements, there are a few options:
1) No requirement on maximum interruption.
2) Max interruption=1 subframe. This implies that SRS switching cannot affect the next subframe, then A/N won't be affected, and the network carefully configures suitable UEs for SRS switching. If the interruption is limited to 1 subframe, for cases with aligned TDD UL/DL configuration, the interruption is only in the special subframe or the last symbol of UL subframe. The special subframe does not carry A/N. The SRS on the last symbol of UL subframe does not affect A/N. For FDD+TDD without timing alignment between TDD and FDD, this may lead to no switching from FDD CC to TDD CC if the switching leads to 2 lost UL subframes in FDD.
3) Max interruption=2 subframes.

In addition (or alternatively), if a requirement "A/N loss rate is no larger than 0.5%" is introduced, then the standards do not have to impose other hard restrictions but leave the network to decide configurations so that the A/N loss rate requirement is met; other than that the network is totally free to decide how the SRS switching is performed. Though not really solving the interruption problem or collision problem, it limits the negative impacts of interruption and collision.

Figure 55:
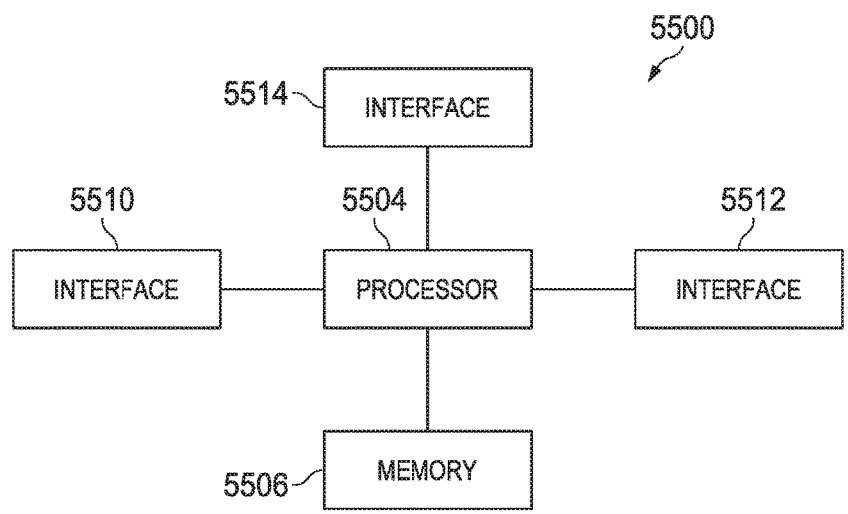
FIG. 55 illustrates a diagram of an embodiment processing system.

FIG. 55 illustrates a block diagram of an embodiment processing system 5500 for performing methods described herein, which may be installed in a host device. As shown, the processing system 5500 includes a processor 5504, a memory 5506, and interfaces 5510-5514, which may (or may not) be arranged as shown in FIG. 55. The processor 5504 may be any component or collection of components adapted to perform computations and/or other processing related tasks, and the memory 5506 may be any component or collection of components adapted to store programming and/or instructions for execution by the processor 5504. In an embodiment, the memory 5506 includes a non-transitory computer readable medium. The interfaces 5510, 5512, 5514 may be any component or collection of components that allow the processing system 5500 to communicate with other devices/components and/or a user. For example, one or more of the interfaces 5510, 5512, 5514 may be adapted to communicate data, control, or management messages from the processor 5504 to applications installed on the host device and/or a remote device. As another example, one or more of the interfaces 5510, 5512, 5514 may be adapted to allow a user or user device (e.g., personal computer (PC), etc.) to interact/communicate with the processing system 5500. The processing system 5500 may include additional components not depicted in FIG. 55, such as long term storage (e.g., non-volatile memory, etc.).

In some embodiments, the processing system 5500 is included in a network device that is accessing, or part otherwise of, a telecommunications network. In one example, the processing system 5500 is in a network-side device in a wireless or wireline telecommunications network, such as a base station, a relay station, a scheduler, a controller, a gateway, a router, an applications server, or any other device in the telecommunications network. In other embodiments, the processing system 5500 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 56:
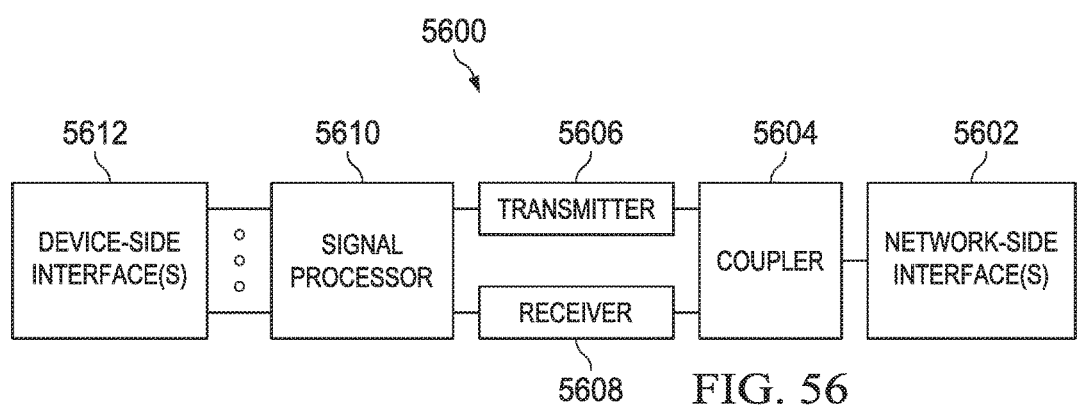
FIG. 56 illustrates a diagram of an embodiment transceiver.

In some embodiments, one or more of the interfaces 5510, 5512, 5514 connects the processing system 5500 to a transceiver adapted to transmit and receive signaling over the telecommunications network. FIG. 56 illustrates a block diagram of a transceiver 5600 adapted to transmit and receive signaling over a telecommunications network. The transceiver 5600 may be installed in a host device. As shown, the transceiver 5600 comprises a network-side interface 5602, a coupler 5604, a transmitter 5606, a receiver 5608, a signal processor 5610, and a device-side interface 5612. The network-side interface 5602 may include any component or collection of components adapted to transmit or receive signaling over a wireless or wireline telecommunications network. The coupler 5604 may include any component or collection of components adapted to facilitate bi-directional communication over the network-side interface 5602. The transmitter 5606 may include any component or collection of components (e.g., up-converter, power amplifier, etc.) adapted to convert a baseband signal into a modulated carrier signal suitable for transmission over the network-side interface 5602. The receiver 5608 may include any component or collection of components (e.g., down-converter, low noise amplifier, etc.) adapted to convert a carrier signal received over the network-side interface 5602 into a baseband signal. The signal processor 5610 may include any component or collection of components adapted to convert a baseband signal into a data signal suitable for communication over the device-side interface(s) 5612, or vice-versa. The device-side interface(s) 5612 may include any component or collection of components adapted to communicate data-signals between the signal processor 5610 and components within the host device (e.g., the processing system 5500, local area network (LAN) ports, etc.).

The transceiver 5600 may transmit and receive signaling over any type of communications medium. In some embodiments, the transceiver 5600 transmits and receives signaling over a wireless medium. For example, the transceiver 5600 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 5602 comprises one or more antenna/radiating elements. For example, the network-side interface 5602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 5600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

The following references are incorporated by reference herein as if reproduced in their entireties:
TS 36.211 v13.0.0 http://www.3gpp.org/dynareport/36211.htm
TS36.213 v13.01 http://www.3gpp.org/dynareport/36213.htm TS36.331 v13.0.0 http://www.3gpp.org/dynareport/36331.htm
TS36.212 v13.1.0 http://www.3gpp.org/ftp//Specs/archive/36_series/36.212/36212-d10.zip
TS36.321 v13.0.0 http://www.3gpp.org/dynareport/36321.htm In accordance with a first embodiment, a method for reference signal transmission is provided. In this embodiment, the method includes receiving one or more downlink transmissions over a first set of aggregated component carriers is provided. The UE is capable of transmitting uplink signals over fewer than all component carriers in the first set of aggregated component carriers at the same time. The method further includes transmitting sounding reference signal (SRS) symbols over different component carriers in the first set of aggregated component carriers during different time periods. An apparatus for performing this method is also provided.

In one example of the first embodiment, the step of transmitting the SRS symbols includes receiving a radio resource control (RRC) message from a base station prior to transmitting the one or more SRS symbols over a first component carrier in the set of aggregate component carriers. The RRC message specifies a periodic SRS configuration parameter for transmitting the one or more SRS symbols over the first component carrier. In such an example, the step of transmitting the SRS symbols further includes periodically transmitting the one or more SRS symbols over the first component carrier during periodic intervals in a sequence of periodic intervals according to the periodic SRS configuration parameter specified by the RRC message. The RRC message may specify a period between consecutive intervals in the sequence of periodic intervals. Alternatively, the RRC message may specify orthogonal frequency division multiplexed (OFDM) or single-carrier frequency-division multiple access (SC-FDMA) symbol locations in which the one or more SRS symbols are to be transmitted over the component carrier.

In another example of the first embodiment, the step of transmitting the SRS symbols over the different component carriers includes receiving a downlink control information (DCI) message from a base station prior to transmitting one or more SRS symbols over a first component carrier in the set of aggregate component carriers. The DCI message specifying an SRS configuration parameter for transmitting the one or more SRS symbols over the first component carrier. In such an example, the step of transmitting the SRS symbols further includes aperiodically transmitting the one or more SRS symbols over the first component carrier according to the SRS configuration parameter specified by the DCI message. In one instance of this example, the DCI message specifies a transmit power level for the one or more SRS symbols. In the same or another instance of this example, the DCI message triggers the aperiodic transmission of the one or more SRS symbols over the first component carrier. In any one of the above instances, or in a separate instance, of this example, the DCI message is received over a second component carrier that is different than the first component carrier, and reception of the DCI message over the second component carrier triggers cross-carrier transmission of the one or more SRS symbols over the first component carrier. In any one of the above instances, or in a separate instance, of this example, the UE receives the DCI message on a primary component carrier of the UE, and the one or more SRS symbols are transmitted over a secondary component carrier of the UE. In any one of the above instances, or in a separate instance, of this example, the UE receives the DCI message over a common search space of a physical downlink control channel (PDCCH) of the UE. In any one of the above instances, or in a separate instance, of this example, the DCI message has a DCI length that is equal to that associated with DCI format zero.

In another example of the first embodiment, the method further comprises receiving a radio resource control (RRC) message from a base station specifying a downlink control information (DCI) message format for signaling an SRS configuration parameter over a physical downlink control channel (PDCCH). In such an example, the step of transmitting the SRS symbols comprises monitoring the PDCCH for a DCI message having the DCI message format specified by the RRC message, and transmitting one or more SRS symbols over a first component carrier, in the first set of aggregated component carriers, according to the SRS configuration parameter signaled by the DCI message having the DCI message format specified by the RRC message. In one instance of this example, the RRC message specifies a specific DCI message format for indicating an SRS transmit power level. In the same or another instance of this example, the RRC message specifies a specific DCI message format for triggering an aperiodic SRS symbol transmission. In any one of the above instances, or in a separate instance, of this example, the RRC message specifies a specific DCI message format for triggering cross-carrier transmission of an SRS symbol.

In all instances of all examples of the first embodiment, or in a separate example of the first embodiment, the method further includes transmitting an uplink control message indicating uplink carrier aggregation capabilities of the UE.

In another example of the first embodiment, the method further includes receiving a downlink control signal specifying a dual connectivity cell group configuration constraint from a network controller. The dual connectivity cell group configuration constraint both (i) prohibits the UE from switching from a source component carrier in the first set of aggregated component carriers monitored by a first base station to a target component carrier in a second set of aggregated component carriers monitored by a second base station during a set of time periods and (ii) prohibits the UE from switching from a source component carrier in the second set of aggregated component carriers monitored by the second base station to a target component carrier in the first set of aggregated component carriers monitored by the first base station during the set of time periods. In one instance of this example, the step of transmitting the SRS symbols comprises transmitting, via a first transmission chain (TX chain) of the UE, at least a first SRS symbol over different component carriers within the first set of aggregated component carriers during different time periods in a set of time period without using the first TX chain to transmit any SRS symbol over component carriers in the second set of aggregated component carriers during any period in the set of time periods, and transmitting, via a second TX chain of the UE, at least a second SRS symbol over different component carriers within the second set of aggregated component carriers during different time periods in the set of time period without using the second TX chain to transmit any SRS symbol over component carriers in the second set of aggregated component carriers during any period in the set of time periods.

In another example of the first embodiment, the method further comprises receiving a higher-layer control signal from a network controller that specifies a periodic uplink SRS switching configuration that instructs the UE to switch between component carriers in the first set of aggregated component carriers according to a periodic interval. In this example, the step of transmitting the SRS symbols includes transmitting at least one SRS symbol over each component carrier in the set of aggregated component carriers according to the periodic uplink SRS switching configuration during a first set of time periods, receiving a media access control (MAC) message from the network controller that deactivates at least one component carrier in the set of aggregated component carriers, and transmitting at least one SRS symbol over each remaining component carriers in the set of aggregated component carriers according to the periodic uplink SRS switching configuration during a second set of time periods without transmitting any SRS symbols over the at least one deactivated component carrier during the second set of time periods.

In another example of the first embodiment, the method further comprises receiving a single downlink control message and at least a first field. The single downlink control message including multiple SRS instructions for multiple UEs. The method further comprises identifying the location of an SRS instruction for the UE, amongst the multiple SRS instructions in the single downlink control message, based on a number of bits indicated by the field. In one instance of this example, the first field is a field within the single downlink control message. In the same or another instance of this example, In any one of the above instances, or in a separate instance, of this example, the first field is received via higher layer signaling.

In any one of the above instances, or in a separate instance, of this example, the SRS instruction indicates a transmit power level to be used when transmitting SRS symbols.

In any one of the above instances, or in a separate instance, of this example, the SRS instruction indicates a condition for triggering an aperiodic SRS symbol transmission.

In another example of the first embodiment, the one or more downlink transmissions are transmitted by a single base station. In one instance of this example, the one or more downlink transmissions include at least a first downlink transmission over the first component carrier and a second downlink transmission over the second component carrier. The first downlink transmission and the second downlink transmission are transmitted by the same or different base stations during a common time period. In such an instance, the first downlink transmission may correspond to a primary cell, and the second downlink transmission may correspond to a secondary cell. Alternatively, in such an instance, the first downlink transmission may correspond to a different secondary cell than the second downlink transmission.

In accordance with a second embodiment, a method for reference signal reception is provided. In this embodiment, the method includes transmitting one or more downlink signals to a user equipment (UE) over a first set of aggregated component carriers. The UE is incapable of transmitting uplink signals over all component carriers in the first set of aggregated component carriers at the same time. The method further includes receiving sounding reference signal (SRS) symbols from the UE over different component carriers in a first set of aggregated component carriers during different time periods. An apparatus for performing this method is also provided.

In one example of the second embodiment, the RRC message specifies a period between consecutive intervals in the sequence of periodic intervals.

In the same or another example of the second embodiment, the RRC message specifies which orthogonal frequency division multiplexed (OFDM) or single-carrier frequency-division multiple access (SC-FDMA) symbol locations in which the one or more SRS symbols are to be transmitted over the component carrier.

In another example of the second embodiment, the method further includes transmitting a downlink control information (DCI) message to the UE that specifies an SRS configuration parameter for transmitting one or more SRS symbols over a first component carrier, and receiving an SRS symbol from the UE over a first component carrier during a first period. The SRS symbol was transmitted according to the SRS configuration parameter specified by the DCI message. In one instance of this example, the DCI message specifies a transmit power level for the SRS symbol. In another instance of this example, the DCI message specifies an aperiodic transmission of the SRS symbol. In any one of the above instances, or in a separate instance, of this example the DCI message is received over a second component carrier that is different than the first component carrier, and reception of the DCI message over the second component carrier triggers cross-carrier transmission of the SRS symbol over the first component carrier.

In another example of the second embodiment, the method further includes transmitting a radio resource control (RRC) message to the UE that specifies a downlink control information (DCI) format for indicating an sounding reference signal (SRS) configuration parameter, transmitting a DCI message having the DCI format to the UE, and receiving an SRS symbol from the UE after transmitting the DCI message having the DCI format to the UE, where the DCI message instructed the UE to transmit the SRS symbol according to the SRS configuration parameter. In such an instance, the RRC message specifies a specific DCI message format for indicating an SRS transmit power level, a specific DCI message format for triggering an aperiodic SRS symbol transmission, and/or a specific DCI message format for triggering cross-carrier transmission of an SRS symbol.

In another example of the second embodiment, the method further comprises receiving an uplink control message from the UE that indicates uplink carrier aggregation capabilities of the UE, assigning an uplink carrier switching configuration to the UE based on the carrier aggregation capabilities of the UE, and sending a downlink control signal to the UE instructing the UE to transmit the SRS symbols over a set of aggregated component carriers based on the uplink carrier switching configuration. In one instance of this example, the uplink carrier switching configuration specifies at least a first component carrier assigned to carry SRS symbol and physical uplink control channel/physical uplink shared channel (PUCCH/PUSCH) transmissions of the UE, and at least a second component carrier assigned to carry sounding reference signal (SRS) symbol transmissions of the UE without carrying PUCCH/PUSCH transmissions of the UE. In such an instance, the uplink carrier switching configuration may instruct the UE to transmit at least one of a first SRS symbol and a PUSCH or PUCCH signal over the first component carrier during an initial period and a second SRS symbol over the second component carrier during a subsequent period following the initial period. In another instance of this example, the uplink carrier switching configuration specifies a periodic interval for switching from a source component carrier to a target component carrier.

In another example of the second embodiment, the method further comprises transmitting a downlink control signal specifying a dual connectivity cell group configuration constraint to the UE. The first set of aggregated component carriers includes at least a first set of aggregated component carriers monitored by a first base station and a second set of aggregated component carriers monitored by a second base station, and wherein the dual connectivity cell group configuration constraint both (i) prohibits the UE from switching from a source component carrier in the first set of aggregated component carriers to a target component carrier in the second set of aggregated component carriers during a set of time periods and (ii) prohibits the UE from switching from a source component carrier in the second set of aggregated component carriers to a target component carrier in the second set of aggregated component carriers during the set of time periods.

In another example of the second embodiment, the method further includes receiving an uplink control message from the UE. The uplink control message includes two or more bits indicating an uplink radio frequency (RF) retuning delay of the UE for switching from a source component carrier to a target component carrier, as well as a single bit that is set to either a first value to indicate that a downlink retuning delay of the UE is equal to the uplink retuning delay of the UE or a second value when the downlink retuning delay of the UE is equal to zero. In this example, the method further includes assigning an uplink carrier switching configuration to the UE based on the downlink retuning delay of the UE, and sending a downlink control signal to the UE that instructs the UE to transmit the SRS symbols over a first set of aggregated component carriers based on the uplink carrier switching configuration. In one instance of this example, the uplink control message indicates a specific uplink retuning delay for switching from a first RF band containing the source component carrier to a second RF band containing the target component carrier. In such an instance, the first RF band may be different than the second RF band and/or the two or more bits of the uplink control message may indicate the uplink RF retuning delay of the UE as a number of orthogonal frequency division multiplexed (OFDM) or single-carrier frequency-division multiple access (SC-FDMA) symbols.

In another example of the second embodiment, the method further includes transmitting, by the base station, a single downlink control message to both a first UE and a second UE, a first field to the first UE, and a second field to the second UE. The single downlink control message carries a first SRS instruction for the first UE and a second SRS instruction for the second UE. The first field indicates a number of bits used to indicate the first SRS instruction in the single downlink control message, and the second field indicates a number of bits used to indicate the second SRS instruction in the single downlink control message. In one instance of this example, the first field and the second field are fields within the single downlink control message. In another instance of this example, the first field and the second field are transmitted to the first UE and the second UE, respectively, via higher layer signaling. In any one of the above instances, or in a separate instance, of this example, the first SRS instruction and the second SRS instruction indicate transmit power levels to be used by the first UE and the second UE, respectively, when transmitting SRS symbols and/or the first SRS instruction and the second SRS instruction indicate SRS triggering conditions for triggering SRS symbol transmissions by the first UE and the second UE, respectively.

In accordance with a third embodiment, a method for transmitting uplink signals is provided. In this embodiment, the method includes transmitting a first uplink signal in a first subframe over a first component carrier during a first period. The first uplink signal carrying at least a first sounding reference signal (SRS) symbol. The method further includes switching from the first component carrier to a second component carrier according to an SRS switching schedule. An uplink RF retuning delay is associated with switching from the first component carrier to the second component carrier. The method further includes transmitting a second uplink signal in a second subframe over the second component carrier during a second period. The second uplink signal carries at least one of a second SRS symbol and a random access preamble.

In one example of the third embodiment, the method further includes sending, by the UE, an uplink control message to a base station that specifies a duration of the uplink RF retuning delay. In one instance of this example, the uplink control message includes two or more bits indicating the duration of the RF retuning delay of the UE and a single bit being set to either a first value to indicate that a downlink RF retuning delay of the UE is equal to the uplink RF retuning delay of the UE or a second value to indicate that the downlink RF retuning delay of the UE is equal to zero. In another instance of this example, the two or more bits of the uplink control message indicate the uplink RF retuning delay of the UE as a number of orthogonal frequency division multiplexed (OFDM) or single-carrier frequency-division multiple access (SC-FDMA) symbols. In such an instance, the UE may not monitor or receive physical downlink control channel (PDCCH) or physical downlink shared channel (PDSCH) over orthogonal frequency division multiplexed (OFDM) or single-carrier frequency-division multiple access (SC-FDMA) symbols of the second component carrier that overlap in time with the downlink RF retuning delay.

In another example of the third embodiment, transmitting the second uplink signal in the second subframe over the second component carrier during the second period comprises puncturing a portion of the second uplink signal corresponding to a duration of the uplink RF retuning delay.

In accordance with a fourth embodiment, a method for reference signal switching is provided. In this embodiment, the method includes transmitting a first sounding reference signal (SRS) symbol over a primary component carrier during a first period. The UE that transmitted the SRS symbol is scheduled to transmit both a second SRS symbol over a secondary component carrier during a second period and an uplink control message over the primary carrier during the second period. This creates a scheduling conflict between the SRS symbol and the uplink control message. The method further includes transmitting the uplink control message over the primary component carrier during the second period without transmitting the second SRS symbol over the secondary component carrier during the second period when the uplink control message satisfies a criterion.

In one example of the fourth embodiment, the uplink control message satisfies the criterion when the uplink control message includes an acknowledgement or negative acknowledgement (ACK/NACK) message. In one instance of such an example, the uplink control message satisfies the criterion when the uplink control message includes channel state information (CSI).

In any one of the above instances, or in a separate instance, of this example, or in another example entirely, the method further comprises transmitting the second SRS symbol over the secondary carrier during a third period following the second period. The third period may be the next available opportunity for transmitting the second SRS symbol.

In accordance with a fifth embodiment, a method for transmitting uplink signals is provided. In this embodiment, the method includes receiving a control signal from a base station that indicates that a set of aggregated component carriers are assigned to a timing advance group (TAG). At least a first component carrier assigned to the TAG does not support physical uplink control channel (PUCCH) signaling or physical uplink shared channel (PUSCH) signaling. The method further includes transmitting a sounding reference signal (SRS) symbol over one or more component carriers assigned to the TAG according to a timing advance parameter associated with the TAG.

In one example of the fifth embodiment, the method further comprises transmitting a random access preamble to a base station to request a timing advance for the first component carrier, receiving a control signal from the base station that indicates the timing advance for the first component carrier, and transmitting a first sounding reference signal (SRS) symbol over the first component carrier during a first period in accordance with the timing advance without transmitting any PUSCH signaling and without transmitting any PUCCH signaling over the first component carrier during the first period. In one instance of such an example, the method further includes transmitting a second SRS symbol over a second component carrier during a second period. In such an instance, the UE transmits the first SRS symbol over a first component carrier during the first period without transmitting any uplink signaling over a second component carrier during the first period, and transmits the second SRS symbol over the second component carrier during the second period without transmitting any uplink signaling over the first component carrier during the second period. In such an instance the UE may transmit the second SRS symbol over the second component carrier during the second period based on a preconfigured SRS switching interval without receiving explicit instructions to switch from the first component carrier to the second component carrier, in which case the preconfigured SRS switching interval may be a periodic switching interval that requires the UE to transmit SRS symbols over different subsets of component carriers in the set of aggregated component carriers during different time periods in a series of periodically occurring time periods. In any one of the above instances, or in a separate instance, of this example the method further comprises receiving a switching instruction from a base station that instructs the UE to transmit the second SRS symbol over the second component carrier during the second period. The switching instruction may have been received in a downlink control information (DCI) message.

In accordance with a sixth embodiment, a method for receiving uplink signals is provided. In this embodiment, the method includes transmitting a downlink signal to a UE over a set of aggregated component carriers, receiving a first sounding reference signal (SRS) symbol from the UE over a first component carrier in the set of aggregated component carriers during a first period, and receiving a second SRS symbol from the UE over a second component carrier in the set of aggregated component carriers during a second period. The second component carrier is different than the first component carrier.

In one example of the sixth embodiment, the first SRS symbol is received from the UE over the first component carrier during the first period without receiving any uplink signaling from the UE over the second component carrier during the first period, and the second SRS symbol is received from the UE over the second component carrier during the second period without receiving any uplink signaling from the UE over the first component carrier during the second period.

In that example, or another example, of the sixth embodiment, the method further includes transmitting a switching instruction to the UE that instructs the UE to transmit the second SRS symbol over the second component carrier during the second period.

In any of the above examples, or in another example, of the sixth embodiment, the first component carrier supports physical uplink shared channel (PUSCH) transmissions. In such an example, the second component carrier may not support PUSCH transmissions.

In any of the above examples, or in another example, of the sixth embodiment the method further includes transmitting at least one of a third SRS symbol, PUSCH, and PUCCH over the first component carrier during a third period unless the UE has been instructed to transmit the third SRS symbol over a different component carrier that does not support PUSCH and/or PUCCH transmissions.

In any of the above examples, or in another example, of the sixth embodiment, the first component carrier is frequency division duplexed (FDD) and the second component carrier is time division duplexed (TDD) or in an unpaired spectrum. Alternatively, the first component carrier and the second component carrier may be time division duplexed (TDD) or in an unpaired spectrum.

In any of the above examples, or in another example, of the sixth embodiment, the method further includes receiving a first downlink transmission over the first component carrier and a second downlink transmission over the second component carrier, where transmission parameters for the first downlink transmission are derived from received signal information corresponding to the first SRS symbol, and transmission parameters for the second downlink transmission are derived from received signal information corresponding to the second SRS symbol.

In any of the above examples, or in another example, of the sixth embodiment, the UE transmits the SRS configuration parameter over the first component carrier during the first period without transmitting any physical uplink shared channel (PUSCH) signaling over the first component carrier during the first period and without transmitting any physical uplink control channel (PUCCH) signaling over the first component carrier during the first period.

In accordance with a seventh embodiment, a method for transmitting control signals is provided. In this embodiment, the method includes transmitting a control signal to a UE The control signal indicates that a set of aggregated component carriers are assigned to a timing advance group (TAG). At least one component carrier assigned to the TAG does not support physical uplink control channel (PUCCH) signaling and physical uplink shared channel (PUSCH) signaling, and the control signal prompts the UE to transmit a sounding reference signal (SRS) symbol over one or more component carriers assigned to the TAG according to a timing advance parameter associated with the TAG.

In accordance with a seventh embodiment, a method for transmitting control signals is provided. In this embodiment, the method includes transmitting a control signal to a UE The control signal indicates that a set of aggregated component carriers are assigned to a timing advance group (TAG). At least one component carrier assigned to the TAG does not support physical uplink control channel (PUCCH)

signaling and physical uplink shared channel (PUSCH) signaling, and the control signal prompts the UE to transmit a sounding reference signal (SRS) symbol over one or more component carriers assigned to the TAG according to a timing advance parameter associated with the TAG.

In one example of the seventh embodiment, the control signal is a downlink control information (DCI) message.

In another example of the seventh embodiment, the method further includes receiving at least one of a random access channel (RACH) message and an SRS symbol over a secondary component carrier that does not carry PUCCH or PUSCH transmissions of the UE.

In one instance of this example, the RACH message is transmitted over a non-contention based access channel. In such an instance, the RACH message and the SRS symbol may be received over the secondary component carrier. In another instance of this example, the method further includes receiving a PUCCH or PUSCH transmission from the UE over a primary component carrier prior to receiving the RACH message and/or the SRS symbol over the secondary component carrier. In such an instance, the UE switches from the primary component carrier to the secondary component carrier after sending the PUCCH or PUSCH transmission over the primary component carrier. In such an instance, the method may further include transmitting a downlink control instruction (DCI) message to the UE that instructs the UE to switch from the primary component carrier to the secondary component carrier.

In accordance with an eighth embodiment, a method for receiving uplink signals is provided. In this embodiment, the method includes receiving a random access channel (RACH) transmission from a user equipment (UE). The RACH transmission requests a timing advance for a component carrier without requesting a grant for physical uplink control channel (PUCCH) resource and without requesting a grant for physical uplink shared channel (PUSCH) resources. The method further includes transmitting a control signal to the UE that indicates the timing advance for the component carrier, and receiving one or more sounding reference signal (SRS) symbols from the UE over the component carrier in accordance with the timing advance without receiving any PUSCH signaling over the component carrier and without receiving any PUCCH signaling over the component carrier.

In accordance with a ninth embodiment, a method for reference signal transmission is provided in this embodiment, the method includes reporting a component carrier capability of a user equipment (UE) to a base station, configuring the UE based on information from the base station, a first set of component carriers for one or more downlink reception, configuring the UE based on information from the base station a first subset of component carriers, in the first set of component carriers, for one or more uplink transmissions. The one or more transmissions include at least one of physical uplink control channel (PUCCH), physical uplink shared channel (PUSCH), or sounding reference signal (SRS) symbol transmissions. The UE is capable of transmitting uplink signals over all component carriers in the first subset of component carriers at the same time. The method further includes configuring the UE based on information from the eNB, a second subset of component carriers, in the first set of component carriers, for one or more SRS transmissions without configured the second subset of component carriers for PUSCH/PUCCH transmissions, and transmitting SRS symbols over different component carriers in the first subset of component carriers and second subset of component carriers during different time periods.

In one example of the ninth embodiment, the number of component carriers in the first subset of component carriers and the second subset of component carriers exceeds the UE's indicated uplink carrier aggregation capability. In the same or different instance of this example, the number of component carriers in the second subset of component carriers exceeds the UE's indicated uplink carrier aggregation capability.

In accordance with a tenth embodiment, a method for reference signal transmission is provided. In this embodiment, the method includes transmitting a first uplink signal over a first component carrier during a first period. The first uplink signal carries at least a first sounding reference signal (SRS) symbol. The method further includes switching from the first component carrier to a second component carrier according to a switching parameter for an SRS switching schedule, and transmitting a second uplink signal over the second component carrier during a second period. The second uplink signal carrying at least one of a second SRS symbol and a random access preamble, wherein the transmission occurs after an uplink RF retuning time.

In one example of the tenth embodiment, the switching parameter is determined by a configuration received prior to the first period.

In another example of the tenth embodiment, the switching parameter is determined by a messaging received during the first period.

In accordance with an eleventh embodiment, a method for reference signal transmission is provided. The method comprises receiving one or more downlink transmissions over a set of aggregated component carriers, and transmitting at least one of a first sounding reference signal (SRS) symbol, and at least one of physical uplink shared channel (PUSCH) signal and physical uplink control channel (PUCCH) signaling over a first component carrier in the set of aggregated component carriers during a first period. At least one of the parameters for the SRS symbol is generated based on a parameter for the PUSCH. The method further includes transmitting at least a second SRS symbol over a second component carrier in the set of aggregated component carriers during a second period without transmitting any PUSCH signal and PUCCH signaling over the second component carrier during the second period. The second component carrier being different than the first component carrier, and none of the parameters for the SRS symbol is generated based on a parameter for any PUSCH.

In one example of the eleventh embodiment, the method further comprises receiving a control signal from a base station that indicates that the second component carrier is assigned to a timing advance group (TAG), and transmitting a sounding reference signal (SRS) symbol over one or more component carriers assigned to the TAG according to a timing advance parameter associated with the TAG.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for reference signal transmission, the method comprising:
    receiving, by a user equipment (UE), one or more downlink transmissions over a first set of aggregated component carriers, the UE being capable of transmitting uplink signals over fewer than all component carriers in the first set of aggregated component carriers at the same time; and
    transmitting, by the UE, sounding reference signal (SRS) symbols over different component carriers in the first set of aggregated component carriers during different time periods.

2. The method of claim 1, wherein transmitting the SRS symbols over the different component carriers comprises:
    receiving, by the UE, a radio resource control (RRC) message from a base station prior to transmitting the one or more SRS symbols over a first component carrier in the set of aggregate component carriers, the RRC message specifying a periodic SRS configuration parameter for transmitting the one or more SRS symbols over the first component carrier; and
    periodically transmitting the one or more SRS symbols over the first component carrier during periodic intervals in a sequence of periodic intervals according to the periodic SRS configuration parameter specified by the RRC message.

3. The method of claim 2, wherein the RRC message specifies a period between consecutive intervals in the sequence of periodic intervals.

4. The method of claim 1, further comprising
    transmitting, by the UE, an uplink control message indicating uplink carrier aggregation capabilities of the UE.

5. The method of claim 1, further comprising:
    receiving a downlink control signal specifying a dual connectivity cell group configuration constraint from a network controller, wherein the dual connectivity cell group configuration constraint both (i) prohibits the UE from switching from a source component carrier in the first set of aggregated component carriers monitored by a first base station to a target component carrier in a second set of aggregated component carriers monitored by a second base station during a set of time periods and (ii) prohibits the UE from switching from a source component carrier in the second set of aggregated component carriers monitored by the second base station to a target component carrier in the first set of aggregated component carriers monitored by the first base station during the set of time periods.

6. The method of claim 5, wherein transmitting the SRS symbols comprises:
    transmitting, via a first transmission chain (TX chain) of the UE, at least a first SRS symbol over different component carriers within the first set of aggregated component carriers during different time periods in a set of time period without using the first TX chain to transmit any SRS symbol over component carriers in the second set of aggregated component carriers during any period in the set of time periods; and
    transmitting, via a second TX chain of the UE, at least a second SRS symbol over different component carriers within the second set of aggregated component carriers during different time periods in the set of time period without using the second TX chain to transmit any SRS symbol over component carriers in the second set of aggregated component carriers during any period in the set of time periods.

7. A method for reference signal transmission, the method comprising:
    receiving, by a user equipment (UE), a downlink control information (DCI) message from a base station, the DCI message specifying a sounding reference signal (SRS) configuration parameter; and
    aperiodically transmitting SRS symbols over a first component carrier according to the SRS configuration parameter specified by the DCI message.

8. The method of claim 7, wherein the DCI message is received over a second component carrier that is different than the first component carrier, and wherein reception of the DCI message over the second component carrier triggers cross-carrier transmission of the one or more SRS symbols over the first component carrier.

9. The method of claim 7, wherein the UE receives the DCI message on a primary component carrier of the UE, and wherein the one or more SRS symbols are transmitted over a secondary component carrier of the UE.

10. The method of claim 7, wherein the UE receives the DCI message over a common search space of a physical downlink control channel (PDCCH) of the UE.

11. The method of claim 7, wherein the DCI message has a DCI length that is equal to that associated with DCI format zero.

12. The method of claim 7, wherein the DCI message specifies a transmit power level for the one or more SRS symbols.

13. The method of claim 7, wherein the DCI message triggers the aperiodic transmission of the one or more SRS symbols over the first component carrier.

14. A method for reference signal transmission, the method comprising:
    receiving, by a user equipment (UE), a radio resource control (RRC) message from a base station, the RRC message specifying a downlink control information (DCI) message format for signaling an SRS configuration parameter over a physical downlink control channel (PDCCH);
    monitoring the PDCCH for a DCI message having the DCI message format specified by the RRC message; and
    upon detecting the DCI message in the PDCCH, transmitting one or more SRS symbols over a component carrier according to the SRS configuration parameter signaled by the DCI message.

15. The method of claim 14, wherein the RRC message specifies a specific DCI message format for triggering cross-carrier transmission of an SRS symbol.

16. The method of claim 14, wherein the RRC message specifies a specific DCI message format for indicating an SRS transmit power level.

17. The method of claim 14, wherein the RRC message specifies a specific DCI message format for triggering an aperiodic SRS symbol transmission.

18. A method for reference signal transmission, the method comprising:
    receiving, by a user equipment (UE), a radio resource control (RRC) message from a base station, the RRC message specifying orthogonal frequency division multiplexed (OFDM) or single-carrier frequency-division multiple access (SC-FDMA) symbol locations in which sounding reference signal (SRS) symbols are to be transmitted over a component carrier; and transmitting, by the UE, SRS symbols over the component carrier using the OFDM or SC-FDMA symbol locations specified by the RRC message.

19. An apparatus comprising:

a processor; and a non-transitory computer readable storage medium storing programming for execution by the processor, the programming including instructions to:

receive one or more downlink transmissions over a first set of aggregated component carriers, the UE being capable of transmitting uplink signals over fewer than all component carriers in the first set of aggregated component carriers at the same time; and transmit sounding reference signal (SRS) symbols over different component carriers in the first set of aggregated component carriers during different time periods.

20. A computer program product comprising a non-transitory computer readable storage medium storing programming, the programming including instructions to:

receive one or more downlink transmissions over a first set of aggregated component carriers, the UE being capable of transmitting uplink signals over fewer than all component carriers in the first set of aggregated component carriers at the same time; and transmit sounding reference signal (SRS) symbols over different component carriers in the first set of aggregated component carriers during different time periods.

* * * * *